US011021068B2

(12) United States Patent
Shindo et al.

(10) Patent No.: US 11,021,068 B2
(45) Date of Patent: Jun. 1, 2021

(54) VEHICLE CONTROL DEVICE AND CONTROL METHOD

(71) Applicant: Nissan Motor Co., Ltd., Kanagawa (JP)

(72) Inventors: Ikuma Shindo, Kanagawa (JP); Tatsuya Suzuki, Kanagawa (JP); Mitsunori Ohta, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 163 days.

(21) Appl. No.: 16/480,353

(22) PCT Filed: Jan. 16, 2018

(86) PCT No.: PCT/JP2018/001035
§ 371 (c)(1),
(2) Date: Jul. 24, 2019

(87) PCT Pub. No.: WO2018/139270
PCT Pub. Date: Aug. 2, 2018

(65) Prior Publication Data
US 2019/0381895 A1    Dec. 19, 2019

(30) Foreign Application Priority Data
Jan. 24, 2017  (JP) .............................. JP2017-010565

(51) Int. Cl.
*B60L 15/20*  (2006.01)
*B60L 50/51*  (2019.01)
(52) U.S. Cl.
CPC .......... *B60L 15/2018* (2013.01); *B60L 15/20* (2013.01); *B60L 50/51* (2019.02); *B60L 2210/40* (2013.01);
(Continued)

(58) Field of Classification Search
CPC .. B60L 15/2018; B60L 15/20; B60L 15/2081; B60L 2240/423; B60L 2240/642; B60L 7/18; B60L 7/26
See application file for complete search history.

(56) References Cited

U.S. PATENT DOCUMENTS 5,726,890 A *  3/1998  Takamoto ................. B60L 7/08
                                                    701/70
6,755,489 B2 *  6/2004  Kuno ................. B60W 30/1819
                                                    303/191
(Continued)

FOREIGN PATENT DOCUMENTS

JP    H05-270376 A   10/1993
JP    2000-205015 A   7/2000
(Continued)

*Primary Examiner* — Michael J Zanelli
(74) *Attorney, Agent, or Firm* — Osha Bergman Watanabe & Burton LLP

(57) ABSTRACT

A method for controlling a vehicle that includes a motor configured to provide a driving/braking force to the vehicle and a friction braking mechanism configured to provide a friction brake force to the vehicle includes a target calculation step of calculating a target torque of the motor in accordance with a displacement of an accelerator pedal, a gradient estimation step of estimating a gradient torque to cancel a disturbance due to a gradient of a road surface where the vehicle is travelling, a command calculation step of calculating a torque command value of the motor based on the gradient torque and the target torque, a control step of controlling a torque of the motor in accordance with the torque command value, and a stop control step.

33 Claims, 28 Drawing Sheets

(52) U.S. Cl.
CPC ..... *B60L 2240/36* (2013.01); *B60L 2240/423* (2013.01)

(56) References Cited

U.S. PATENT DOCUMENTS

| | | |
|---|---|---|
| 2002/0190683 A1 | 12/2002 | Karikomi et al. |
| 2010/0299011 A1 | 11/2010 | Fujimoto et al. |
| 2018/0154797 A1 | 6/2018 | Sawada et al. |

FOREIGN PATENT DOCUMENTS

| | | |
|---|---|---|
| JP | 2001-45613 A | 2/2001 |
| JP | 2002-152916 A | 5/2002 |
| JP | 2003-9566 A | 1/2003 |
| JP | 2010-288332 A | 12/2010 |
| JP | 2014-30356 A | 2/2014 |
| JP | 2016-111760 A | 6/2016 |
| WO | 2016/092586 A1 | 6/2016 |
| WO | 2016/189670 A1 | 12/2016 |

\* cited by examiner

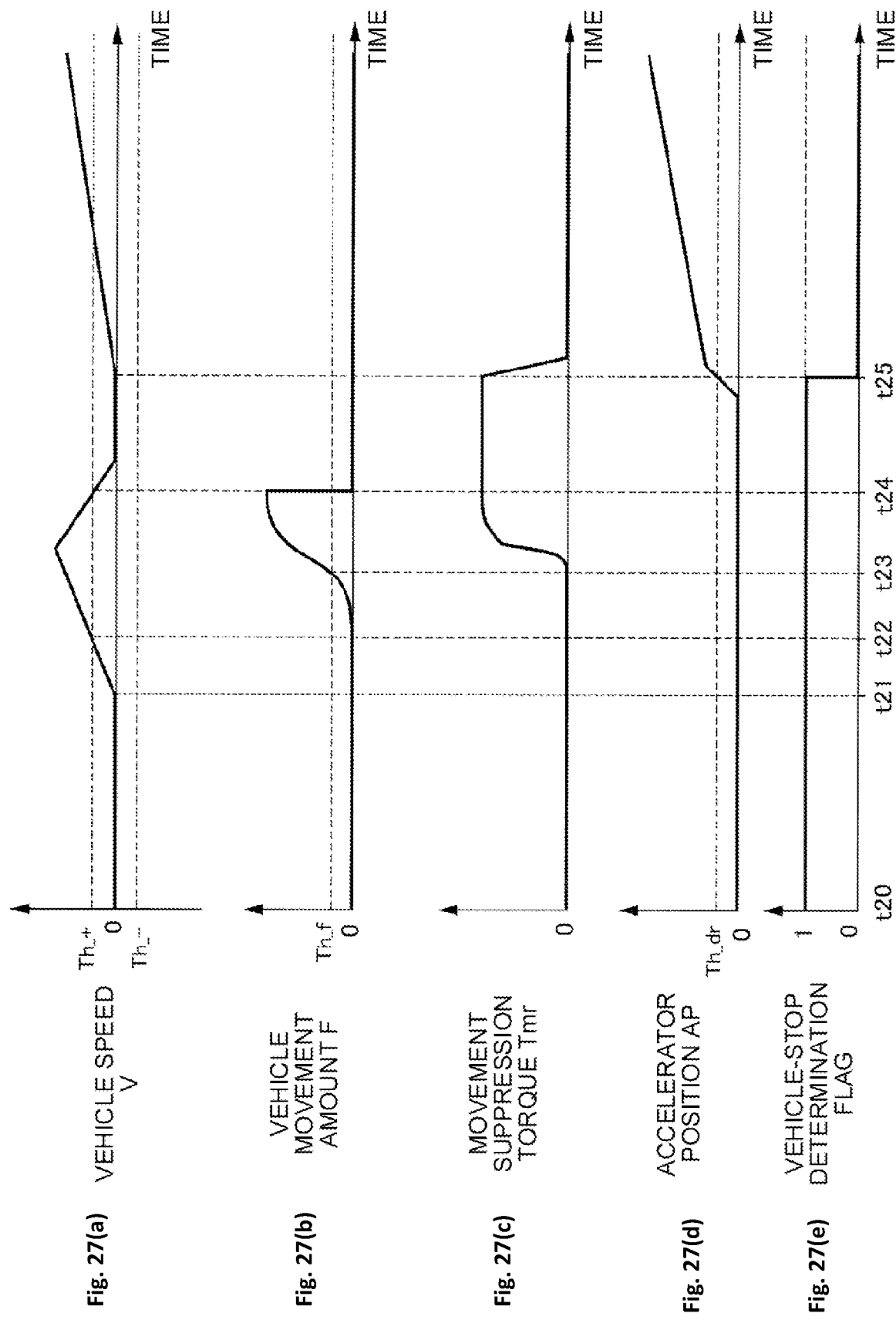

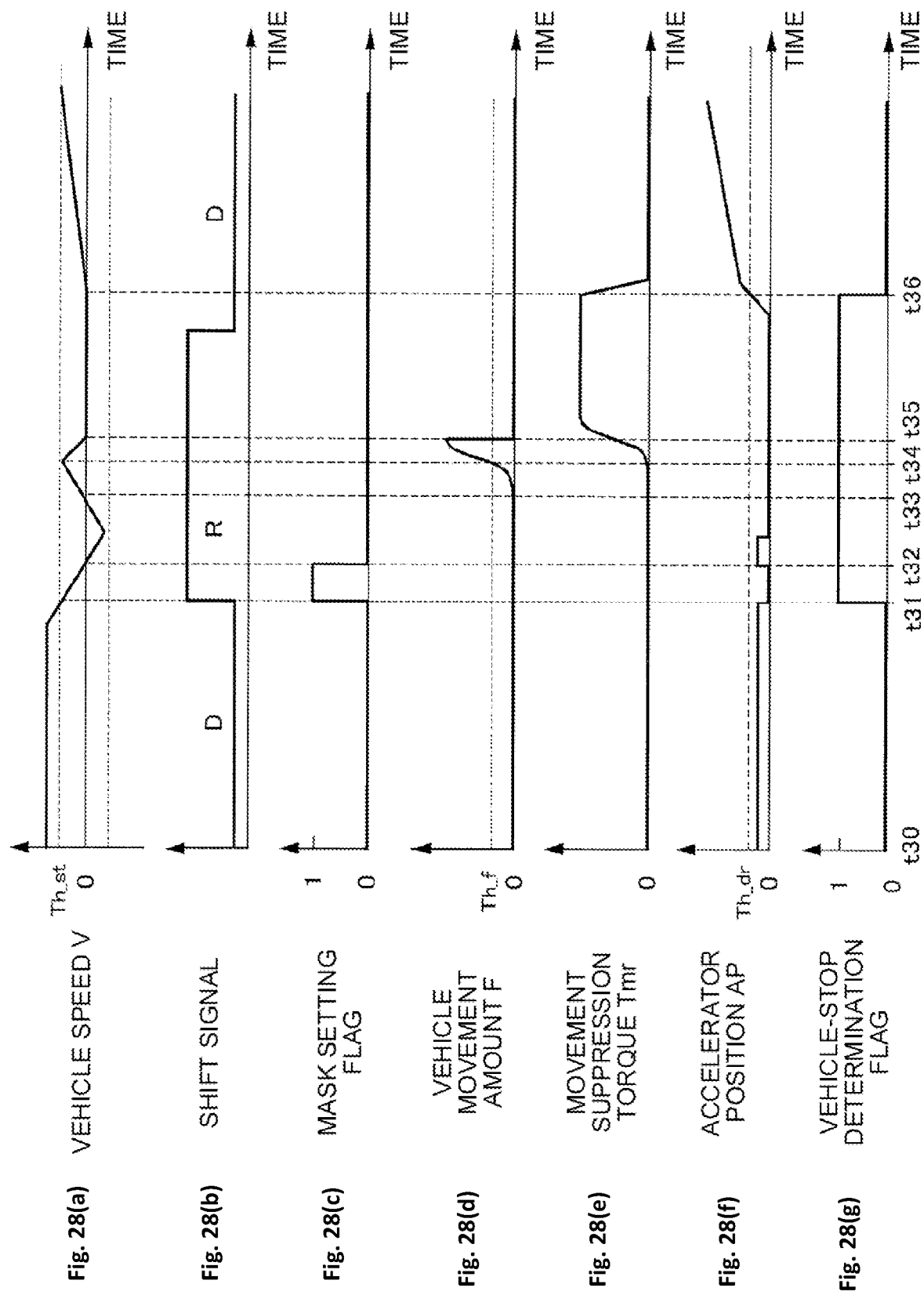

VEHICLE CONTROL DEVICE AND CONTROL METHOD

The present application claims priority to Japanese Patent Application No. 2017-010565 filed with the Japan Patent Office on Jan. 24, 2017, the contents of which are hereby incorporated by reference in their entirety.

BACKGROUND

Technical Field

The present invention relates to a control device for vehicle configured to control a driving/braking force and a friction braking force of the motor to stop the vehicle and relates to such a control method.

Related Art

Conventionally techniques for the acceleration/deceleration control system of a vehicle have been known, which control the deceleration in accordance with the accelerator displacement when the accelerator displacement is less than a predetermined value and control the acceleration in accordance with the accelerator displacement when the accelerator displacement is the predetermined value or more (see JP2000-205015A). Such an acceleration/deceleration control system sets a target acceleration/deceleration in accordance with the accelerator displacement. The accelerator displacement corresponding to the target acceleration/deceleration set at 0 therefore allows the vehicle to keep a constant vehicle speed without requiring the driver to adjust the accelerator displacement even on a sloping road.

SUMMARY OF INVENTION

To drive/brake a vehicle, the above-stated control device estimates the gradient of the road surface using a vehicle model based on parameters, such as the speed of the vehicle, the driving torque, and the weight, and then applies a brake torque based on the estimated value of the gradient of the road surface so as to stop the vehicle.

The estimated value of the gradient of the road surface may be different between the actual vehicle state and the vehicle model because the weight of the vehicle varies with the number of passengers and the amount of luggage on the vehicle, for example. In such a case, the estimated value of the road-surface gradient may have an error. If the value of the brake torque obtained from the estimated value of the road-surface gradient is lower than the brake torque necessary to stop the vehicle, the vehicle may fail to stop.

One or more embodiments of the present invention aims to stop a vehicle in spite of various gradients of the road surface on which the vehicle travels.

According to one or more embodiments of the present invention, a method for controlling a vehicle includes a target calculation step of calculating a target torque of the motor in accordance with a displacement of an accelerator pedal, the vehicle including a motor configured to provide a driving/braking force to the vehicle and a friction braking mechanism configured to provide a friction brake force to the vehicle. Further, the method for controlling the vehicle includes a gradient estimation step of estimating a gradient torque to cancel a disturbance due to a gradient of a road surface where the vehicle is travelling a command calculation step of calculating a torque command value of the motor based on the gradient torque and the target torque, and a control step of controlling a torque of the motor in accordance with the torque command value. The method for controlling the vehicle also includes a stop control step of providing a brake torque to the vehicle to stop the vehicle, the brake torque being a large value larger than the gradient torque, and changing the brake torque from the torque of the motor to a friction torque by the friction braking mechanism.

BRIEF DESCRIPTION OF DRAWINGS

FIGS. 27(a)-27(e) are time charts describing an example of the method for suppressing vehicle movement in the fifth embodiment.

FIGS. 28(a)-28(g) are time charts describing an example of the method for limiting the vehicle-movement suppressing processing in the fifth embodiment.

DETAILED DESCRIPTION

The following describes some embodiments of the present invention, with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
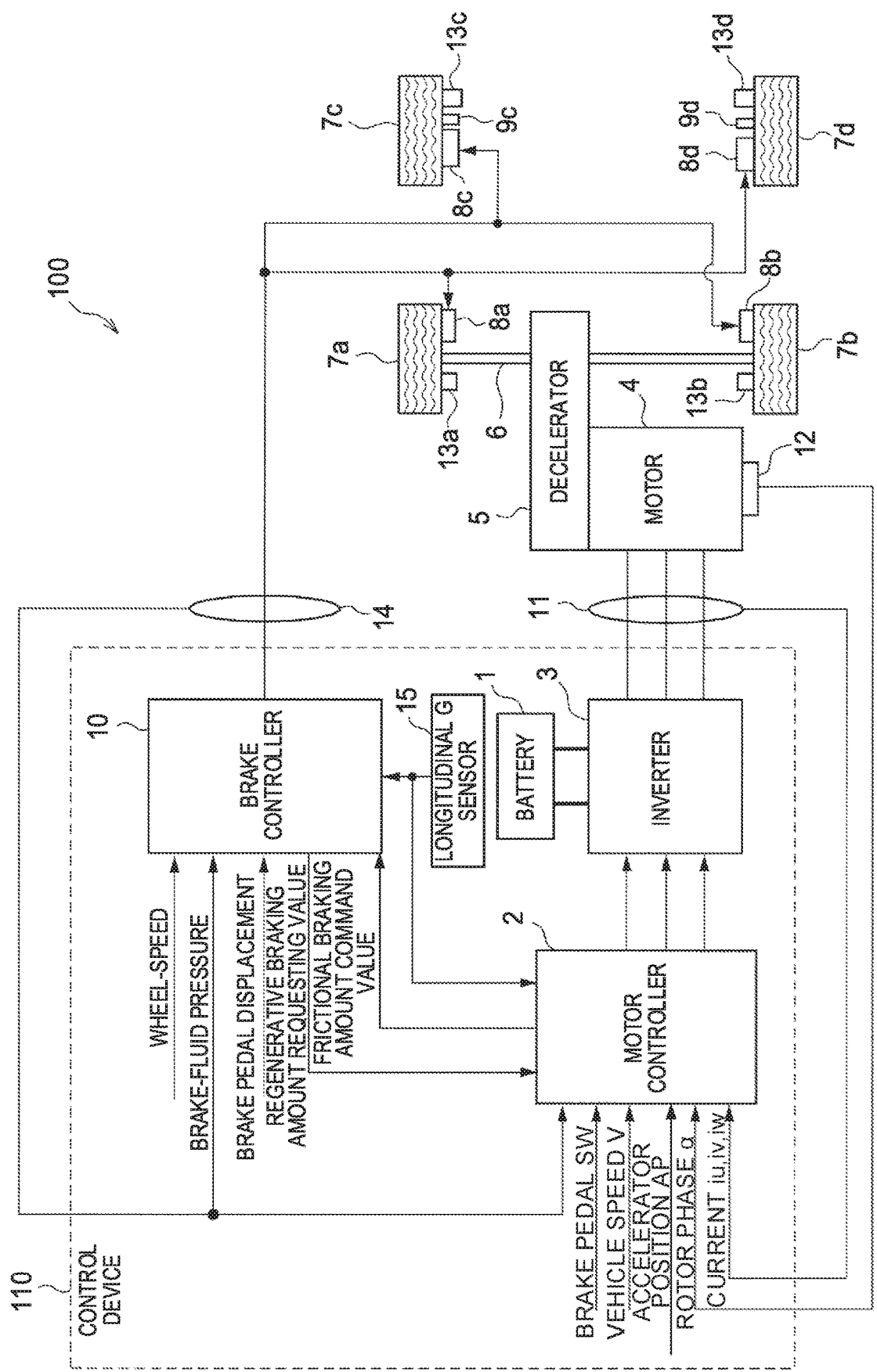
FIG. 1 shows the configuration of a control device to control a vehicle according to a first embodiment of the present invention.

FIG. 1 is a block diagram showing the major configuration of an electric vehicle 100 including a control device according to a first embodiment of the present invention.

The electric vehicle 100 includes an electric motor as a driving source. The electric vehicle 100 of the first embodiment allows a driver to control the acceleration or deceleration and the stop of the electric vehicle 100 by adjusting the depression amount of an accelerator pedal. To accelerate the electric vehicle 100, the driver depresses the accelerator pedal down. To decelerate or stop the electric vehicle 100, the driver reduces the depression amount of the accelerator pedal or adjusts the depression amount of the accelerator pedal to zero.

The electric vehicle 100 includes a motor 4, a decelerator 5, a drive shaft 6, driving wheels 7a and 7b, driven wheels 7c and 7d, friction brakes 8a and 8d, parking brakes 9c and 9d, a current sensor 11, a rotation sensor 12, a wheel-speed sensor 13a to 13d, a fluid-pressure sensor 14, and a control device 110.

The control device 110 controls the operation of the electric vehicle 100. The control device 110 includes a programmable central processing unit (CPU) and a memory connecting to the CPU. The CPU includes internal memories, such as a read only memory (ROM) and a random access memory (RAM) to store a control program, a program specifying various types of procedure, such as vehicle-speed control processing, and other required data. These programs implement various means of the electric vehicle 100. The control device 110 includes a battery 1, a motor controller 2, an inverter 3, a brake controller 10, and a longitudinal G sensor 15.

The battery 1 is an electric power source to supply electricity to the motor 4 as an electric motor. In one example, the battery 1 includes a lead battery or a lithium ion battery.

The motor controller 2 makes up a control device to control the operating state of the electric vehicle 100. The motor controller 2 includes a microcomputer including a central processing unit (CPU) and an input/output interface (I/O interface). The motor controller 2 provides a brake torque to the electric vehicle 100 via the motor 4, for example, in accordance with the operating state of the electric vehicle 100.

The motor controller 2 receives signals indicating the vehicle state as an input, such as the vehicle speed V, the accelerator position (or the accelerator opening degree) AP, the rotor phase α of the motor 4, and the currents iu, iv, iw supplied to the motor 4. The motor controller 2 then generates a PWM (Pulse Width Modulation) signal to control the operation of the motor 4 based on the input signals, and creates a driving signal for the inverter 3 in accordance with the generated PWM signal. The motor controller 2 also generates a frictional braking amount command value by the method described later.

The inverter 3 includes two switching elements (e.g., power semiconductor devices, such as IGBT and MOS-FET) corresponding to the phases of the motor 4. The inverter 3 turns each switching element on/off in accordance with the PWM signal generated by the motor controller 2. This converts the DC current supplied from the battery 1 to the motor 4 to AC current, so that a desired current is supplied to the motor 4.

The motor 4 is an electric motor to provide a driving force and a braking force to the electric vehicle 100. In one example, a three-phase AC motor implements the motor. The motor 4 generates a driving force while receiving the AC current from the inverter 3 and transmits the driving force to the left and right driving wheels 9a and 9b via the decelerator 5 and the drive shaft 6.

While rotating following the rotation of the driving wheels 9a, 9b during the travel of the electric vehicle 100, the motor 4 generates a regenerative drive force. The inverter 3 converts the AC current generated by the regenerative driving force of the motor 4 to a DC current and supplies the DC current to the battery 1. That is, the motor 4 converts the kinetic energy of the electric vehicle 100 into the electric energy, and the battery 1 is charged with the electric energy. In this way, the battery 1 collects the kinetic energy.

The driving wheels 7a and 7b transmit the driving force to the road surface during the driving of the electric vehicle 100. The driven wheels 7c and 7d are driven by the driving wheels 7a and 7b of the electric vehicle 100. The following refers to these driving wheels 7a and 7b and driven wheels 7c and 7d as wheels.

The friction brakes 8a to 8d make up a frictional braking mechanism to provide a friction brake force to the electric vehicle 100. The friction brakes 8a to 8d of the first embodiment are configured so as to generate a friction brake force (friction torque) when the regenerative braking force of the motor 4 exceeds the upper limit of or when the motor 4 fails to supply the brake torque due to the charging state of the battery 1 and the slipping state of the driving wheels 7a and 7b.

The friction brakes 8a and 8b are disposed at the left and right driving wheels 7a and 7b, and the friction brakes 8c and 8d are disposed at the left and right driven wheels 7c and 7d. To provide a friction brake force to the electric vehicle 100, each of the friction brakes 8a to 8d presses the brake pad of the corresponding wheel (7a to 7d) against the brake rotor with the pressure of fluid supplied to the friction brake itself, called a brake-fluid pressure. In the first embodiment, brake oil is used as the fluid to be supplied to the friction brakes 8a to 8d.

The parking brakes 9c and 9d make up a frictional braking mechanism to provide a friction brake force to the electric vehicle 100. The parking brakes 9c and 9d provide a friction brake force to the driven wheels 7c and 7d to keep the electric vehicle 100 stopping, i.e., in the parking state. In one example, a friction brake of a drum type or a wire type may implement the parking brakes 9c and 9d. In one example, when the driver pulls the parking lever of the electric vehicle 100, the parking brakes 9c and 9d act to shift the vehicle to the parking state.

The current sensor 11 detects the three-phase AC currents iu, iv and iw that the inverter 3 supplies to the motor 4. Note that since the sum of the three-phase AC currents iu, iv and iw is 0, the currents of any two phases may be detected and the current of the remaining one phase may be obtained by calculation.

The rotation sensor 12 detects the rotor phase α of the motor 4. In one example, the rotation sensor 12 includes a resolver and an encoder.

The wheel-speed sensors 13a to 13d detect the rotation speed of the wheels including the driving wheels 7a and 7b and the driven wheels 7c and 7d, respectively.

The fluid-pressure sensor 14 detects the brake-fluid pressure that is the pressure of the oil supplied to the friction brakes 8a to 8d.

The longitudinal G sensor 15 detects the longitudinal G that is the longitudinal acceleration relative to the traveling direction of the electric vehicle 100.

The brake controller 10 together with the motor controller 2 makes up a control device of the electric vehicle 100. The brake controller 10 calculates a required brake force (required brake toque) based on the displacements of the accelerator pedal and the brake pedal. The brake controller 10 then assigns the required brake force to a regenerative brake force and a friction brake force in accordance with the vehicle state, such as the vehicle speed V, the regenerative braking force, the slipping state, understeer and oversteer.

The brake controller 10 controls the brake-fluid pressure of the friction brakes 8a to 8d in accordance with the frictional braking amount command value calculated by the motor controller 2. The brake controller 10 feedback-controls so that the brake-fluid pressure detected by the fluid-pressure sensor 14 follows the value determined in accordance with the frictional braking amount command value.

Figure 2:
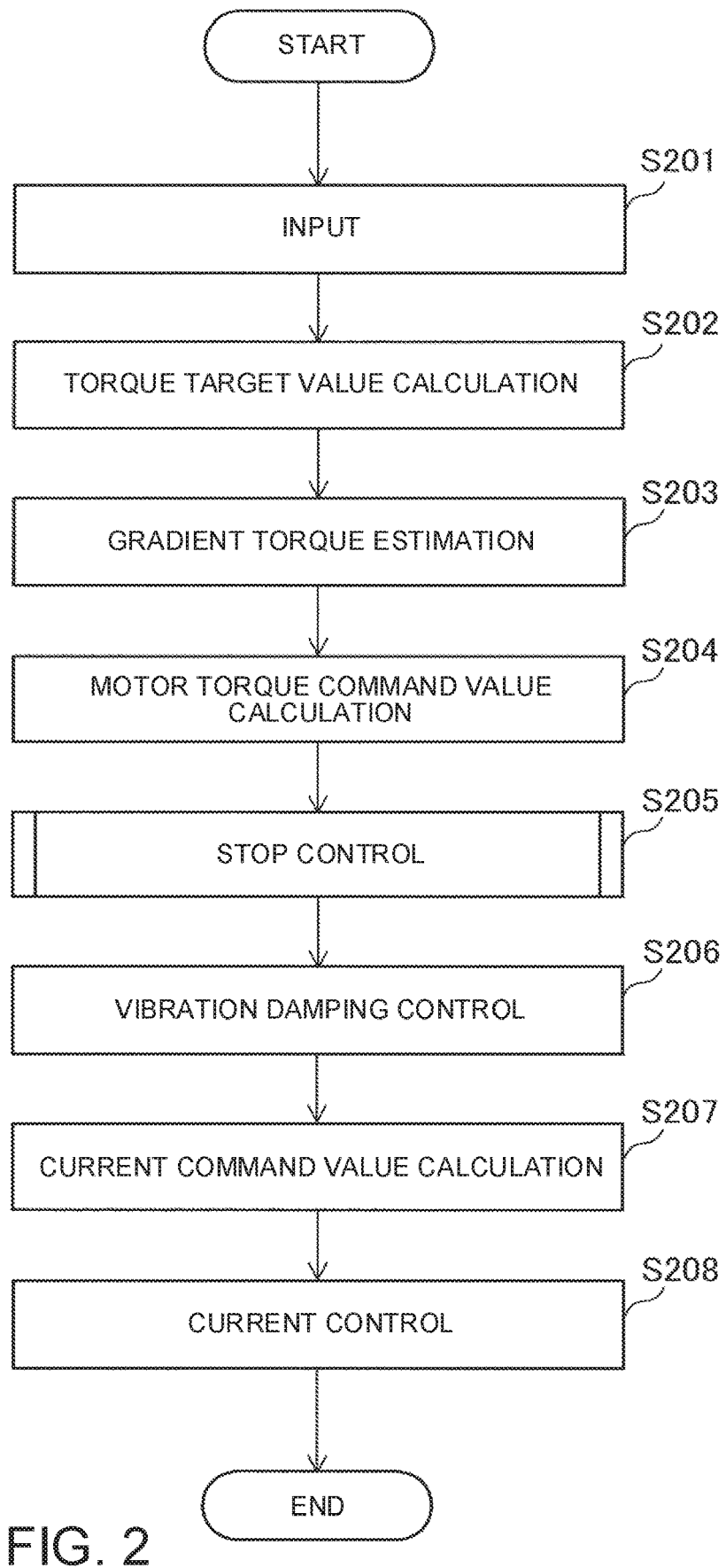
FIG. 2 is a flowchart showing an example of the method for controlling a vehicle in the first embodiment.

FIG. 2 is a flowchart showing an example of the procedure of the motor control processing executed by the motor controller 2.

At step S201, the motor controller 2 receives a vehicle-state signal indicating the state of the electric vehicle 100 as an input. In this example, the motor controller receives, as the vehicle-state signals, the vehicle speed V (m/s), the accelerator position AP (%), the rotor phase α (rad) of the motor 4, the motor rotation speed wm (rpm/s), the three-phase AC currents iu, iv, iw, the DC voltage value of the battery 1 Vdc (V), the frictional braking amount estimated value B, and the brake pedal SW.

The vehicle speed V (m/s) is the wheel speed of the driving wheels 7a and 7b and the driven wheels 7c and 7d. The vehicle speed V is obtained from a vehicle-speed sensor not illustrated or from another controller via communication. Alternatively, the vehicle speed V (km/h) is obtained by multiplying the motor rotation speed (rotator mechanical angular velocity) wm by a tire dynamic radius r and dividing the product by a gear ratio of the final gear.

The accelerator position AP (%) is a parameter indicating the displacement of the accelerator pedal, and is obtained from an accelerator position sensor not illustrated. Alternatively the accelerator position AP is obtained from another controller, such as a vehicle controller not illustrated, via communication.

The rotator phase α (rad) of the motor 4 is obtained from the rotation sensor 12. The rotation speed Nm (rpm) of the motor 4 is calculated by dividing a rotator angular velocity ω (electric angle) by a pole pair number p of the motor 4 to obtain a motor rotation speed wm (rad/s) (speed parameter), which is a mechanical angular velocity of the motor 4, and multiplying the obtained motor rotation speed ωm by 60/(2π). The rotator angular velocity ω is calculated by differentiating the rotator phase α.

The three-phase AC currents iu, iv and iw (A) are obtained from the current sensor 11.

The DC voltage value Vdc (V) is obtained from a voltage sensor (not illustrated) disposed in a DC power-supply line connecting the battery 1 and the inverter 3. The DC voltage value Vdc (V) may be obtained from a power-supply voltage value transmitted from a battery controller (not illustrated).

The frictional braking amount estimated value B is obtained based on the brake-fluid pressure, which is obtained by the fluid-pressure sensor 14. Alternatively a detected value by a stroke sensor (not illustrated) to detect the depression amount of the brake pedal by the driver may be used for the frictional braking amount estimated value B. Alternatively, a frictional braking amount command value generated by the motor controller 2 or another controller may be obtained via communication, and the obtained frictional braking amount command value may be used as the frictional braking amount estimated value B.

The brake pedal SW is a switch signal to determine whether the driver performs the depression of the brake pedal, i.e., the braking operation or not. The brake pedal SW is obtained from a brake switch (not illustrated) attached to the brake pedal. The brake pedal SW=1 indicates that the driver is operating the brake pedal, and the brake pedal SW=0 indicates that the driver is not operating the brake pedal.

At step S202, the motor controller 2 performs torque target value calculation processing.

Figure 3:
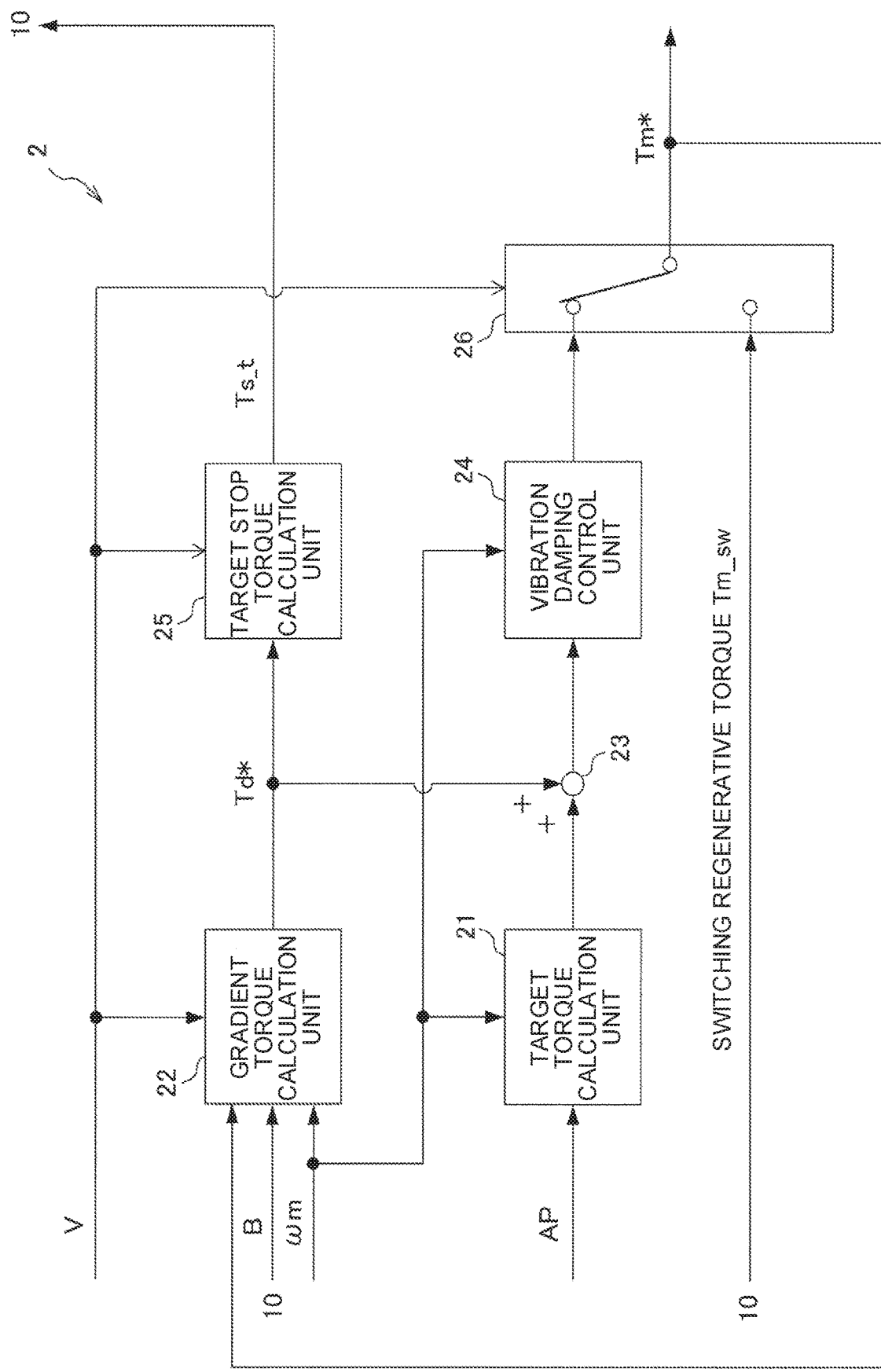
FIG. 3 is a block diagram showing one example of the functional configuration of a motor controller to make up the control device of the first embodiment.

More specifically the motor controller 2 sets a torque target value Tm_t while referring to a predetermined calculation table based on the accelerator position AP and the motor rotation speed ωm input at step S201. FIG. 3 shows an accelerator position-torque table as an example of the calculation table.

At step S203, the motor controller 2 performs gradient torque estimation processing based on the motor rotation speed ωm and the torque target value Tm_t.

More specifically the motor controller 2 calculates a gradient torque estimated value Td* to drive the motor 4 in the direction of cancelling the gradient resistance acting on the electric vehicle 100 based on a disturbance observer in accordance with the motor rotation speed ωm and the torque target value Tm_t. The disturbance observer is configured using a vehicle model that shows a model operation of the electric vehicle 100. The vehicle model is obtained by equations of the motion.

The motor controller 2 then converts a friction brake force that the friction brakes 8a to 8d provide the electric vehicle 100 into the torque of the motor 4 to obtain a friction torque, and subtracts the obtained friction torque from the gradient torque estimated value Td* to calculate a new gradient torque estimated value Td*.

The gradient torque estimated value Td* varies with disturbances, such as a modeling error of the electric vehicle 100, air resistance and gradient resistance acting on the electric vehicle 100 and rolling resistance of the tires. Among these factors, the dominant component for the gradient torque estimated value Td is the gradient resistance. The gradient torque estimated value Td therefore has a positive value on uphill roads, has a negative value on downhill roads, and is substantially 0 on flat roads.

The modeling error increases with increase in the number of passengers and the amount of luggage on the electric vehicle 100, for example, because the weight of the electric vehicle 100 greatly differs between the setting value set for the vehicle model and the actual value. The details of the gradient torque estimation processing are described later.

At step S204, the motor controller 2 performs motor torque command value calculation processing.

More specifically the motor controller 2 adds the gradient torque estimated value Td* calculated at step S203 to the torque target value Tm_t calculated at step S202, and sets the sum as a motor torque command value Tm* that indicates the torque command value of the motor 4.

Such addition of the gradient torque estimated value Td* to the torque target value Tm_t enables the cancellation of the gradient resistance acting on the electric vehicle 100. This therefore generates the motor torque Tm meeting the driver's demand.

For example, for the electric vehicle 100 on an uphill road, the motor torque command value Tm* includes a motor torque added to cancel the force from the gravity to return the electric vehicle 100 against the travelling direction. This enables the driver to reduce additional depression operation to the accelerator pedal.

For the electric vehicle 100 on a downhill road, the motor torque command value Tm* includes a motor torque added to cancel the excessive force from gravity in the travelling direction of the electric vehicle 100. This reduces the number of driver's operation to change the steps from the accelerator pedal to the brake pedal.

At step S205, the motor controller 2 performs stop control processing to smoothly stop the electric vehicle 100.

To stop the electric vehicle 100, the motor controller 2 of the first embodiment changes the brake force provided to the electric vehicle 100 from the regenerative brake force of the motor 4 to the friction brake force of the friction brakes 8a to 8d.

More specifically the motor controller 2 determines whether the electric vehicle 100 stops or not, i.e., whether the electric vehicle 100 is just before stop or not. For example, when the vehicle speed V falls below a vehicle-stop threshold, the motor controller 2 determines that the electric vehicle 100 is just before stop.

This vehicle-stop threshold is set at a lower-limit value in the range where the vehicle speed of the electric vehicle 100 can be detected precisely. This enables the stop control processing just before the stop. In one example, when the vehicle-speed sensor has the minimum reading of the speed of 5 km (kph) an hour, the vehicle-stop threshold is set at the speed of 5 km an hour. The regenerative brake force is more precisely controllable than the friction brake force, and so a smaller vehicle-stop threshold and the regenerative brake force allow a long time to be kept for braking of the electric vehicle 100. This therefore suppresses a decrease in the precision of controlling the brake force.

When the motor controller 2 determines that the electric vehicle 100 is just before the stop, the motor controller 2 controls the operation of the friction brakes 8a to 8d so that the friction brake force of the friction brakes 8a to 8d reaches the brake force determined in accordance with the gradient torque estimated value Td*.

The motor controller 2 of the first embodiment calculates a target stop torque in accordance with the gradient torque estimated value Td*, and outputs the calculated target stop torque as the frictional braking amount command value to the brake controller 10. The target stop torque in this case is set at the value so as to stop the vehicle reliably while suppressing the slipping down (the movement) of the electric vehicle 100 due to the gradient of the road surface.

For example, the target stop torque may be calculated by adding a predetermined additional brake torque in association with the gradient torque estimated value Td*. Such an additional brake torque is determined while considering a calculation error of the gradient torque estimated value Td and a temperature change of the oil supplied to the friction brakes 8a to 8d, for example.

More specifically the friction brake force generated by the friction brakes 8a to 8d varies with the temperature of the oil of the friction brakes 8a to 8d, and the additional brake torque therefore is determined while considering a decrease amount of the friction brake force due to such a temperature change of the oil in the friction brakes 8a to 8d. A temperature sensor may be disposed around the friction brakes 8a to 8d, and the additional brake torque may be changed in accordance with a detection value of the temperature sensor.

Note here that a larger additional brake torque lengthens the time necessary to lower the oil pressure of the friction brakes 8a to 8d to start driving of the electric vehicle 100. To avoid this, the additional brake torque is set so as not to exceed the upper-limit value of the friction torque that enables a quick starting of the electric vehicle 100.

In this way, the target stop torque is added in accordance with the gradient torque estimated value Td*, whereby the motor controller stops the electric vehicle 100 reliably so as not to interfere with smooth starting of the electric vehicle 100.

To stop the electric vehicle 100, the friction brakes 8a to 8d have to provide the friction brake force to the wheels speedily. To this end, the brake controller 10 sets a friction initial torque corresponding to the oil pressure to be supplied firstly to the friction brakes 8a to 8d. Such a friction initial torque may be determined beforehand based on a simulation result and experimental data, for example.

The brake controller 10 of the first embodiment sets an actual value of the regenerative brake torque generated at the motor 4 as the friction initial torque. More specifically the motor controller 2 estimates a regenerative torque of the motor 4 based on the three-phase AC currents iu, iv, and iw and outputs the estimated torque to the brake controller 10. The brake controller 10 obtains the estimated value of the regenerative torque as the friction initial torque.

After obtaining the friction initial torque, the brake controller 10 increases the pressure of the oil supplied to each of the friction brakes 8a to 8d so that the friction torque generated at each wheel reaches the friction initial torque.

Next the brake controller 10 increases the pressure of the oil supplied to each of the friction brakes 8a to 8d so that the friction torque that the friction brakes 8a to 8d provide to the wheels increases from the friction initial torque to the target stop torque.

While the friction torque generated at each wheel reaches the target stop torque from the friction initial torque, the brake controller 10 of the first embodiment controls the pressure-rising rate of the oil supplied to the friction brakes 8a to 8d so as to suppress the longitudinal G of the electric vehicle 100. A method for controlling the pressure-rising rate of the friction brakes 8a to 8d will be described later.

When increasing the pressure of the oil supplied to the friction brakes 8a to 8d, the brake controller 10 calculates the motor torque command value Tm* so that the regenerative brake force of the motor 4 gradually decreases. In one example, the brake controller 10 calculates the motor torque command value Tm* in accordance with a predetermined map or arithmetic equation. The brake controller 10 then outputs the calculated motor torque command value Tm* as a regenerative braking amount requesting value RBr to the motor controller 2.

When the motor controller 2 determines that the electric vehicle 100 is not just before stop, the motor controller 2 then performs vibration damping control processing at step S206.

More specifically the motor controller 2 performs the vibration damping control processing to the motor torque command value Tm* based on the motor torque command value Tm* calculated at step S204 and the motor rotation speed ωm. The resultant motor torque command value Tm* enables suppression of the vibration of a torque transfer system, such as a torsional vibration of the drive shaft 6, without sacrificing the response of a drive shaft torque in the electric vehicle 100. The details of the vibration damping control processing are described later.

At step S207, the motor controller 2 performs current command value calculation processing.

The motor controller 2 calculates a d-q axis current target value based on the motor torque command value Tm* calculated at step S205 or the motor torque command value Tm* output from the brake controller 10 at step S204.

More specifically the motor controller 2 obtains a d-axis current target value id* and a q-axis current target value iq* based on the motor torque command value Tm* as well as the motor rotation speed ωm and the DC voltage value Vdc.

For instance, the motor controller 2 has a current table recorded beforehand. The current table specifies the relationship of the d-axis current target value id* and the q-axis current target value iq* with the motor torque command value Tm*, the motor rotation speed ωm, and the DC voltage value Vdc. When obtaining the motor torque command value Tm*, the motor rotation speed ωm, and the DC voltage value Vdc, the motor controller 2 refers to the current table to obtain the d-axis current target value id* and the q-axis current target value iq*.

At step S208, the motor controller 2 performs current control processing to control the switching operation of the inverter 3 so that a d-axis current id and a q-axis current iq match with (are converged to) the d-axis current target value id* and the q-axis current target value iq* obtained at step S206, respectively.

More specifically the motor controller 2 estimates the d-axis current id and the q-axis current iq supplied to the motor 4 based on the three-phase AC currents iu, iv and iw and the rotator phase α of the motor 4 input at Step S201. Subsequently the motor controller 2 calculates a d-axis voltage command value vd* from a deviation between the d-axis current id and the d-axis current target value id* and a q-axis voltage command value vq* from a deviation between the estimated q-axis current iq and the q-axis current target value iq*.

Then the motor controller 2 obtains three-phase AC voltage command values vu*, vv*, and vw* from the d-axis voltage command value vd*, the q-axis voltage command values vq* and the rotator phase α of the motor 4. Subsequently the motor controller 2 generates PWM signals tu (%), tv (%), and tw (%) from the obtained three-phase AC voltage command values vu*, vv*, and vw* and the DC voltage value Vdc and supplies the generated PWM signals tu, tv and tw to the inverter 3.

The switching elements in the inverter 3 turn on and off in accordance with the PWM signals tu, tv and tw, and so the motor 4 is rotary-driven so that the torque generated at the motor 4 is converged to the motor torque command value Tm*.

The following describes the configuration of the motor controller 2 of the first embodiment.

FIG. 3 is a block diagram showing an example of the functional configuration of the motor controller 2 of the first embodiment.

The motor controller 2 includes a target torque calculation unit 21, a gradient torque calculation unit 22, a command torque calculation unit 23, a vibration damping control unit 24, a target stop torque calculation unit 25, and a stop control switching unit 26.

Figure 4:
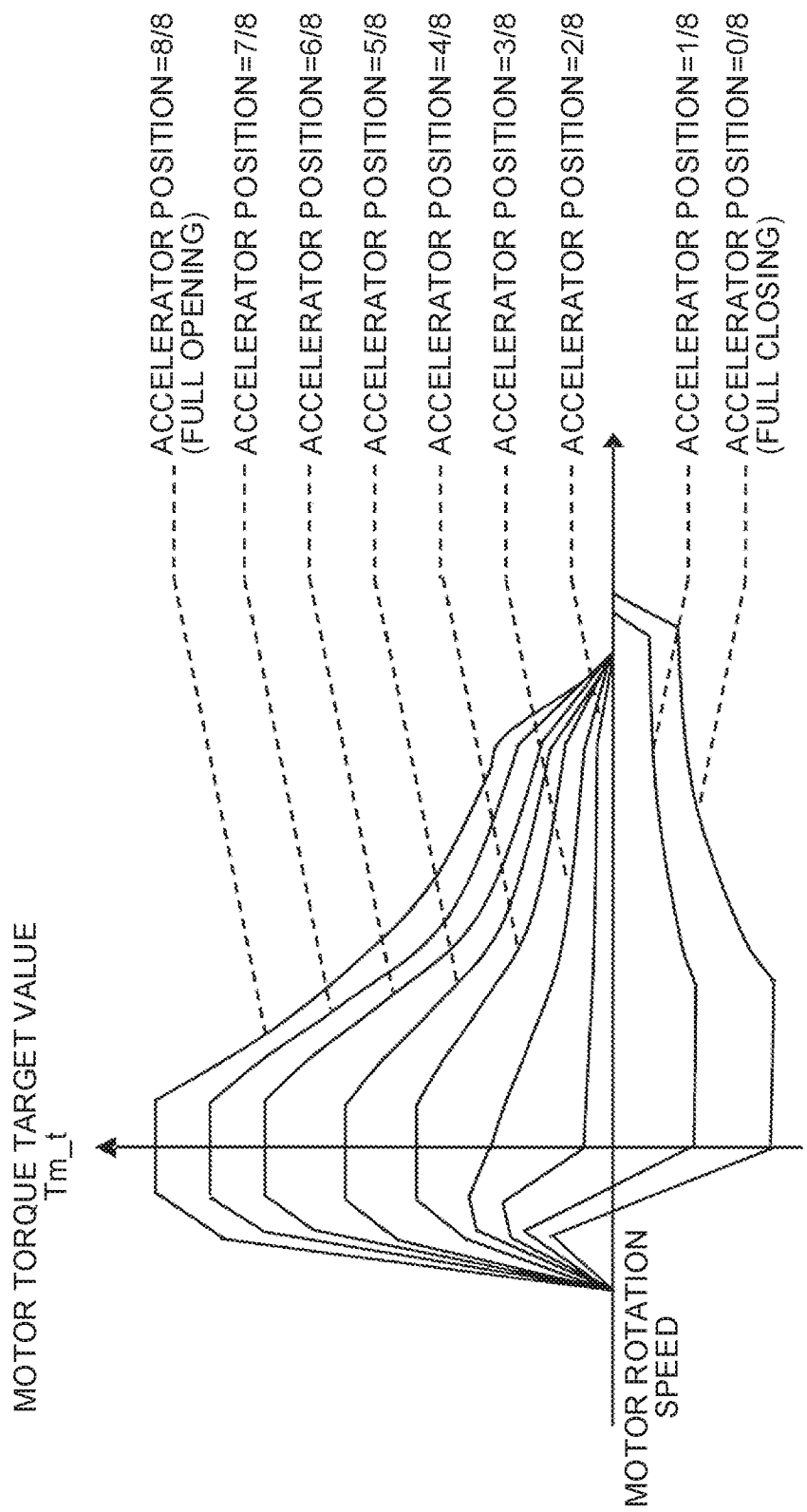
FIG. 4 is a map showing the relationship between the torque target values and the rotation speeds of the motor for each accelerator position.

The target torque calculation unit 21 performs the torque target value calculation processing described at step S202 of FIG. 2. As stated above, the target torque calculation unit 21 obtains the accelerator position AP and the motor rotation speed ωm, and then refers to the map shown in FIG. 4 to calculate a torque target value Tm_t in association with the obtained parameters.

The gradient torque calculation unit 22 performs the gradient torque estimation processing described at step S203 of FIG. 2. As stated above, the gradient torque calculation unit 22 calculates the gradient torque estimated value Td* based on the motor torque command value Tm*, the frictional braking amount estimated value B, the motor rotation speed ωm, and the vehicle speed V. A configuration example of the gradient torque calculation unit 22 will be described later with reference to FIG. 6.

The command torque calculation unit 23 calculates the motor torque command value Tm* based on the gradient torque estimated value Td* and the torque target value Tm_t. The command torque calculation unit 23 of the first embodiment calculates the motor torque command value Tm* by adding the gradient torque estimated value Td* to the torque target value Tm_t.

The command torque calculation unit 23 may correct the gradient torque estimated value Td* based on whether the road is an uphill road or a downhill road, and may add the corrected gradient torque estimated value Td* to the torque target value Tm_t. This reduces uncomfortable feeling of the driver when the driver stops the vehicle on the sloping road surface.

As described at step S206 of FIG. 2, the vibration damping control unit 24 performs the vibration damping control processing based on the motor torque command value Tm* and the motor rotation speed ωm. A configuration example of the vibration damping control unit 24 will be described later with reference to FIG. 7.

As described at step S205 of FIG. 2, the target stop torque calculation unit 25 calculates a target stop torque Ts_t based on the gradient torque estimated value Td*. A configuration example of the target stop torque calculation unit 25 will be described later with reference to FIG. 8.

As described at step S205 of FIG. 2, the stop control switching unit 26 sets a switching regenerative torque Tm_sw, which is used for switching from the regenerative torque to the friction torque when the electric vehicle 100 stops, as the motor torque command value Tm*. The stop control switching unit 26 obtains a motor torque command value Tm* indicating the switching regenerative torque Tm_sw as a regenerative braking amount requesting value RBr from the brake controller 10.

When the vehicle speed V is less than a predetermined vehicle-stop threshold, the stop control switching unit 26 of the first embodiment changes the motor torque command value Tm* from the output value of the vibration damping control unit 24 to the switching regenerative torque Tm_sw.

<Stop Control Processing>

Next the following describes the method of deriving a gradient torque estimated value Td* at step S203, with reference to the drawings.

Figure 5:
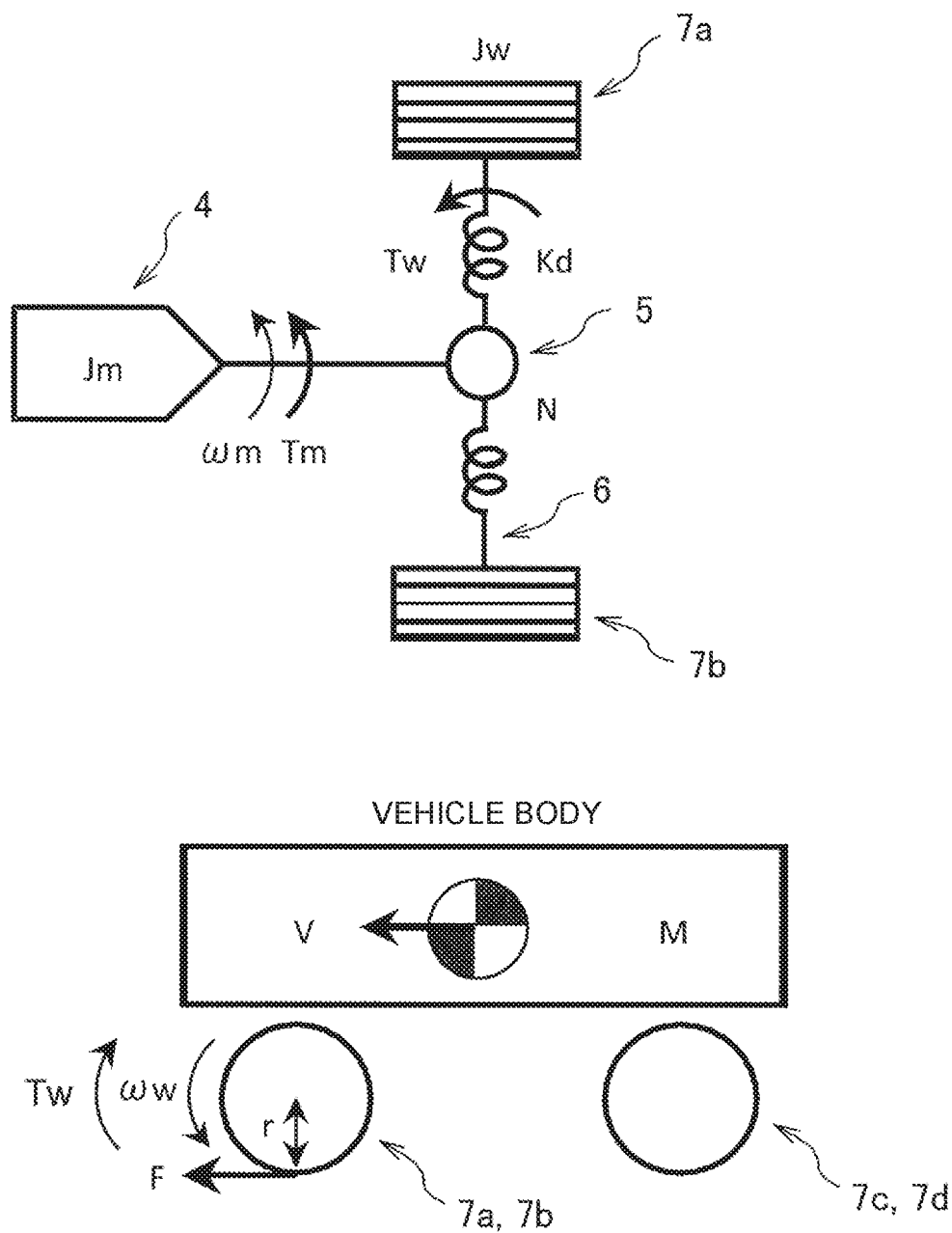
FIG. 5 describes transfer characteristic from the motor torque to the motor rotation speed.

FIG. 5 describes transfer characteristic Gp(s) from the motor torque Tm that is a torque generated at the motor 4 to the motor rotation speed ωm.

FIG. 5 shows a vehicle model of a drive force transfer system of the electric vehicle 100. Parameters used for this vehicle model are as follows.

Jm: inertia of the motor 4
Jw: inertia of driving wheels
M: weight of the electric vehicle 100
Kd: torsional rigidity of the drive system
Kt: coefficient relative to the friction between tires and road surface
N: overall gear ratio
r: load radius of tires
ωm: motor rotation speed
Tm: motor torque
Tw: torque of driving wheels
F: force applied to the electric vehicle 100
V: speed of the electric vehicle 100
ωw: angular velocity of driving wheels
Tf: frictional braking amount (motor-shaft conversion torque) (≥0)

The following equations of motion can be derived from the vehicle model shown in FIG. 5.

[Equation 1]

$$J_m \cdot \omega_m^* = T_m - T_d/N \quad (1)$$

[Equation 2]

$$2J_w \cdot \omega_w^* = T_d - rF \quad (2)$$

[Equation 3]

$$M \cdot V^* = F \quad (3)$$

[Equation 4]

$$T_d = K_d \int (\omega_m/N - \omega_w) dt \quad (4)$$

[Equation 5]

$$F = K_t \cdot (r\omega_w - V) \quad (5)$$

Note that the asterisks (*) attached to the right-upper corners of the symbols in the equations (1) to (3) indicate a time differential.

The following Equation (6) represents the transfer characteristic Gp(s) from the motor torque Tm input to the electric vehicle 100 to the motor rotation speed ωm, which are obtained based on Equations of motion (1) to (5). In the following descriptions, the transfer characteristics Gp(s) derived from the above vehicle model are referred to as a vehicle model Gp(s).

[Equation 6]

$$G_p(s) = \frac{b_3 s^3 + b_2 s^3 + b_1 s + b_0}{s(a_4 s^3 + a_3 s^2 + a_2 s + a_1)} \quad (6)$$

Each parameter in Equation (6) is expressed by the following Equation (7).

[Equation 7]

$$a_4 = 2J_m J_w M$$

$$a_3 = J_m (2J_w + Mr^2) K_t$$

$$a_2 = (J_m + 2J_w/N^2) M \cdot K_d$$

$$a_1 = (J_m + 2J_w/N^{-2} + Mr^2/N^2) K_d \cdot K_t$$

$$b_3 = 2J_w \cdot M$$

$$b_2 = (2J_w + Mr^2) K_t$$

$$b_1 = M \cdot K_d$$

$$b_0 = K_d \cdot K_t \quad (7)$$

Examinations on the poles and zero point of a transfer function shown in Equation (6) enable the approximation to a transfer function of the following Equation (8), and one pole and one zero point indicate values extremely close to each other. This means that α and β of the following Equation (8) indicate values extremely close to each other.

[Equation 8]

$$G_p(s) = \frac{(s+\beta)(b_2' s^2 + b_1' s + b_0')}{s(s+\alpha)(a_3' s^2 + a_2' s + a_1')} \quad (8)$$

Pole-zero cancellation to approximate that α=β in Equation (8) therefore allows Gp(s) to constitute a transfer characteristic of (second order)/(third order) as shown in the following Equation (9).

[Equation 9]

$$G_p(s) = \frac{(b_2' s^2 + b_1' s + b_0')}{s(a_3' s^2 + a_2' s + a_1')} \cdot \frac{\beta}{2} \quad (9)$$

For combination use of the vibration damping control processing at step S205, an algorithm of the vibration damping control may be applied so that the vehicle model Gp(s) can be considered as the vehicle model Gr(s) indicating the vehicle responsiveness when the vibration damping control processing is performed as shown in the following Equation (10).

[Equation 10]

$$G_r(s) = \frac{(s^2 + 2\xi_z \cdot \omega_z \cdot s + \omega_z^2)}{s(s^2 + 2\omega_p \cdot s + \omega_p^2)} \quad (10)$$

Note here that the vibration damping control processing may be the processing described in JP 2001-45613, the contents of which are hereby incorporated herein in their entirety, or may be the processing described in JP 2002-152916, the contents of which are hereby incorporated herein in their entirety.

Next, the following describes the details of the stop control processing performed at step S205 with reference to FIG. 6 to FIG. 9.

Figure 6:
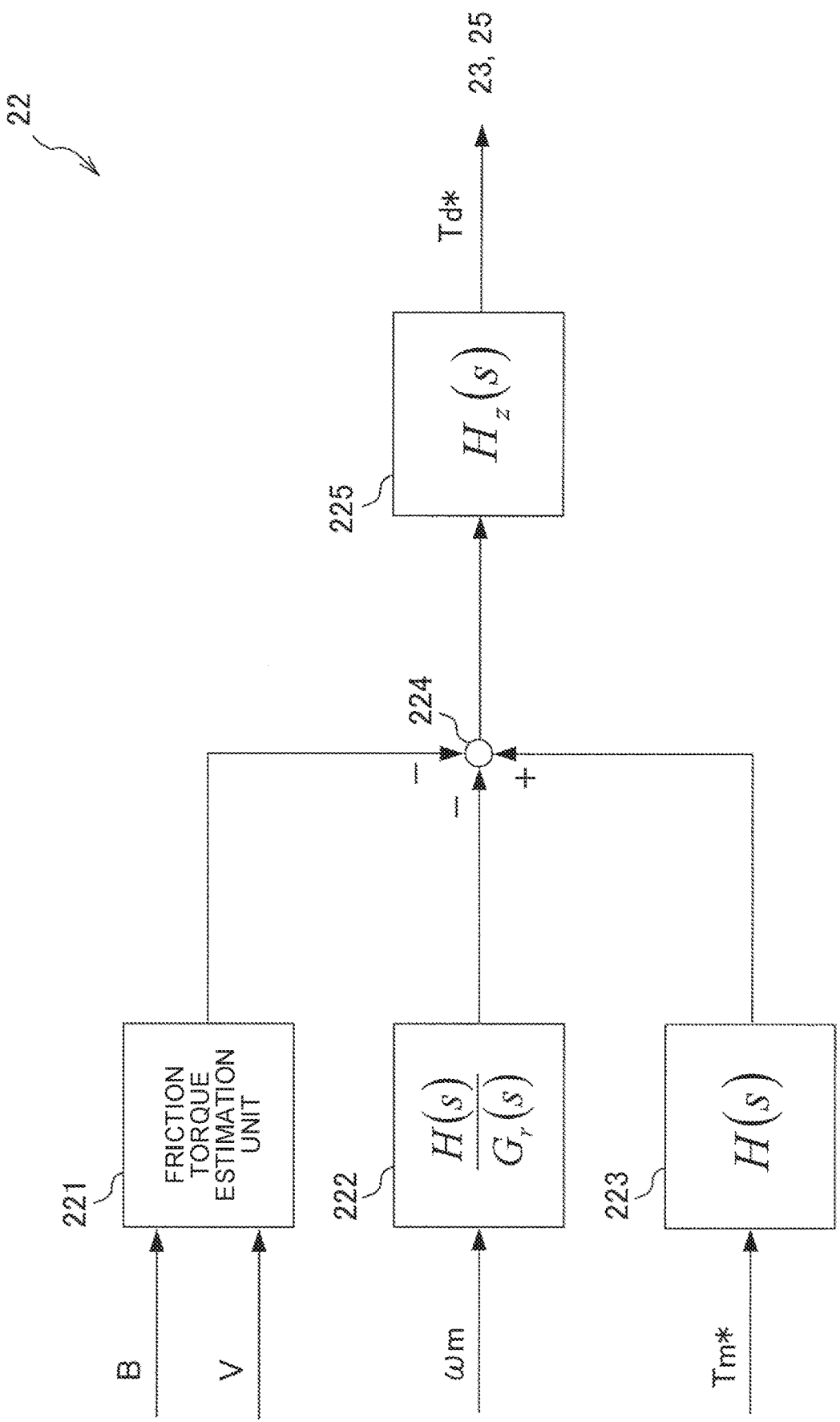
FIG. 6 is a block diagram showing one example of the configuration of a gradient torque calculation unit to calculate the gradient torque to cancel the force acting on the vehicle due to the gradient of the road surface.

FIG. 6 is a block diagram showing the functional configuration of the gradient torque calculation unit 22 to calculate a gradient torque estimated value Td*.

The gradient torque calculation unit 22 includes a friction torque estimation unit 221, a control block 222, a control block 223, a calculation unit 224 and a control block 225.

The friction torque estimation unit 221 calculates a friction torque estimated value based on the frictional braking amount estimated value B and the vehicle speed V. The friction torque estimation unit 221 considers the multiplying operation to convert the frictional braking amount estimated value B to the torque of the motor shaft and the responsiveness from the value detected by the fluid-pressure sensor 14 to the actual braking force to calculate the frictional braking amount estimated value B.

The control block 222 has a function as a filter having a transfer characteristic of H(s)/Gr(s), and performs filtering to the motor rotation speed ωm so as to calculate a first motor torque estimated value. This first motor torque estimated value is a current motor torque that is estimated from the motor rotation speed ωm.

The transfer characteristic H(s) as stated above is a low-pass filter having a transfer characteristic such that a difference between the denominator degree and the numerator degree is equal to or more than the difference between the denominator degree and the numerator degree of the vehicle model Gr(s). This Gr(s) is a transfer characteristic shown in Equation (10) from the motor torque Tm to the motor rotation speed ωm when the vibration damping control processing is performed.

The control block 223 has a function as a low-pass filter having a transfer characteristic of H(s), and performs filtering to the motor torque command value Tm* so as to calculate a second motor torque estimated value. This second motor torque estimated value is estimated from the motor torque command value Tm*.

The calculation unit 224 calculates a torque deviation by subtracting the first motor torque estimated value from the second motor torque estimated value, and subtracts the friction torque estimated value from such a deviation. Then the calculation unit 224 outputs the obtained value to the control block 225. In this way, to obtain a motor torque required to cancel the force acting on the electric vehicle 100 due to the gradient of the road surface, the calculation unit 224 calculates a difference of the actual value relative to the command value of the motor torque. To this end, the calculation unit 224 removes a friction torque component included in the difference.

The control block 225 is a filter having has a transfer characteristic of Hz(s), and performs filtering to the output from the calculation unit 224 so as to calculate a gradient torque estimated value Td*.

The following describes the transfer characteristic Hz(s). Modification of Equation (10) as stated above leads to the following Equation (11). In Equation (11), ζz, ωz, and ωp are expressed by Equation (12).

[Equation 11]

$$G_r(s) = Mp \frac{(s^2 + 2\xi_z \cdot \omega_z \cdot s + \omega_z^2)}{s(s^2 + 2\omega_p \cdot s + \omega_p^2)} \quad (11)$$

[Equation 12]

$$\xi_z = \frac{b_1'}{2(b_0' \cdot b_2')^{1/2}} \quad (12)$$

$$\omega_z = \left(\frac{b_0'}{b_2'}\right)^{1/2}$$

$$\omega_p = \left(\frac{a_1'}{a_3'}\right)^{1/2}$$

From the above, the transfer characteristic Hz(s) is represented by the following Equation (13).

[Equation 13]

$$H_z(s) = \frac{(s^2 + 2\xi_z \cdot \omega_z \cdot s + \omega_z^2)}{(s^2 + 2\xi_c \cdot \omega_z \cdot s + \omega_z^2)} \quad (13)$$

Figure 11:
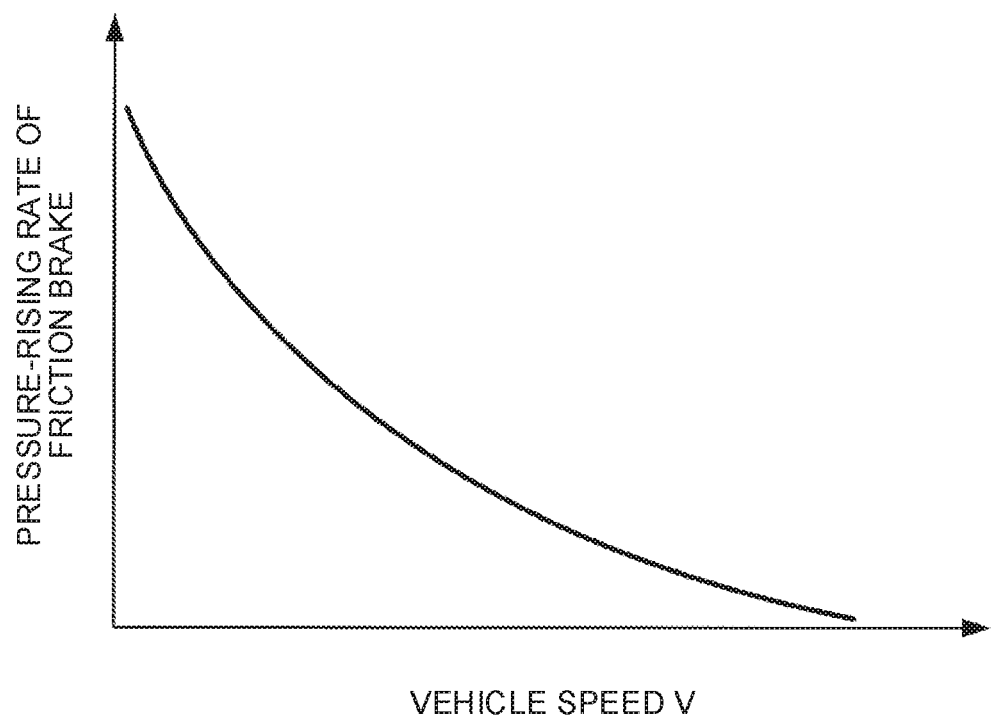
FIG. 11 describes another example of calculation of the pressure-rising rate of the friction brake.

The gradient torque estimated value Td* calculated as stated above is estimated by a disturbance observer as shown in FIG. 11, and is a parameter indicating a disturbance acting on the vehicle.

The disturbances acting on a vehicle may include air resistance, a modeling error caused by a variation of the vehicle weight due to the number of passengers and the amount of load, rolling resistance of the tires, and a gradient resistance of the road surface. Among them, a dominant disturbance factor just before the stop of the vehicle or at the initial starting is the gradient resistance. The gradient torque calculation unit 22 of the first embodiment collectively estimates the disturbance factors described above because this unit calculates a gradient torque estimated value Td* based on the motor torque command value Tm*, the motor rotation speed ωm, and the vehicle model Gr(s) obtained by performing the vibration damping control. This achieves a smooth vehicle stop following deceleration under any driving condition.

<Vibration Damping Control Processing>

Next the following describes the vibration damping control processing performed by the vibration damping control unit 24 at step S206 of FIG. 2.

Figure 7:
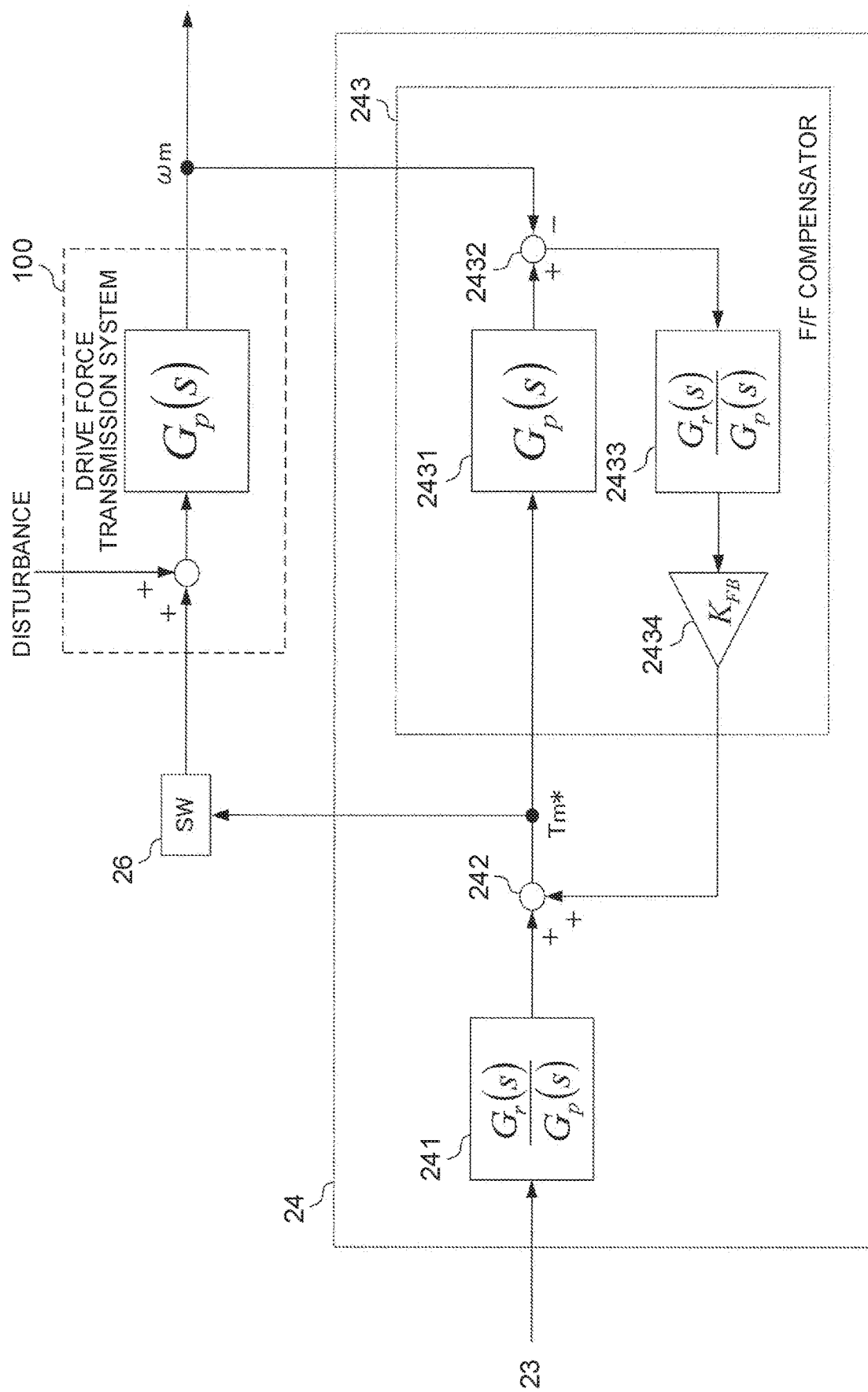
FIG. 7 is a block diagram showing one example of the configuration of a vibration damping control unit to suppress vibrations of the vehicle.

FIG. 7 is a block diagram showing one example of the functional configuration of the vibration damping control unit 24 of the first embodiment.

The vibration damping control unit 24 includes a F/F compensator 241, an adder 242, and a F/B compensator 243.

The F/F compensator 241 functions as a filter having a transfer characteristic of Gr(s)/Gp(s). The transfer characteristic Gr(s)/Gp(s) is made up of the vehicle model Gr(s) shown in the above Equation (10) and an inverse system of the vehicle model Gp(s) shown in Equation (6).

The F/F compensator 241 performs filtering to the motor torque command value Tm* so as to perform the vibration damping control processing by the feedforward compensation. The F/F compensator 241 then outputs the motor torque command value after the vibration damping control processing by the feedforward compensation to the adder 242.

Note here that the vibration damping control processing at the F/F compensator 241 may be the processing described in JP 2001-45613 or may be the processing described in JP 2002-152916.

The adder 242 adds the output value from the F/B compensator 243 to the output value from the F/F compensator 241 so as to calculate a new motor torque command value Tm*. The adder 242 then outputs the calculated motor torque command value Tm* to the stop control switching unit 26 and the F/B compensator 243.

The F/B compensator 243 is a filter used for feedback control. The F/B compensator 243 includes a control block 2431, a subtractor 2432, a control block 2433, and a gain compensator 2434.

The control block 2431 functions as a filter having a transfer characteristic that is the vehicle model Gp(s) as stated above. The control block 2431 performs filtering to the motor torque command value Tm* that is the output value from the adder 242 to output an estimated value of the motor rotation speed.

The subtractor 2432 calculates a deviation by subtracting the motor rotation speed ωm from the estimated value of the control block 2431, and outputs the calculated deviation to the control block 2433.

The control block 2433 functions as a filter having a transfer characteristic H(s)/Gp(s) that is made up of a low-pass filter having the transfer characteristic H(s) and an inverse system of the vehicle model Gp(s). The control block 2433 performs filtering to the deviation from the subtractor 2432 to calculate a F/B compensation torque, and outputs the F/B compensation torque to the gain compensator 2434.

The gain compensator 2434 is a filter to multiply the F/B compensation torque by a gain $K_{FB}$. The gain $K_{FB}$ may be adjusted to keep the stability of the F/B compensator 243. The gain compensator 2434 then outputs the gain-adjusted F/B compensation torque to the adder 242.

The adder 242 adds the F/B compensation torque and the motor torque command value Tm* subjected to the vibration damping control processing by the F/F compensator 241. In this way, the motor torque command value Tm* is calculated so as to suppress the vibration of the driving force transfer system of the electric vehicle 100.

Note here that the vibration damping control processing shown in FIG. 7 is one example, which may be the processing described in JP 2003-9566, the contents of which are hereby incorporated herein in their entirety, or may be the processing described in JP 2010-288332, the contents of which are hereby incorporated herein in their entirety.

Next the following describes the method of calculating a target stop torque calculated by the target stop torque calculation unit 25 at step S205 of FIG. 2.

Figure 8:
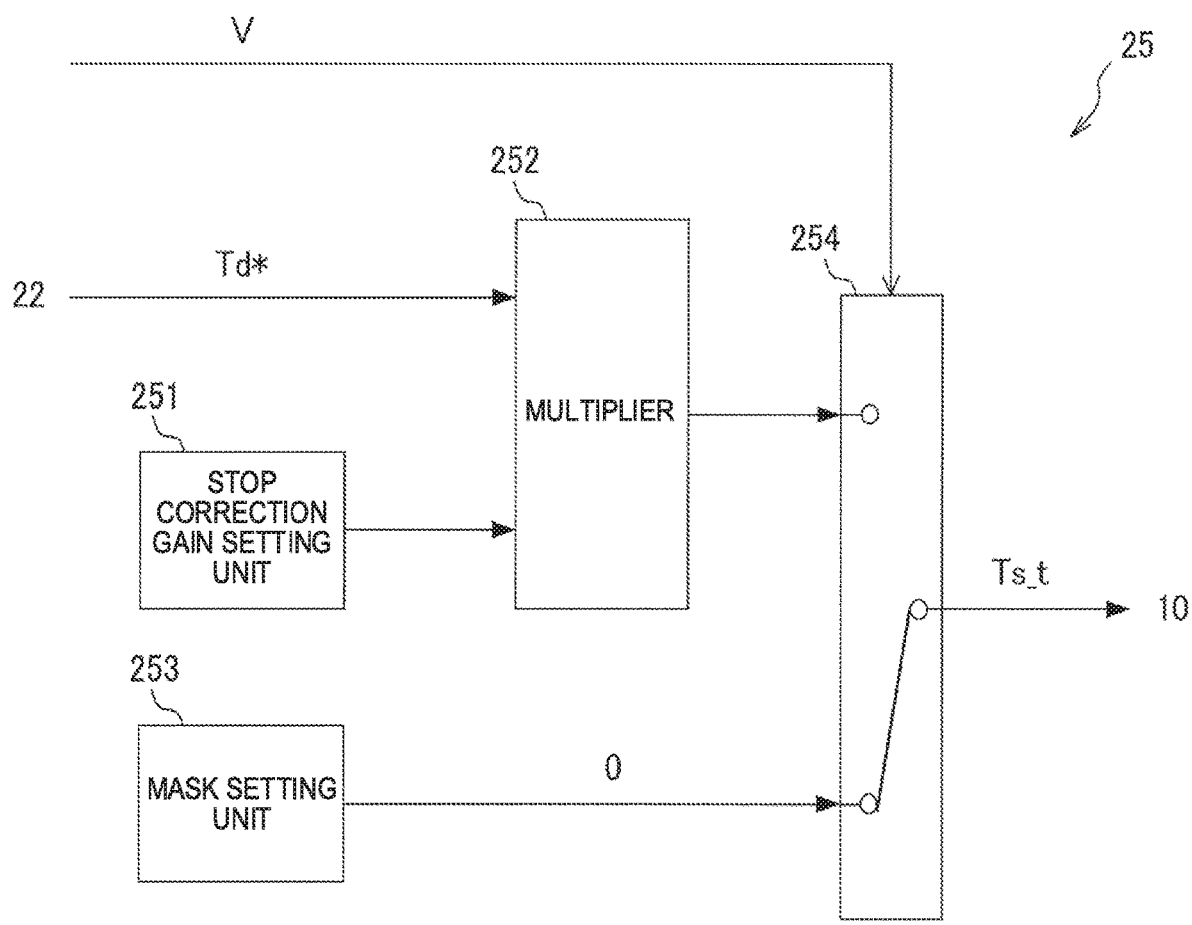
FIG. 8 is a block diagram showing one example of the configuration of a target stop torque calculation unit to calculate a target value for a brake torque provided to a vehicle.

FIG. 8 is a block diagram showing one example of the functional configuration of the target stop torque calculation unit 25. The target stop torque calculation unit 25 includes a stop correction gain setting unit 251, a multiplier 252, a mask setting unit 253, and a target stop torque output unit 254.

The stop correction gain setting unit 251 outputs a stop correction gain necessary to stop the electric vehicle 100 irrespective of the road-surface gradient to the multiplier 252. As stated above at step S205, the stop correction gain is set beforehand so as to enable smooth-starting of the electric vehicle 100 and stop the electric vehicle 100 reliably while considering the temperature dependency of the friction brake force at the friction brakes 8a to 8d, for example. The stop correction gain is set at a value larger than 1.0.

The multiplier 252 multiplies the gradient torque estimated value Td* from the gradient torque calculation unit 22 by the stop correction gain, and outputs the product to the target stop torque output unit 254.

The mask setting unit 253 outputs 0 to the target stop torque output unit 254 for masking of the target stop torque.

The target stop torque output unit 254 determines whether the electric vehicle 100 stops or not. When the electric vehicle 100 stops, the target stop torque output unit 254 changes the target stop torque Ts_t, which indicates a target value of the friction torque, from the output value of the mask setting unit 253 to the output value of the multiplier 252.

When the vehicle speed V is less than the stop threshold, the target stop torque output unit 254 of the first embodiment multiples the gradient torque estimated value Td* by the stop correction gain, and outputs the product to the brake controller 10 as the target stop torque Ts_t. When the vehicle speed V is the stop threshold or more, the target stop torque output unit 254 outputs 0 to the brake controller 10 as the target stop torque Ts_t.

In this way, when the stop of the electric vehicle 100 is expected, the target stop torque calculation unit 25 provides a target stop torque Ts_t to the brake controller 10 so that the friction brake force stops the electric vehicle 100 reliably irrespective of the road-surface gradient.

Figure 9:
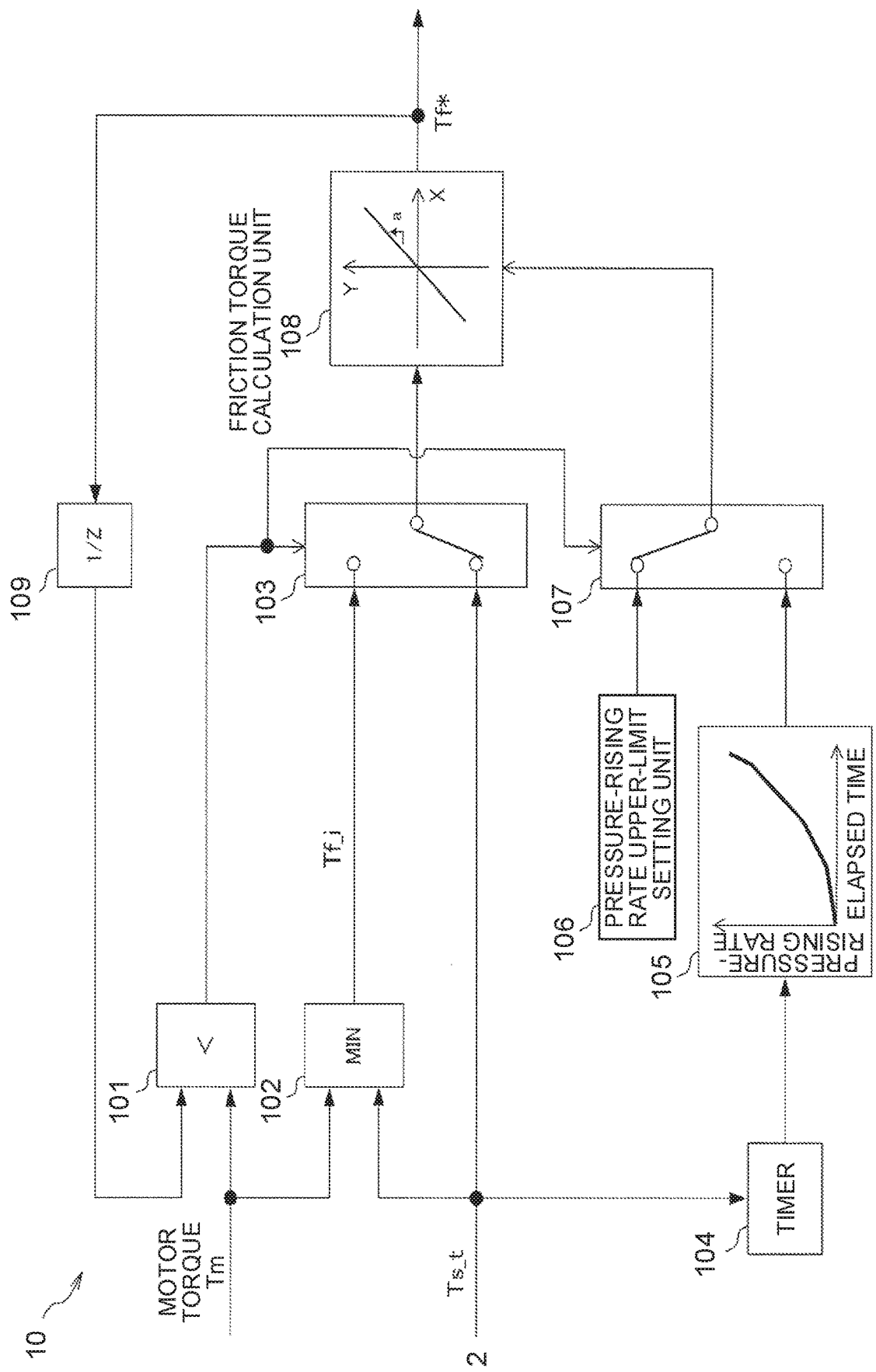
FIG. 9 is a block diagram showing one example of the functional configuration of a brake controller to make up the control device of the first embodiment.

FIG. 9 is a block diagram showing one example of the functional configuration of the brake controller 10 of the first embodiment.

The brake controller 10 includes a switching determination unit 101, a minimum select 102, a torque switching unit 103, a timer 104, a pressure-rising rate calculation unit 105, a pressure-rising rate upper-limit setting unit 106, a pressure-rising rate switching unit 107, a friction torque calculation unit 108, and a previous-value setting unit 109.

The switching determination unit 101 determines whether a previous value $Tf_{-1}*$ of the friction torque reaches the motor torque Tm or not. The switching determination unit 101 receives, as an input, the motor torque Tm as a friction initial torque Tf_i of the friction brakes 8a to 8d. The motor torque Tm is calculated from the three-phase AC currents iu, iv, and iw by a typical method, for example.

When the switching determination unit 101 determines that the previous value $Tf_{-1}*$ of the friction torque does not reach the motor torque Tm, the switching determination unit 101 outputs the initial setting signal of the friction brakes 8a to 8d to the torque switching unit 103 and the pressure-rising rate switching unit 107.

When the switching determination unit 101 determines that the previous value $Tf_{-1}*$ of the friction torque reaches the motor torque Tm, the switching determination unit 101 outputs a pressure-rising control signal of the friction brakes 8a to 8d to the torque switching unit 103 and the pressure-rising rate switching unit 107.

The minimum select 102 outputs a smaller value between the motor torque Tm and the target stop torque Ts_t to the torque switching unit 103 as the friction initial torque Tf_i. For instance, when the motor torque Tm is smaller than the target stop torque Ts_t, the minimum select 102 outputs the motor torque Tm to the torque switching unit 103 as the friction initial torque Tf_i.

The torque switching unit 103 changes the brake torque to be output to the friction torque calculation unit 108 from the friction initial torque Tf_i to the target stop torque Ts_t in accordance with the signal output from the switching determination unit 101.

More specifically when receiving the initial setting signal from the switching determination unit 101, the torque switching unit 103 outputs the friction initial torque Tf_i to the friction torque calculation unit 108. When receiving the pressure-rising control signal from the switching determination unit 101, the torque switching unit 103 outputs the target stop torque Ts_t to the friction torque calculation unit 108.

The timer 104 determines whether the target stop torque Ts_t is 0 (zero) or not. When the target stop torque Ts_t is 0, the timer 104 sets the counter value at 0. When the target stop torque Ts_t exceeds 0, the timer 104 starts counting and outputs the counted value to the pressure-rising rate calculation unit 105. That is, when it is determined that the electric vehicle 100 stops, the timer 104 outputs the counted value, which is an elapsed time since the determination of the vehicle stop, to the pressure-rising rate calculation unit 105.

The pressure-rising rate calculation unit 105 calculates a pressure-rising rate in accordance with a predetermined calculation table or arithmetic equation. The pressure-rising rate calculation unit 105 calculates a pressure-rising rate of the friction brakes 8a to 8d in accordance with the counted value of the timer 104. The pressure-rising rate calculation unit 105 outputs the calculated pressure-rising rate to the friction torque calculation unit 108.

The pressure-rising rate calculation unit 105 of the first embodiment stores a pressure-rising rate table beforehand, the pressure-rising rate table showing the relationship between the pressure-rising rate of the friction brakes 8a to 8d and the counted value of the timer 104. The pressure-rising rate table sets a pressure-rising rate so as not to provide a driver uncomfortable feeling when the electric vehicle 100 stops. The pressure-rising rate table of the first embodiment sets a larger pressure-rising rate of the friction brakes 8a to 8d for a larger counted value of the timer 104 so as to draw a quadratic curve.

The pressure-rising rate upper-limit setting unit 106 stores the upper-limit value of the pressure-rising rate for the friction brakes 8a to 8d beforehand. The upper-limit value of the pressure-rising rate is determined while considering the structure of the friction brakes 8a to 8d, for example, which may be set at a few tens of thousands newton (m/s). The pressure-rising rate upper-limit setting unit 106 sets the upper-limit value of the pressure-rising rate in the pressure-rising rate switching unit 107.

The pressure-rising rate switching unit 107 changes the pressure-rising rate to be output to the friction torque calculation unit 108 in accordance with a signal from the switching determination unit 101.

More specifically when receiving the initial setting signal from the switching determination unit 101, the pressure-rising rate switching unit 107 outputs the upper-limit value of the pressure-rising rate to the friction torque calculation unit 108. When receiving a pressure-rising control signal from the switching determination unit 101, the pressure-rising rate switching unit 107 outputs the pressure-rising rate calculated by the pressure-rising rate calculation unit 105 to the friction torque calculation unit 108.

In this way, when the previous value $Tf_{-1}*$ of the friction torque reaches the motor torque Tm, the pressure-rising rate switching unit 107 sets a pressure-rising rate for the friction torque calculation unit 108 so that the vehicle stops smoothly during an increase from the friction initial torque Tf_i to the target stop torque Ts_t.

The friction torque calculation unit 108 calculates a friction torque command value Tf* to specify a friction force to be provided to the electric vehicle 100 while referring to a predetermined calculation table or arithmetic equation. The friction torque calculation unit 108 calculates the friction torque command value Tf* based on the value of the pressure-rising rate output from the pressure-rising rate switching unit 107 and the value of the brake torque output from the torque switching unit 103.

The friction torque calculation unit 108 of the first embodiment stores a friction torque table beforehand, the friction torque table having X-axis and Y-axis representing the friction torque target value and the friction torque command value, respectively, and showing the relationship between the friction torque target value and the friction torque command value. In the friction torque table, the friction torque target value and the friction torque command value have a proportional relationship, and the slope a of the friction torque command value (Y) relative to the friction torque target value (X) changes with the pressure-rising rate from the pressure-rising rate switching unit 107. In one example, the slope a increases with increase in the pressure-rising rate.

When obtaining the pressure-rising rate from the pressure-rising rate switching unit 107, the friction torque calculation unit 108 changes the slope a of the friction torque table in accordance with the pressure-rising rate. When obtaining the brake torque from the torque switching unit 103 as the friction torque target value, the friction torque calculation unit 108 refers to the changed friction torque table, and calculates a command value in association with the obtained target value as the friction torque command value Tf*.

The friction torque calculation unit 108 outputs the calculated friction torque command value Tf* to the control block to control the oil pressure of the friction brakes 8a to 8d and the previous-value setting unit 109.

The previous-value setting unit 109 obtains the friction torque command value Tf* from the friction torque calculation unit 108 and keeps this as a previous value till the next control period. In the next control period, the previous-value setting unit 109 outputs the kept friction torque command value as the previous value $Tf_{-1}*$ to the switching determination unit 101.

In this way, when the target stop torque Ts_t exceeds 0, the brake controller 10 sets the value of the regenerative torque actually generated at the motor 4 as the friction initial torque Tf_i. Then the brake controller 10 rapidly increases the pressure of the brake oil to be supplied to the friction brakes 8a to 8d so that the friction torque reaches the friction initial torque Tf_i. After that, while the friction torque reaches the target stop torque Ts_t set so that the vehicle stops reliably even on the sloping road, the brake controller 10 controls the pressure-rising rate of the brake oil so as not to provide uncomfortable feeling to the driver of the electric vehicle 100.

That is, when the electric vehicle 100 is just before stop, the brake controller 10 increases the pressure of the brake oil beforehand so as to provide a friction brake force to the electric vehicle 100 precisely. After that, the brake controller 10 provides a friction brake force to the electric vehicle 100 so that the electric vehicle 100 stops reliably while adjusting the pressure-rising rate of the brake oil in accordance with the state of the electric vehicle 100. This allows the brake force provided to the electric vehicle 100 to switch correctly from the regenerative brake force to the friction brake force, so that the electric vehicle 100 stops.

Next the following describes a stop operation of the electric vehicle 100 of the first embodiment, with reference to the drawings.

FIGS. 10(a)-10(e) are time charts showing one example when the electric vehicle 100 of the first embodiment stops. FIGS. 10(a) to 10(e) show the vehicle speed V, the gradient torque estimated value Td*, the counted value of the timer 104 after a determination of the vehicle stop, the pressure-rising rate of the friction brake 8a to 8d, and the brake torque provided to the electric vehicle 100. FIGS. 10(a) to 10(e) share the common temporal axis on the horizontal axis.

Figure 10:
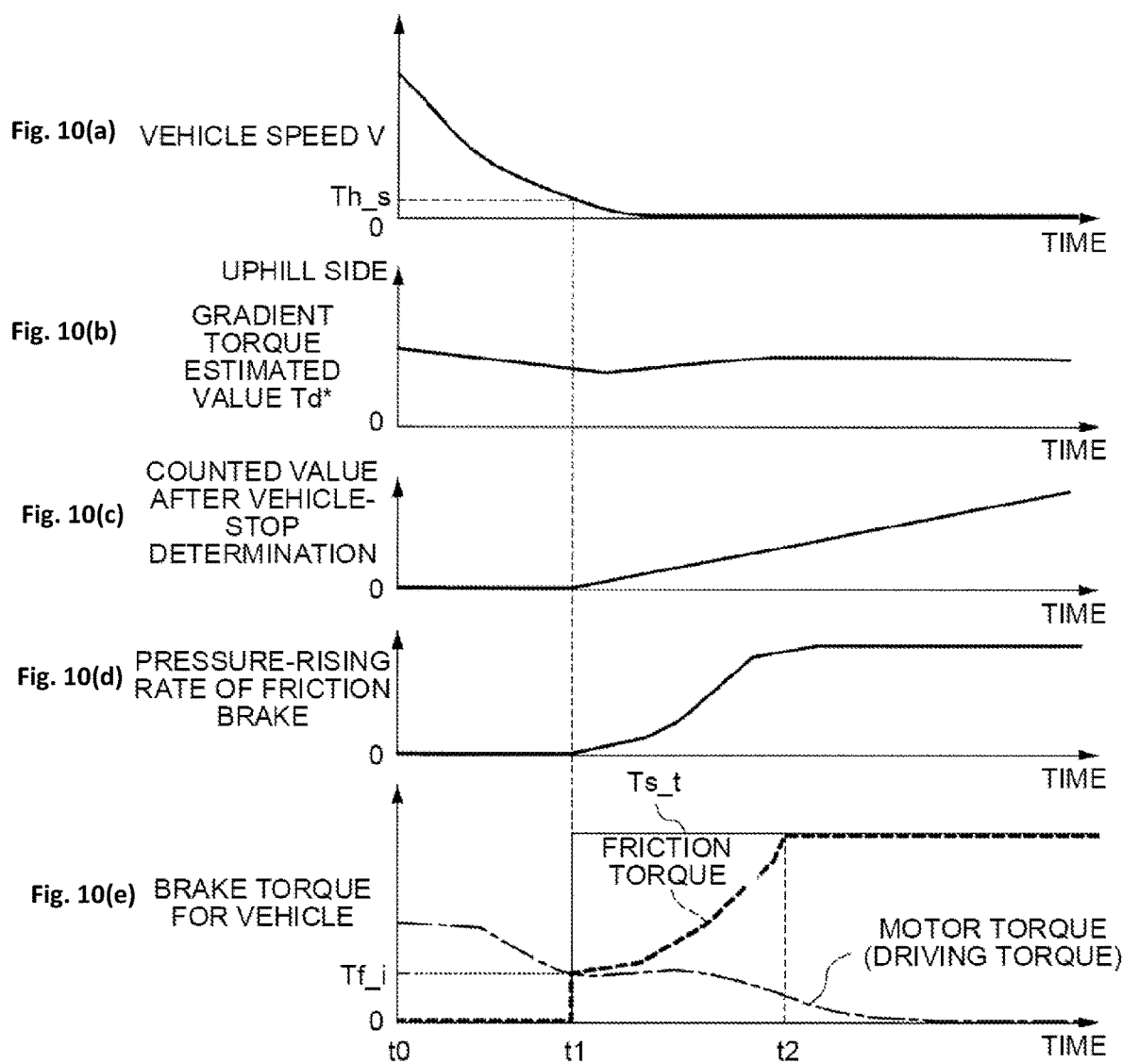
FIGS. 10(a)-10(e) are time charts showing an example of the method for stopping a vehicle in the first embodiment.

This example shows that the electric vehicle 100 when the electric vehicle 100 travelling on an uphill road stops. After time t0, the accelerator position AP gradually decreases so that the vehicle speed V of the electric vehicle 100 during travelling decreases as shown in FIG. 10(a). The gradient torque estimated value Td* has a positive value as shown in FIG. 10(b) because the electric vehicle 100 is travelling on the uphill road.

At time t1, the vehicle speed V falls below the vehicle-stop threshold Th_s as shown in FIG. 10(a), and so the target stop torque calculation unit 25 determines that the electric vehicle 100 is stopping. The target stop torque calculation unit 25 therefore sets a target stop torque Ts_t that is larger than the gradient torque estimated value Td* based on the gradient torque estimated value Td* as shown in FIG. 10(e).

Accordingly the brake controller 10 sets the same value as the regenerative torque of the motor 4 as the friction initial torque Tf_i, and increases the pressure of the brake oil to be supplied to the friction brakes 8a to 8d so as not to exceed the upper-limit value of the pressure-rising rate for the friction brakes 8a to 8d. The friction torque Tf therefore rapidly increases to the friction initial torque Tf_i.

After that, the counted value of the timer 104 increases over time as shown in FIG. 10(c). As shown in FIG. 10(d), the pressure-rising rate calculation unit 105 increases or decreases the pressure-rising rate of the brake oil in accordance with a change of the counted value of the timer 104.

This gradually increases the friction torque Tf as shown in FIG. 10(e), so that the electric vehicle 100 smoothly stops so as not to provide uncomfortable feeling to the driver. The motor torque Tm is kept in a certain range.

At time t2, the friction torque Tf increases a target stop torque Ts_t that is larger than the gradient torque estimated value Td*. This allows the electric vehicle 100 to stop reliably irrespective of the gradient of the road surface. After that, while the friction Tf is kept constantly, the brake controller 10 gradually decreases the motor torque. This reduces the power consumption of the motor 4.

As stated above, when it is determined that the electric vehicle 100 is just before stop, the brake torque provided to the electric vehicle 100 switches from the motor torque (regenerative torque) Tm to the friction torque Tf, and the friction torque after switching is set at a value larger than the gradient torque estimated value Td*. In this way, the friction force is used as the brake force of the electric vehicle 100, and so the electric vehicle 100 stops reliably.

Among the parameters set for the vehicle model Gr(s) shown in FIG. 6, the weight of the electric vehicle 100, for example, may have a large difference between the actual value and the setting value because of the number of passengers and the amount of luggage on the electric vehicle 100, which may increase an error of the gradient torque estimated value Td*. If the electric vehicle 100 is stopped by the motor torque Tm in this case, the brake force provided to the electric vehicle 100 is insufficient, so that the electric vehicle 100 may fail to stop as intended by the driver.

To avoid this, when the electric vehicle 100 is just before stop, the motor controller 2 of the first embodiment changes the brake torque provided to the electric vehicle 100 from the motor torque Tm to the friction torque Tf, and sets a value larger than the gradient torque estimated value Td* as the brake torque. This smoothly stops the electric vehicle 100 so as not to provide uncomfortable feeling to the driver.

The brake controller 10 of the first embodiment adjusts the pressure-rising rate of the brake oil to be supplied to the friction brakes 8a to 8d while considering the mechanical characteristics of the friction brakes 8a to 8d so that the friction torque Tf is larger than the gradient torque estimated value Td*. This suppresses the longitudinal acceleration in the electric vehicle 100 just before stop, so that the electric vehicle stops smoothly.

The above describes a non-limiting example of the first embodiment where, as shown in FIG. 9, the pressure-rising rate calculation unit 105 adjusts the pressure-rising rate of the brake oil in accordance with a time elapsed after a determination of the vehicle stop. The following describes another example of the pressure-rising rate calculation unit 105 to adjust the pressure-rising rate of the brake oil.

FIG. 11 describes another example of the pressure-rising rate calculation unit 105 of the first embodiment.

In this example, the pressure-rising rate calculation unit 105 stores a pressure-rising rate table beforehand, the pressure-rising rate table showing the relationship between the pressure-rising rate of the brake oil to be supplied to the friction brakes 8a to 8d and the vehicle speed V. While considering the mechanical characteristics of the friction brakes 8a to 8d, the pressure-rising rate table is specified beforehand so as to suppress the longitudinal acceleration in the electric vehicle 100. As shown in FIG. 11, the pressure-rising rate table draws an inversely proportional curve so that the pressure-rising rate of the friction brakes 8a to 8d gradually increases with decrease in the vehicle speed V.

When obtaining the vehicle speed V, the pressure-rising rate calculation unit 105 refers to the pressure-rising rate table shown in FIG. 11, and calculates a pressure-rising rate in association with the obtained value of the vehicle speed V. Subsequently the pressure-rising rate calculation unit 105 outputs the calculated pressure-rising rate to the pressure-rising rate switching unit 107 shown in FIG. 9.

In this way, the pressure-rising rate calculation unit 105 may change the pressure-rising rate of the friction brakes 8a to 8d in accordance with the vehicle speed V, and such an pressure-rising rate calculation unit 105 also stops the electric vehicle 100 while suppressing the longitudinal acceleration of the electric vehicle 100.

Next the following describes the method of stopping the electric vehicle 100 of the first embodiment.

Figure 12:
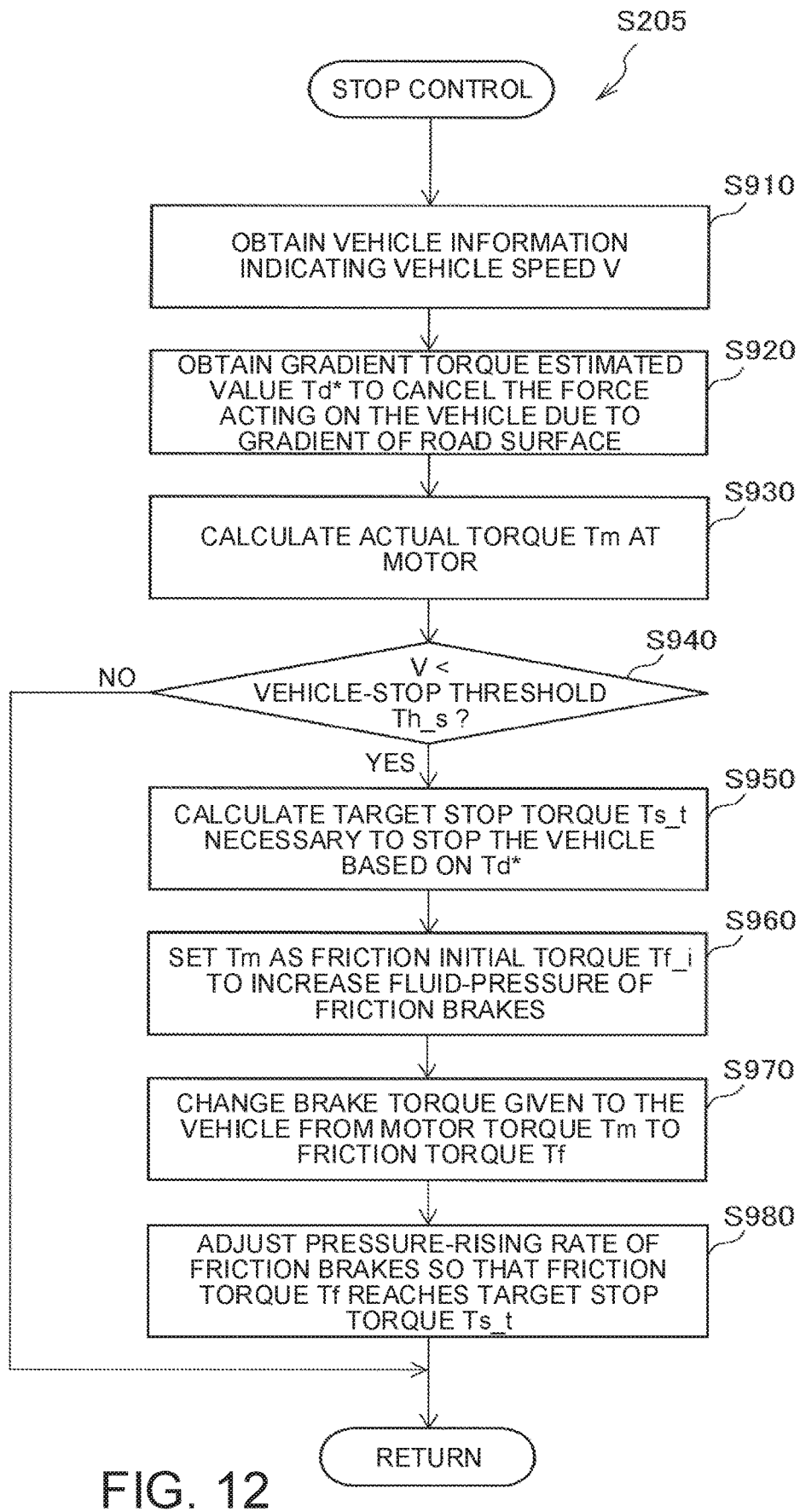
FIG. 12 is a flowchart showing an example of the stop control processing in the first embodiment.

FIG. 12 is a flowchart showing an example of the procedure of the stop control processing at step S205 of FIG. 2.

At step S910, the brake controller 10 obtains vehicle information showing the vehicle speed V of the electric vehicle 100.

At step S920, the motor controller 2 calculates a gradient torque estimated value Td* to cancel the gravity acting on the electric vehicle 100 mainly due to the gradient of the road surface.

At step S930, the brake controller 10 calculates a motor torque Tm indicating the torque generated at the motor 4 based on the three-phase AC currents iu, iv and iw.

At step S940, the motor controller 2 determines whether the vehicle speed V is less than the vehicle-stop threshold Th_s or not. The vehicle-stop threshold Th_s is a threshold to determine whether the electric vehicle 100 stops or not. When the vehicle speed V is the vehicle-stop threshold Th_s or more, the motor controller 2 ends the stop control processing and returns to the procedure of the controlling the electric vehicle 100 shown in FIG. 2.

At step S950, when the vehicle speed V is less than the vehicle-stop threshold Th_s, the motor controller 2 calculates a target stop torque Ts_t that is necessary to stop the electric vehicle 100 reliably irrespective of the presence or not of the gradient based on the gradient torque estimated value Td*.

At step S960, the brake controller 10 sets a friction initial torque Tf_i so as to have sufficient responsiveness of the friction brakes 8a to 8d. The brake controller 10 of the first embodiment sets the value of the motor torque Tm calculated at step S930 as the friction initial torque Tf_i.

The brake controller 10 then increases the pressure of fluid to be supplied to the friction brakes 8a to 8d (brake-fluid pressure) based on the upper-limit value of the pressure-rising rate that is set by the pressure-rising rate upper-limit setting unit 106 shown in FIG. 9 so that the friction torque Tf reaches the friction initial torque Tf_i. This keeps sufficient responsiveness of the friction brakes 8a to 8d, and adjusts the friction torque Tf precisely.

At step S970, the brake controller 10 changes the brake torque used for the electric vehicle 100 from the motor torque Tm to the friction torque Tf. For example, when the friction torque Tf increases to the friction initial torque Tf_i, the brake controller 10 gradually increases the pressure of brake fluid so that the friction torque Tf reaches the target stop torque Ts_t while gradually decreasing the motor torque Tm. This suppresses the longitudinal acceleration in the electric vehicle 100 while reducing the power consumption of the motor 4.

At step S980, the brake controller 10 adjusts the pressure-rising rate of the friction brakes 8a to 8d so that the friction torque Tf increases from the friction initial torque Tf_i to the target stop torque Ts_t as shown in FIG. 10(d).

For example, as described for the pressure-rising rate calculation unit 105 of FIG. 9, the brake controller 10 gradually increases the pressure-rising rate in accordance with the elapsed time since the determination that the electric vehicle 100 stops. Alternatively, the brake controller 10 may refer to the pressure-rising rate table shown in FIG. 11 to gradually increase the pressure-rising rate with decrease in the vehicle speed V.

This stops the electric vehicle 100 smoothly while suppressing the longitudinal acceleration of the electric vehicle 100.

The electric vehicle 100 according to the first embodiment of the present invention includes the motor 4 to provide a regenerative brake force to the electric vehicle 100 and the friction brakes 8a to 8d that make up a friction braking mechanism to provide a friction brake force to the electric vehicle 100. As shown in FIG. 2, the control method for the electric vehicle 100 includes step S202 to calculate a target torque indicating the torque target value Tm_t of the motor 4 based on the accelerator position AP showing the displacement of the accelerator pedal, and step S203 to estimate a gradient torque to cancel a disturbance due to the gradient of the road surface. The disturbance mainly is the gravity externally acting on the electric vehicle 100 due to the gradient of the road surface.

The control method for the electric vehicle 100 further includes step S204 to calculate a motor torque command value Tm* based on the estimated gradient torque estimated value Td* and the torque target value Tm_t, and steps S206 to S208 to control the motor torque Tm generated at the motor 4 based on the motor torque command value Tm*. The control method for the electric vehicle 100 further includes step S205 to, when the electric vehicle 100 stops, set a value larger than the gradient torque estimated value Td* for a brake torque provided to the electric vehicle 100, and changes the brake torque from the motor torque Tm to the friction torque Tf of the friction brakes 8a to 8d. The friction torque Tf in this case is a parameter obtained by converting the friction brake force generated by the friction brakes 8a to 8d into the torque at the driving shaft of the motor 4.

In this way, when the electric vehicle 100 is just before stop, the control device 110 changes the brake force provided to the electric vehicle 100 from the brake force of the motor 4 to the friction brake force, and stops the electric vehicle 100 with the friction torque Tf that is larger than the gradient torque estimated value Td*.

This is because the weight of the electric vehicle 100, which is used to estimate a gradient torque, may greatly differ between the setting value and the actual value due to an increase or a decrease in the number of passengers and the amount of luggage on the electric vehicle 100, for example, and such a difference increases an error of the gradient torque estimated value Td*. As a result, if an electric vehicle stops on the sloping road with the motor torque Tm, the brake force for the electric vehicle 100 may be insufficient due to such a large error of the motor torque command value Tm, and so interferes with smooth stopping.

To avoid the interference with smooth stopping due to a large error of the gradient torque estimated value Td* caused by a change of the weight of the electric vehicle 100, the control method changes the brake torque of the electric vehicle 100 to the friction torque Tf and increases the friction torque Tf to be larger than the gradient torque estimated value Td*. This allows the electric vehicle 100 to stop well irrespective of a variation of the parameters to estimate a gradient torque, such as the weight of the electric vehicle 100, whether the electric vehicle is on an uphill road or on a downhill road.

In this way, the first embodiment allows the vehicle to stop well irrespective of a change of the gradient of the road surface on which the vehicle travels.

At step S205 of the first embodiment, the motor controller 2 determines whether the electric vehicle 100 stops or not. When the motor controller 2 determines that the electric vehicle 100 stops, the brake controller 10 controls the increasing rate of the friction torque Tf in accordance with the operating state of the electric vehicle 100.

In one example, the brake controller 10 increases the pressure-rising rate of the fluid to be supplied to the friction brakes 8a to 8d in accordance with the time elapsed after a determination that the electric vehicle 100 stops. This increases the pressure-rising rate with the time elapsed after the determination of the vehicle stop, and so smoothly stops the electric vehicle 100 by a simple method so as not to provide uncomfortable feeling to the driver.

In another example, the brake controller 10 may increase the pressure-rising rate of the fluid to be supplied to the friction brakes 8a to 8d in accordance with decrease in the vehicle speed V that is the speed of the electric vehicle 100. This case also increases the pressure-rising rate with decrease in the vehicle speed V, and so smoothly stops the electric vehicle 100 similarly to the above example.

In this way, the method adjusts the increasing rate of the friction torque Tf in accordance with the time elapsed after a determination of the vehicle stop or in accordance with the operating state of the electric vehicle 100, such as the vehicle speed V, whereby the method enables smooth stopping of the electric vehicle 100 using the friction brake force.

According to the method of the first embodiment, when it is determined at step S205 that the electric vehicle 100 stops, the brake controller 10 rapidly increases the pressure of the fluid at the friction brakes 8a to 8d so that the friction torque Tf is equal to the motor torque Tm. After that, the brake controller 10 gradually increases the pressure-rising rate of the fluid at the friction brakes 8a to 8d.

In this way, the method increases the pressure of the fluid to be supplied to the friction brakes 8a to 8d before adjusting the pressure-rising rate at the friction brakes 8a to 8d. This facilitates the generation of the friction brake force from the friction brakes 8a to 8d, and so keeps enough responsiveness of the friction brake force. This enables precise adjustment of the increasing rate of the friction torque Tf, and so implements smooth stopping.

According to the first embodiment, the motor controller 2 determines at step S205 whether a parameter proportional to the vehicle speed V falls below the vehicle-stop threshold Th_s or not. When such a parameter proportional to the vehicle speed V falls below the vehicle-stop threshold Th_s, the brake controller 10 increases the friction torque Tf to the target stop torque Ts_t that is larger than the absolute value of the gradient torque estimated value Td*.

This sets a larger value than the gradient torque estimated value Td* as the friction torque Tf to stop the electric vehicle 100, and so reliably stops the electric vehicle 100 while reducing uncomfortable feeling provided to the driver.

Particularly the target stop torque Ts_t in the first embodiment is set beforehand based on the temperature characteristics of the fluid to be supplied to the friction brakes 8a to 8d. Since the fluid at the friction brakes 8a to 8d has temperature characteristics such that the friction brake force decreases with increase in the temperature, the target stop torque Ts_t is set at a value to stop the electric vehicle 100 reliably even when the temperature of the fluid increases. This prevents the electric vehicle 100 from slipping down (moving) on an uphill road or a downhill road without stopping.

According to the first embodiment, the target stop torque Ts_t is set within a range of enabling smooth starting of the electric vehicle 100 with the friction torque Tf. A larger fluid pressure at the friction brakes 8a to 8d requires a longer time to decrease the fluid pressure at the friction brakes 8a to 8d at the next starting of the electric vehicle 100. This interferes with the smooth-starting of the electric vehicle 100.

To avoid this, the target stop torque Ts_t is set within a range of enabling smooth starting of the electric vehicle 100, which enables both of smooth stopping of the electric vehicle 100 travelling on the uphill road or the downhill road and the quick starting of the electric vehicle.

Second Embodiment

Figure 13:
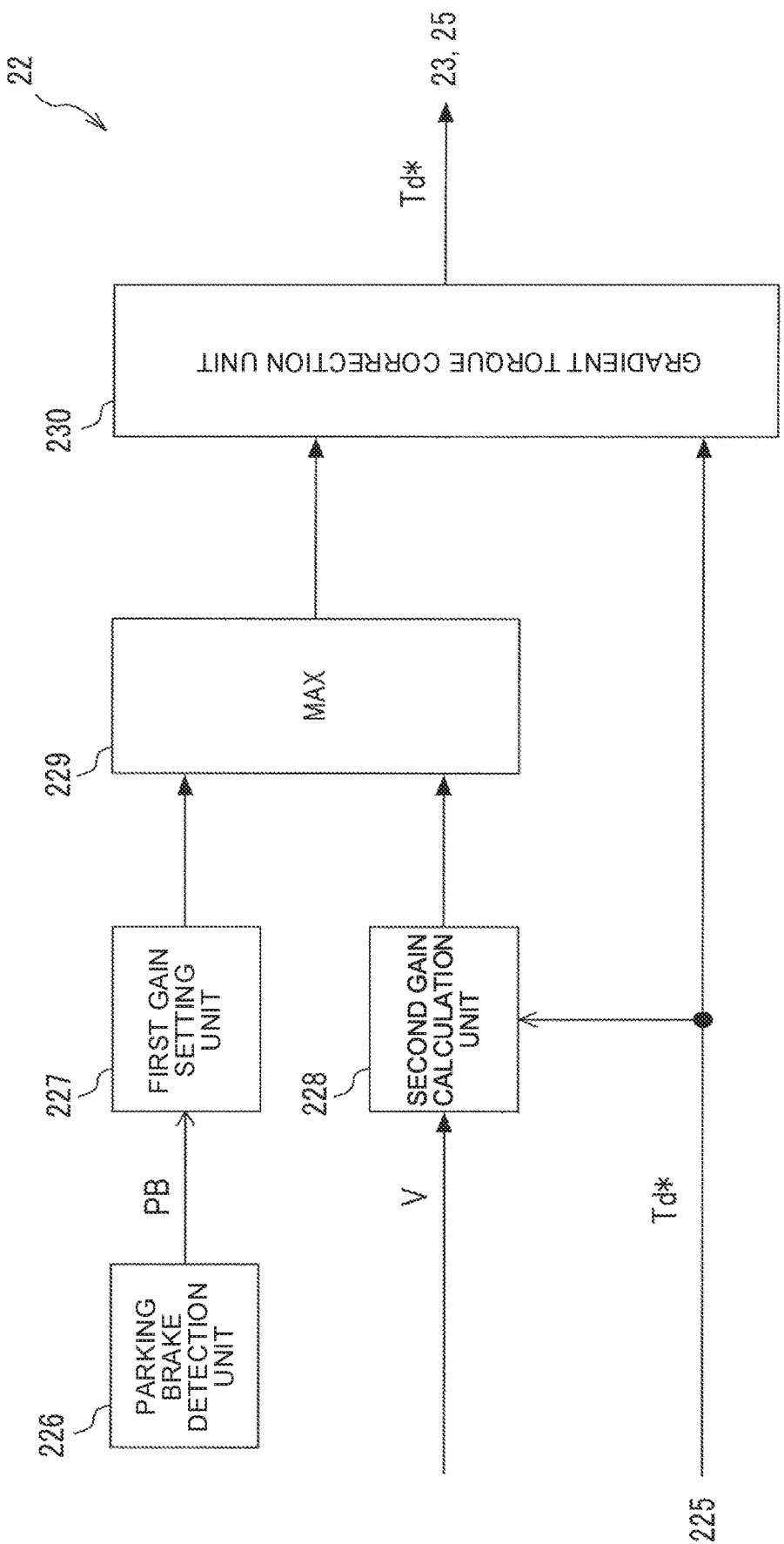
FIG. 13 is a block diagram showing one example of the configuration of the gradient torque calculation unit in a second embodiment of the present invention.

FIG. 13 is a block diagram showing one example of the configuration of the gradient torque calculation unit 22 in the second embodiment of the present invention.

The gradient torque calculation unit 22 of the second embodiment corrects a gradient torque estimated value Td* from the control block 225 shown in FIG. 6 so as not to provide uncomfortable feeling to the driver of the electric vehicle 100 travelling on an uphill road or a downhill road. This gradient torque calculation unit 22 includes, in addition to the configuration (including 221 to 225) in FIG. 6, a parking brake detection unit 226, a first gain setting unit 227, a second gain calculation unit 228, a max select 229, and a gradient torque correction unit 230.

The parking brake detection unit 226 detects the operating state of the parking brakes 9c and 9d. The parking brake detection unit 226 outputs a detection signal PB indicating the detected state of the parking brakes 9c and 9d to the first gain setting unit 227.

For example, when the parking brakes 9c and 9d operate so as to provide a friction brake force to the driven wheels 7c and 7d, the parking brake detection unit 226 outputs a detection signal PB indicating the ON state of the parking brakes 9c and 9d. When the parking brakes 9c and 9d are released so as not to provide a friction brake force to the driven wheels 7c and 7d, the parking brake detection unit 226 outputs a detection signal PB indicating the OFF state of the parking brakes 9c and 9d.

The first gain setting unit 227 outputs a first gain K1 to the max select 229. The first gain K1 is to correct the gradient torque estimated value Td* in accordance with the detection signal PB from the parking brake detection unit 226. The first gain K1 has a value in a range from 0.0 to 1.0.

The first gain K1 may be a variable that varies with the gradient torque estimated value Td*. In this case, the first gain K1 decreases with increase in the gradient torque estimated value Td* to the positive side or to the negative side. Alternatively the gradient torque estimated value Td* may be a fixed value, such as 0.5.

When the first gain K1 is set at 1.0, for example, the gradient torque estimated value Td* cancels all of the disturbances due to the gradient resistance. The electric vehicle 100 therefore travels as if the vehicle travels on a flat road without slope. This means that the displacement of the accelerator pedal by the driver is the same as that on the flat road.

Meanwhile, when a driver drives an internal combustion engine vehicle having an internal combustion engine as the driving source on the uphill road or the downhill road, if they intend to drive the vehicle like on the flat road, the displacement of the accelerator pedal will change from that on the flat road. The first gain K1 set at 1.0 therefore may provide the driver of the electric vehicle 100 uncomfortable feeling on the uphill road or the downhill road due to a difference in the operability from the internal combustion engine vehicle.

To avoid this, when the gradient torque estimated value Td* exceeds a predetermined range including 0 (zero), i.e., the road is an uphill road or a downhill road, the first gain K1 is desirably set at a value smaller than 1.0. When the gradient torque estimated value Td* is within the predetermined range, the first gain K1 may be set at 1.0.

In this way, when receiving the detection signal PB indicating the OFF state of the parking brakes 9c and 9d, the first gain setting unit 227 outputs a first gain K1 to the max select 229 so as to correct the gradient torque estimated value Td*.

When receiving the detection signal PB indicating the ON state of the parking brakes 9c and 9d, the first gain setting unit 227 outputs 0 (zero) to the max select 229.

When the parking brakes 9c and 9d operate, the gradient torque calculation unit 22 calculates the gradient torque estimated value Td* for the electric vehicle 100 on which the gradient resistance as well as the friction brake force by the parking brakes 9c and 9d act. This gradient torque estimated value Td* includes a component canceling the brake torque by the parking brakes 9c and 9d, and correction of the gradient torque estimated value Td* with the first gain K1 therefore may fail to cancel the brake torque by the parking brakes 9c and 9d due to the amount of the correction. This may result in a failure to perform braking as intended by the driver. To avoid this, when receiving the detection signal PB indicating the ON state, the first gain setting unit 227 outputs 0 to the max select 229 so as not to correct the gradient torque estimated value Td*.

To stop the electric vehicle 100 reliably just before stop, the second gain calculation unit 228 calculates a second gain K2 to correct the gradient torque estimated value Td* while referring to a predetermined arithmetic equation or gain table. The second gain calculation unit 228 sets a larger second gain K2 for a smaller vehicle speed V.

For example, the second gain calculation unit 228 refers to the gain table and brings the second gain K2 close to 1.0 for the vehicle speed V closer to 0. This sets the second gain K2 at 1.0 when the vehicle speed V is 0. This therefore does not correct the gradient torque estimated value Td* to be small, and so avoids the shortage of the brake force of the electric vehicle 100.

Even when the parking brakes 9c and 9d operate, the vehicle speed V typically is small and the correction amount of the gradient torque estimated value Td* is small. The brake torque by the parking brakes 9c and 9d therefore is generally canceled. This enables smooth stopping of the electric vehicle 100 while reducing uncomfortable feeling provided to the driver.

The second gain calculation unit 228 outputs the calculated second gain K2 to the max select 229. The gain table set in the second gain calculation unit 228 will be described later with reference to FIG. 14.

The max select 229 outputs a larger value between the first gain K1 output from the first gain setting unit 227 and the second gain K2 output from the second gain calculation unit 228 to the gradient torque correction unit 230.

The gradient torque correction unit 230 corrects the gradient torque estimated value Td* from the control block 225 in accordance with the output value from the max select 229. The gradient torque correction unit 230 of the second embodiment multiplies the gradient torque estimated value Td* by the gain output from the max select 229 to calculate a new gradient torque estimated value Td*. The gradient torque correction unit 230 outputs the calculated gradient torque estimated value Td* to the command torque calculation unit 23 and the target stop torque calculation unit 25 shown in FIG. 3.

Figure 14:
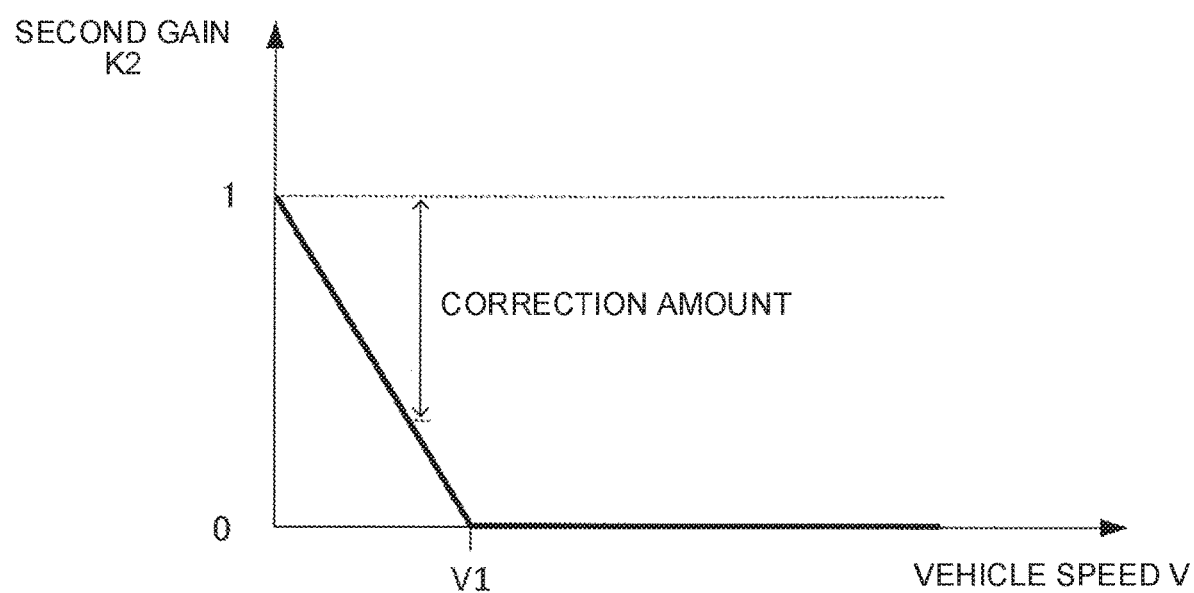
FIG. 14 describes a method for correcting a gradient torque.

FIG. 14 schematically describes one example of the gain table kept at the second gain calculation unit 228. In this example, the vertical axis represents the second gain K2 and the horizontal axis represents the vehicle speed V.

As shown in FIG. 14, the table is set so that as the vehicle speed V decreases from a predetermined speed V1, the second gain K2 increases. That is, when the electric vehicle 100 is just before the stop, the correction amount of the gradient torque estimated value Td* is small. This allows reliable stopping of the electric vehicle 100.

In the region where the vehicle speed V is larger than the predetermined speed V1, the second gain K2 is set at 0 to allow the max select 229 to select the first gain K1. This means that the first gain K1 corrects the gradient torque estimated value Td*, and so the operability of the electric vehicle 100 on an uphill road or a downhill road is similar to the operability of an internal combustion engine vehicle. This can reduce uncomfortable feeling provided to the driver of the electric vehicle 100.

According to the second embodiment of the present invention, the gradient torque correction unit 230 corrects the gradient torque estimated value Td* to decrease. Then when the electric vehicle 100 is just before stop, the gradient torque correction unit 230 brings the correction amount of the gradient torque estimated value Td* close to 0 in accordance with decrease in the vehicle speed V. This reduces uncomfortable feeling provided to the driver of the electric vehicle 100 travelling on an uphill road or a downhill road, and enables smooth and reliable stopping of the electric vehicle 100.

According to the second embodiment, the gradient torque correction unit 230 corrects the gradient torque estimated value Td* to decrease in accordance with increase in the gradient torque estimated value Td*. This brings the operability of the electric vehicle 100 further closer to the operability of an internal combustion engine vehicle, and so further reduces uncomfortable feeling provided to the driver of the electric vehicle 100.

When the parking brake detection unit 226 outputs a detection signal PB indicating the ON state, the first gain setting unit 227 of the second embodiment outputs 0 instead of the first gain K1. The gradient torque correction unit 230 therefore does not perform correction based on the first gain K1. That is, when the parking brakes 9c and 9d provide a friction brake force to the electric vehicle 100, the gradient torque correction unit 230 suppresses the correction of the gradient torque estimated value Td*.

This cancels the brake torque by the parking brakes 9c and 9d even when the parking brakes 9c and 9d operate, and so smoothly stops the electric vehicle 100 so as not to provide uncomfortable feeling to the driver.

Third Embodiment

Figure 15:
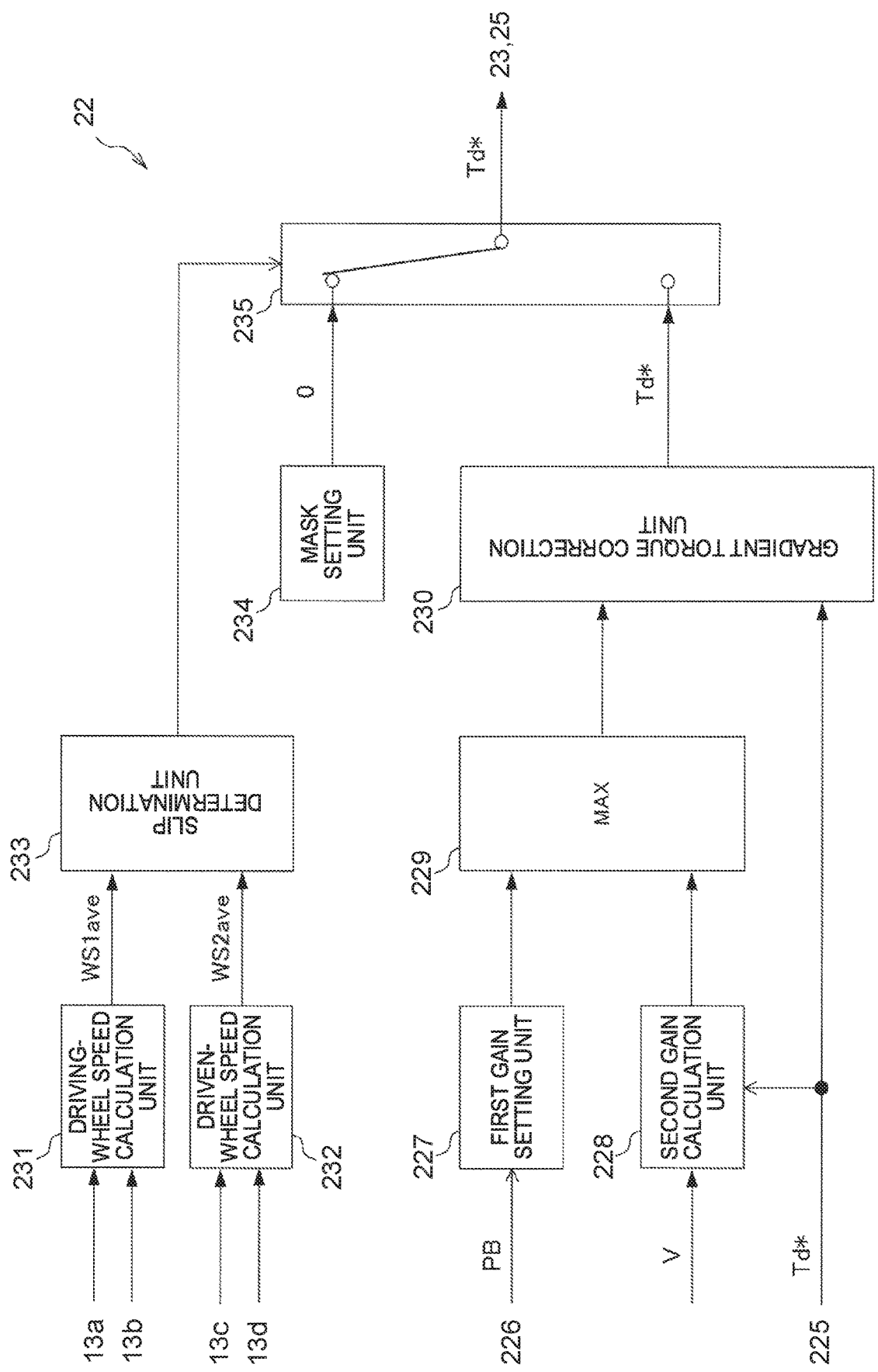
FIG. 15 is a block diagram showing one example of the configuration of the gradient torque calculation unit in a third embodiment of the present invention.

FIG. 15 is a block diagram showing one example of the configuration of the gradient torque calculation unit 22 in the third embodiment of the present invention.

When it is determined that the electric vehicle 100 is in a slipping state, the gradient torque calculation unit 22 of the third embodiment limits the gradient torque estimated value Td*. This gradient torque calculation unit 22 includes, in addition to the configuration (including 226 to 230) in FIG. 13, a driving-wheel speed calculation unit 231, a driven-wheel speed calculation unit 232, a slip determination unit 233, a mask setting unit 234, and a gradient torque limiting unit 235.

The driving-wheel speed calculation unit 231 calculates the speed for the driving wheels 7a and 7b based on the detection values of the wheel-speed sensors 13a and 13b. The driving-wheel speed calculation unit 231 of the third embodiment calculates an average speed WS1ave of the driving wheels 7a and 7b based on the detection values of the wheel-speed sensors 13a and 13b.

The driving-wheel speed calculation unit 231 outputs the average speed WS1ave of the driving wheels 7a and 7b to the slip determination unit 233. The driving-wheel speed calculation unit 231 may output any one of the speed values of the driving wheels 7a and 7b.

The driven-wheel speed calculation unit 232 calculates the speed for the driven wheel 7c and 7d based on the detection values of the wheel-speed sensors 13c and 13d. The driven-wheel speed calculation unit 232 of the third embodiment calculates an average speed WS2ave of the driven wheel 7c and 7d based on the detection values of the wheel-speed sensors 13c and 13d.

The driven-wheel speed calculation unit 232 outputs the average speed WS2ave of the driven wheel 7c and 7d to the slip determination unit 233. The driven-wheel speed calculation unit 232 may output any one of the speed values of the driven wheel 7c and 7d.

The slip determination unit 233 determines whether the electric vehicle 100 is in a slipping state or not, and outputs the determination result to the gradient torque limiting unit 235.

The slip determination unit 233 of the third embodiment calculates a slipping rate of the electric vehicle 100 based on the average speed WS1ave of the driving wheels 7a and 7b and the average speed WS2ave of the driven wheels 7c and 7d. The slip determination unit 233 of the third embodiment calculates the slipping rate Rs in accordance with the following Equation (14).

[Equation 14]

$$R_s = \frac{(WS2_{ave} - WS1_{ave})}{WS2_{ave}} \quad (14)$$

Then the slip determination unit 233 determines whether the absolute value of the slipping rate Rs exceeds a slip threshold or not. The slip threshold is set beforehand based on the result of an examination or simulation, for example.

When the slipping rate Rs is larger than the slip threshold, then the slip determination unit 233 determines that the electric vehicle 100 is in a slipping state, i.e., in a low μ state, and outputs a determination signal indicating "1" to the gradient torque limiting unit 235. When the slipping rate Rs is the slip threshold or less, then the slip determination unit 233 determines that the electric vehicle 100 is not in a slipping state, and outputs a determination signal indicating "0" to the gradient torque limiting unit 235.

After determining that the electric vehicle 100 is in a slipping state, the slip determination unit 233 performs a timer processing to stop the determination for a predetermined time duration or a three-consecutive checking processing to stop the outputting of a determination signal until the same determination result is obtained three times consecutively. This avoids a hunting phenomenon having frequent switching of the determination signal between "0" and "1".

The third embodiment shows a non-limiting example as stated above such that the slip determination unit 233 determines the slipping state of the electric vehicle 100 based on the slipping rate Rs. In another example, the slip determination unit 233 calculates a slip amount As by the following Equation (15), and when the slip amount As exceeds a predetermined threshold, the slip determination unit 233 determines that the electric vehicle is in a slipping state. This example reduces the load of the calculation processing to determine a slipping state.

[Equation 15]

$$A_s = WS2_{ave} - WS1_{ave} \quad (15)$$

The mask setting unit 234 sets 0 at the gradient torque limiting unit 235 so as to mask the gradient torque estimated value Td* from the gradient torque correction unit 230.

The gradient torque limiting unit 235 limits the gradient torque estimated value Td* output from the gradient torque correction unit 230 in accordance with the determination result by the slip determination unit 233.

When receiving a determination signal indicating "0" from the slip determination unit 233, the gradient torque limiting unit 235 of the third embodiment outputs the gradient torque estimated value Td* to the command torque calculation unit 23 and the target stop torque calculation unit 25 shown in FIG. 3.

When receiving a determination signal indicating "1" from the slip determination unit 233, the gradient torque limiting unit 235 outputs 0 (zero) set at the mask setting unit 234 to the command torque calculation unit 23 and the target stop torque calculation unit 25.

In this way, when it is determined that the electric vehicle 100 is in a slipping state, the gradient torque calculation unit 22 changes the corrected gradient torque estimated value Td* to 0 (zero). This avoids a fluctuation in the acceleration of the electric vehicle 100 due to a fluctuation in the gradient torque estimated value Td* caused by slipping while reducing uncomfortable feeling provided to the driver of the electric vehicle 100 travelling on an uphill road or a downhill road. Such a reduced uncomfortable feeling of the driver leads to smooth stopping of the electric vehicle 100.

When the electric vehicle 100 is determined as in a slipping state, the gradient torque calculation unit 22 of the third embodiment sets the gradient torque estimated value Td* at 0. In another example, the gradient torque calculation unit 22 may set the gradient torque estimated value Td* at a certain value in the range from the gradient torque estimated value Td* to 0. This example also suppresses the fluctuation in acceleration of the electric vehicle 100.

Figure 16:
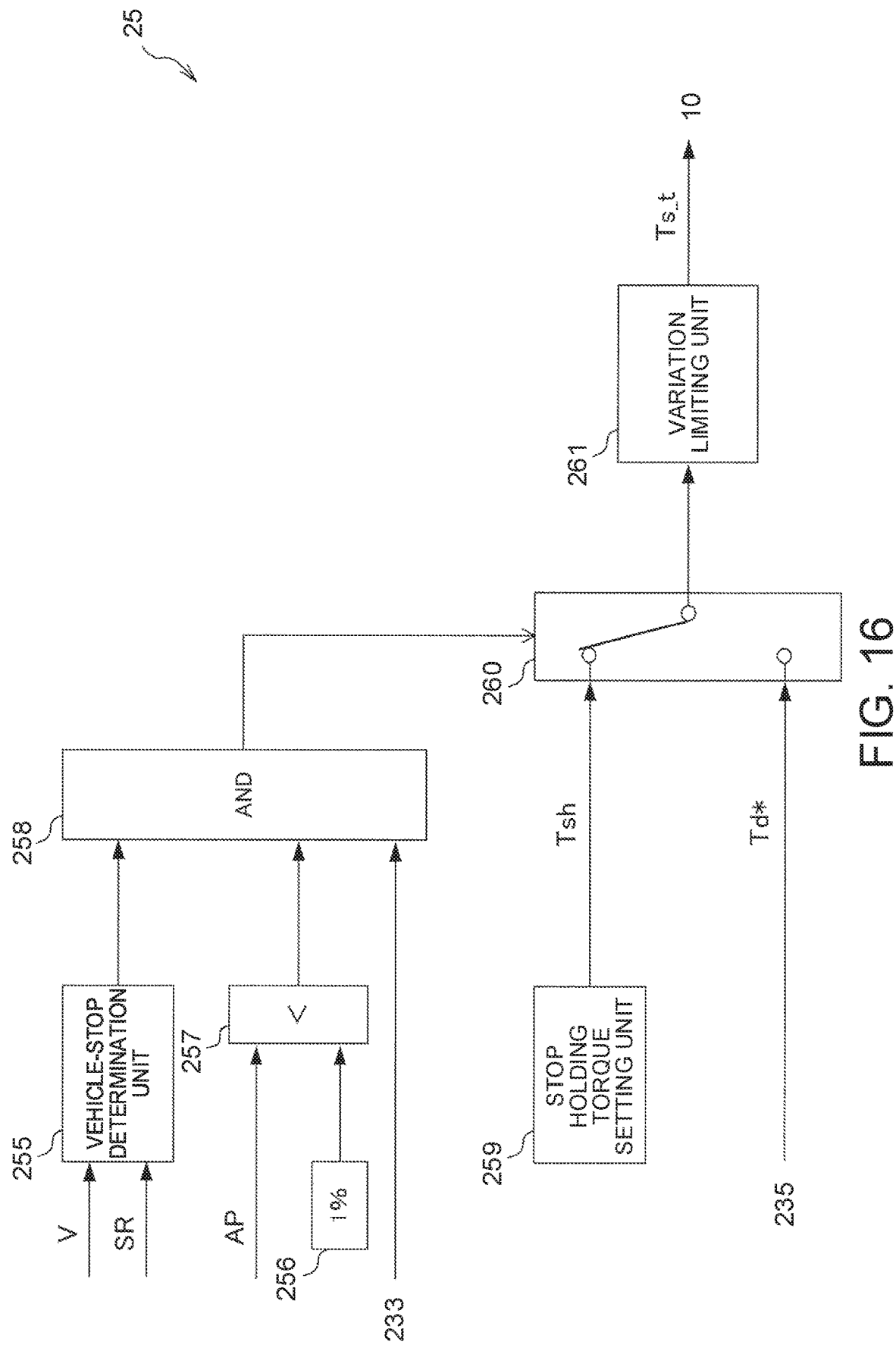
FIG. 16 is a block diagram showing one example of the configuration of a target stop torque calculation unit in the third embodiment.

FIG. 16 is a block diagram showing one example of the configuration of the target stop torque calculation unit 25 of the third embodiment.

The target stop torque calculation unit 25 of the third embodiment limits the target stop torque Ts_t in accordance with the operating state and the slipping state of the electric vehicle 100. The target stop torque calculation unit 25 includes, in addition to the configuration (including 251 to 254) in FIG. 8, a vehicle-stop determination unit 255, a starting threshold setting unit 256, a comparator 257, an AND computing unit 258, a stop holding torque setting unit 259, a torque switching unit 260, and a variation limiting unit 261.

The vehicle-stop determination unit 255 determines based on the vehicle speed V and the shift position SR whether the electric vehicle 100 stops or is in a state close to stopping or not. The method of determining the stopping by the vehicle-stop determination unit 255 will be described later with reference to the following drawing. The vehicle-stop determination unit 255 outputs a determination result to the AND computing unit 258.

More specifically when the vehicle-stop determination unit 255 determines that the electric vehicle 100 stops or is in a state close to stopping, the vehicle-stop determination unit 255 sets a vehicle-stop determination flag at "1". When the vehicle-stop determination unit 255 determines that the electric vehicle 100 does not stop or is not in a state close to stopping, the vehicle-stop determination unit 255 sets the vehicle-stop determination flag at "0".

The starting threshold setting unit 256 sets a driving threshold Th_dr at the comparator 257. The driving threshold Th_dr is specified to determine whether the depressing operation to the accelerator pedal is generated or not. The driving threshold Th_dr of the third embodiment is set at 1.0% of the accelerator position.

The comparator 257 compares the accelerator position AP and the driving threshold Th_dr, and outputs a comparison result to the AND computing unit 258. When the accelerator position AP is the driving threshold Th_dr or more, the comparator 257 determines that the depressing operation to the accelerator pedal is generated, and sets an operation-canceling determination flag at "0". When the accelerator position AP is less than the driving threshold Th_dr, the comparator 257 determines that the depressing operation to the accelerator pedal is not generated, and sets the operation-canceling determination flag at "1".

When all of the determination signal at the slip determination unit 233, the vehicle-stop determination flag, and the operation-canceling determination flag are "1", the AND computing unit 258 outputs an enabling signal to enable an increase of the friction torque Tf to the torque switching unit 260. That is, when the accelerator pedal is not depressed and when the electric vehicle 100 in a low μ state is in a stopping state or close to the stopping state, the AND computing unit 258 enables an increase of the friction brake force provided to the electric vehicle 100.

When at least any one of the determination signal at the slip determination unit 233, the vehicle-stop determination flag, and the operation-canceling determination flag is "0", the AND computing unit 258 outputs an inhibit signal to inhibit an increase of the friction torque Tf to the torque switching unit 260. In this way when the electric vehicle 100 hardly slips down, i.e., the vehicle hardly moves, the AND computing unit 258 suppresses an unnecessary increase of the friction torque Tf.

The stop holding torque setting unit 259 sets a stop holding torque Tsh at the torque switching unit 260. The stop holding torque Tsh is a friction torque specified so as to stop the electric vehicle 100 in every assumed sloping road. The stop holding torque Tsh is a value larger than the gradient torque estimated value Td* that is output from the gradient torque limiting unit 235.

The torque switching unit 260 changes the gradient torque estimated value Td* output from the gradient torque limiting unit 235 into the stop holding torque Tsh in accordance with the output signal from the AND computing unit 258. That is, when the vehicle may move because the road surface is in a low μ state, the torque switching unit 260 increases the friction torque Tf by the friction brakes 8a to 8d.

More specifically when receiving an enable signal from the AND computing unit 258, i.e., when the vehicle may move due to a low μ state of the road surface, the torque switching unit 260 outputs the stop holding torque Tsh to the variation limiting unit 261. When receiving an inhibit signal from the AND computing unit 258, i.e., when the electric vehicle 100 hardly slips down, the torque switching unit 260 outputs the gradient torque estimated value Td* from the gradient torque limiting unit 235 to the variation limiting unit 261.

During switching from the gradient torque estimated value Td* to the stop holding torque Tsh, the variation limiting unit 261 performs the processing to limit a variation per unit time relative to the stop holding torque Tsh so that the pressure-rising rate of the fluid pressure at the friction brakes 8a to 8d does not exceed the upper-limit value. This suppresses sound vibration during rising of the fluid pressure at the friction brakes 8a to 8d.

The variation limiting unit 261 outputs the stop holding torque Tsh subjected to the variation limiting processing or the gradient torque estimated value Td* as the target stop torque Ts_t to the brake controller 10.

In this way, the target stop torque calculation unit 25 of the third embodiment increases the friction torque Tf provided to the electric vehicle 100 when the electric vehicle 100 stops under an easily slipping condition. This allows reliable stopping of the electric vehicle 100.

Figure 17:
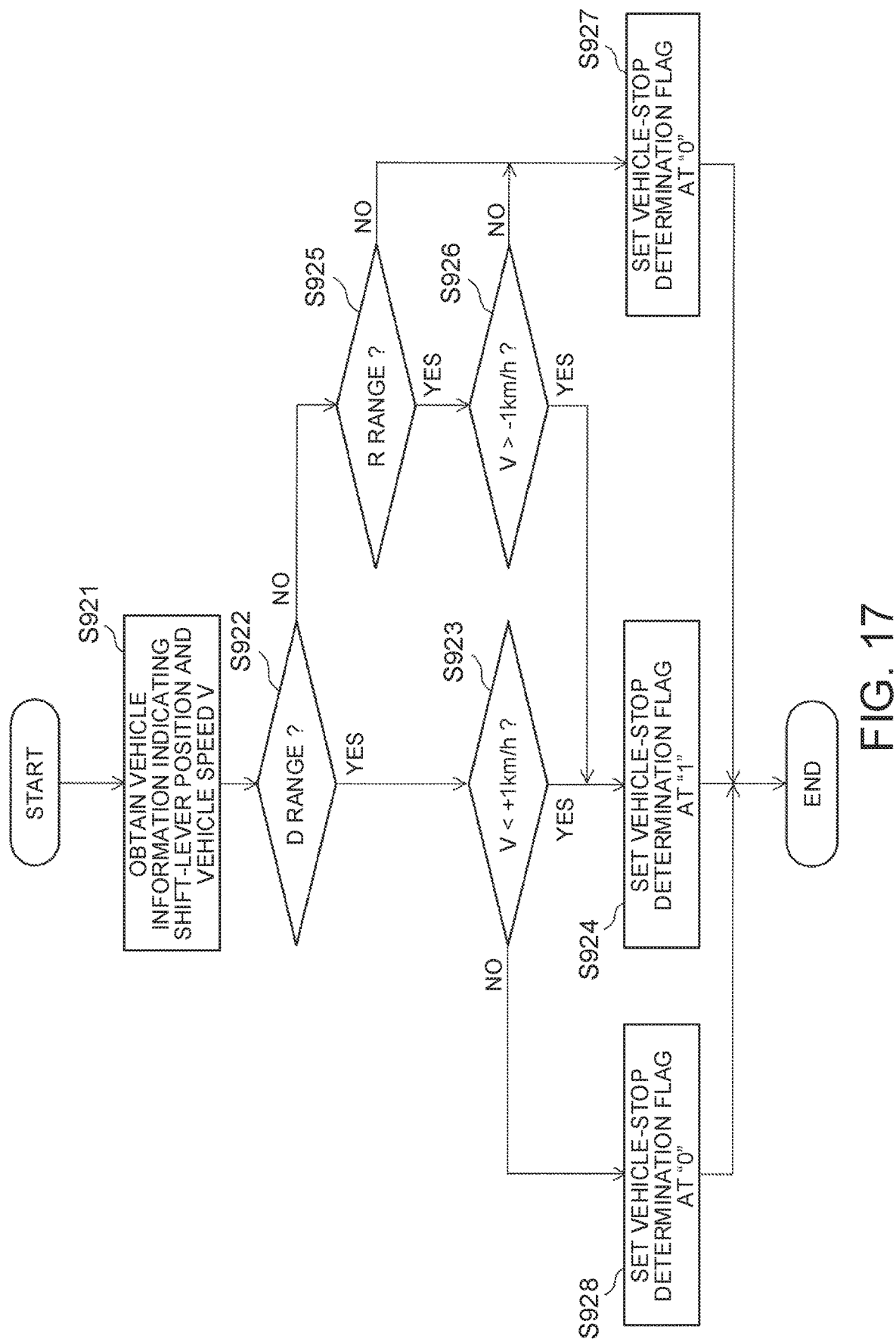
FIG. 17 is a flowchart showing a method of determining the stopping of a vehicle.

FIG. 17 is a flowchart showing an example of the procedure of the vehicle-stop determination processing by the vehicle-stop determination unit 255 of the third embodiment.

At step S921, the vehicle-stop determination unit 255 obtains vehicle information indicating the shift-lever position SR and the vehicle speed V.

At step S922, the vehicle-stop determination unit 255 determines whether the shift position SR is at a D range (forward-travelling range) or not.

At step S923, when the shift position SR is at the D range, the vehicle-stop determination unit 255 determines whether the vehicle speed V is smaller than a forward-travelling threshold Th_d or not. This example sets the forward-travelling threshold Th_d at +1 km/h.

At step S924, when the vehicle speed V is smaller than the forward-travelling threshold Th_d, the vehicle-stop determination unit 255 sets the vehicle-stop determination flag at "1".

At step S928, when the vehicle speed V is the forward-travelling threshold Th_d or more, the vehicle-stop determination unit 255 sets the vehicle-stop determination flag at "0".

When step S922 determines that the shift position SR is not at the D range, the vehicle-stop determination unit 255 determines at step S925 whether the shift position SR is at a R range (rearward-travelling range) or not.

When the shift position SR is at the R range, the vehicle-stop determination unit 255 determines at step S926 whether the vehicle speed V is larger than a rearward-travelling threshold Th_r or not. This example sets the rearward-travelling threshold Th_r at −1 km/h. When the vehicle speed V is larger than the rearward-travelling threshold Th_r, the vehicle-stop determination unit 255 sets the vehicle-stop determination flag at "1" at step S924.

When the shift position SR is not at the R range or when the vehicle speed V is the rearward-travelling threshold Th_r or less, the vehicle-stop determination unit 255 sets the vehicle-stop determination flag at "0" at step S927.

When any one of steps S924, S927 and S928 ends in this way, a series of the vehicle-stop determination processing by the vehicle-stop determination unit 255 ends.

According to the third embodiment of the present invention, when the determination shows that the electric vehicle 100 is in a slipping state, the gradient torque calculation unit 22 limits the gradient torque estimated value Td*. In this way, the gradient torque estimated value Td* is set at a value smaller than the gradient torque estimated value Td* itself, e.g., at 0. This suppresses the fluctuation in acceleration of the electric vehicle 100.

The target stop torque calculation unit 25 of the third embodiment increases the target stop torque Ts_t to stop the electric vehicle 100 in a slipping state as compared with the target stop torque Ts_t to stop the electric vehicle 100 in a not-slipping state. This suppresses movement of the electric vehicle 100 in such a situation.

Fourth Embodiment

Next the following describes vehicle-movement suppressing processing to suppress movement of a vehicle that may occur during shifting from the stopping state to the starting state of the electric vehicle 100.

Figure 18:
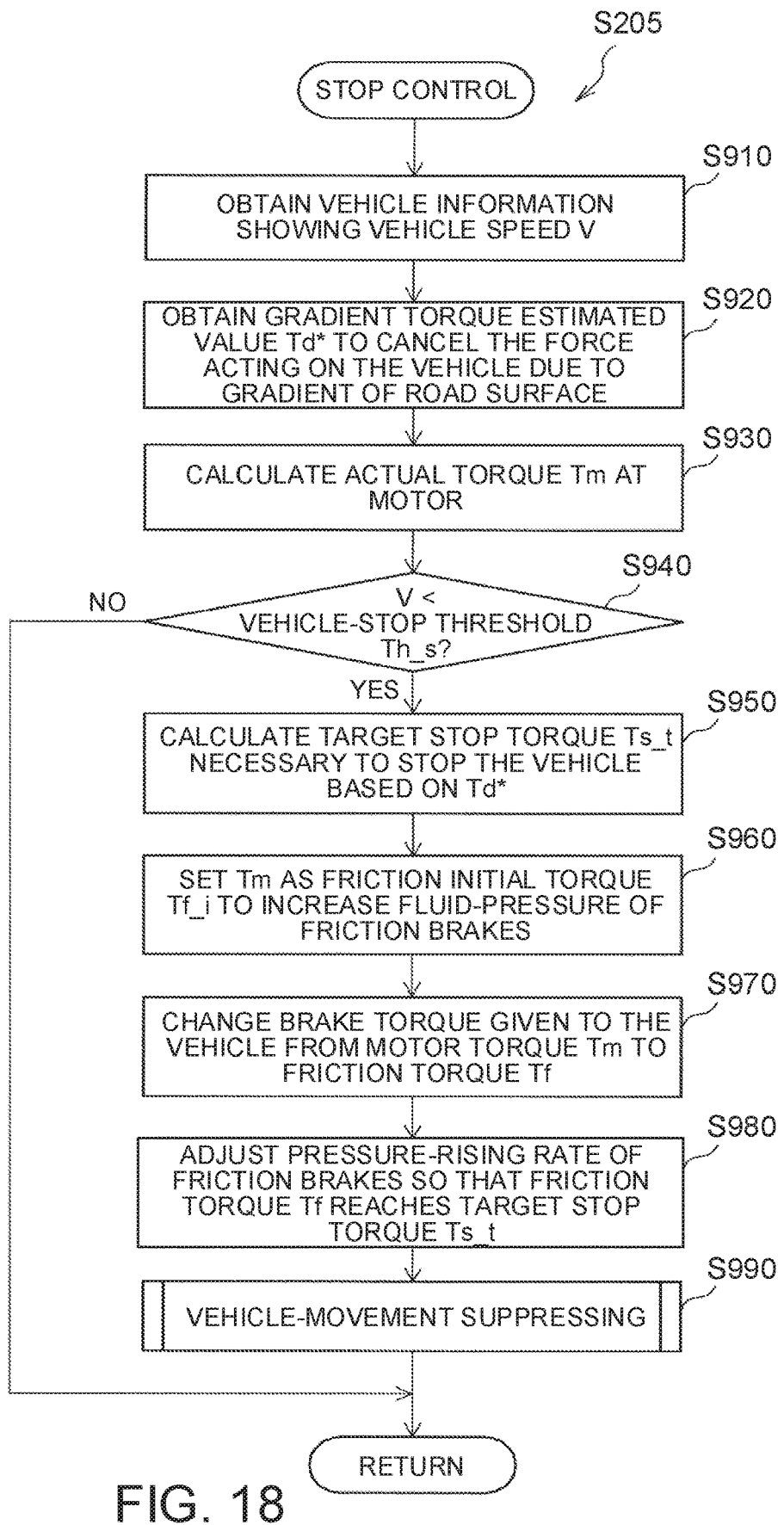
FIG. 18 is a flowchart showing an example of the stop control processing in a fourth embodiment of the present invention.

FIG. 18 is a flowchart showing an example of the procedure of the stop control processing in the fourth embodiment of the present invention. The stop control processing of the fourth embodiment includes, in addition to steps S910 to S980 in FIG. 12, a vehicle-movement suppressing step at step S990.

Figure 19:
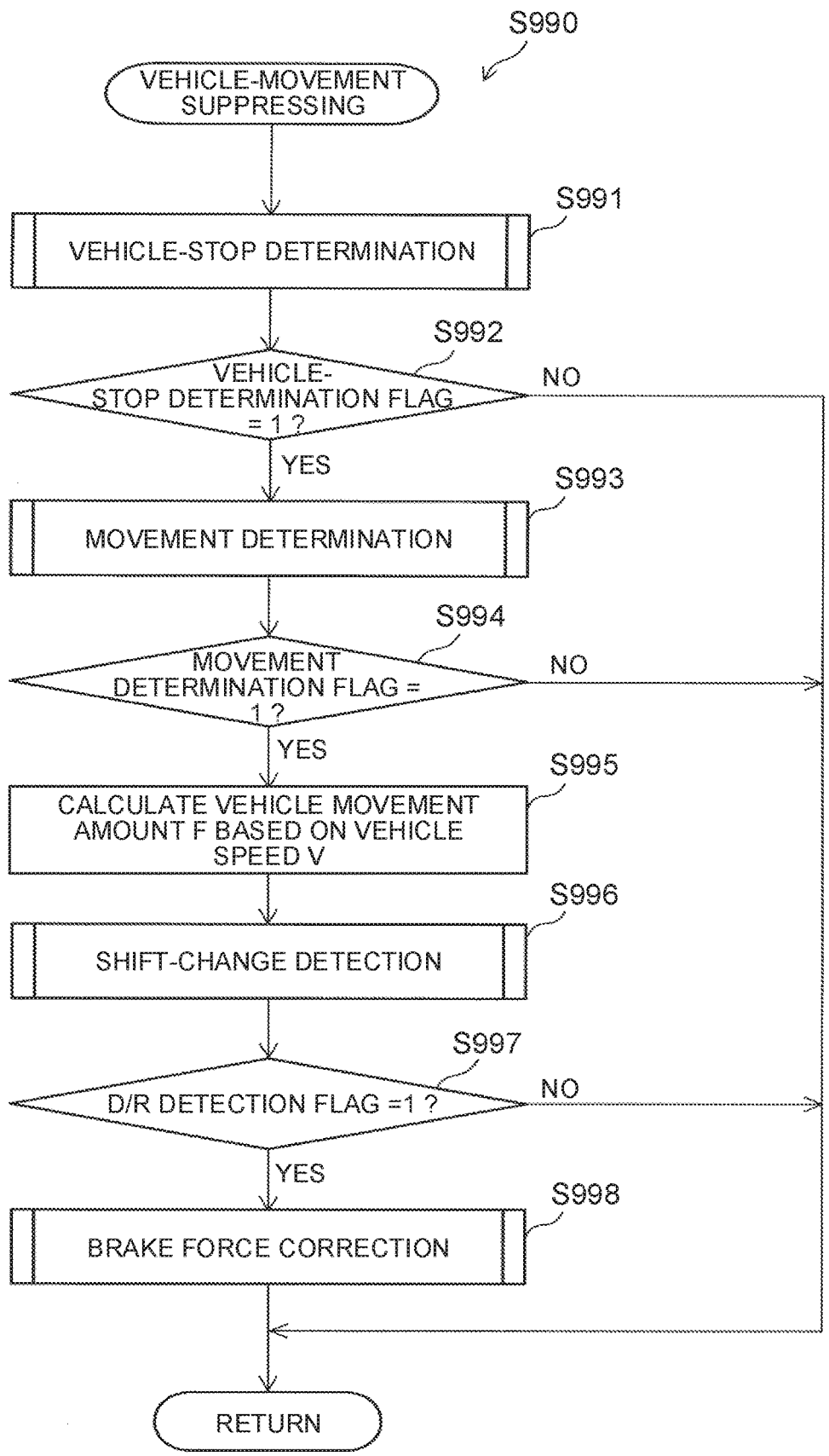
FIG. 19 is a flowchart showing an example of the vehicle-movement suppressing processing in the stop control processing.

FIG. 19 is a flowchart showing an example of the procedure of the vehicle-movement suppressing processing of the fourth embodiment.

At step S991, the brake controller 10 performs vehicle-stop determination processing to determine whether the electric vehicle 100 stops or not. When this step determines that the electric vehicle 100 stops, the brake controller 10 of the fourth embodiment sets a vehicle-stop determination flag at "1". When the step determines that the electric vehicle 100 does not stop, the brake controller 10 sets the vehicle-stop determination flag at "0". The details of the vehicle-stop determination processing are described later with reference to the following drawing.

At step S992, the brake controller 10 determines whether the vehicle-stop determination flag is "1" or not. When the vehicle-stop determination flag is "0", the brake controller 10 ends the vehicle-movement suppressing processing.

When the vehicle-stop determination flag is "1", the brake controller 10 performs at step S993 movement determination processing to determine whether the electric vehicle 100 moves or not. More specifically when this step determines that the vehicle movement occurs, then the brake controller 10 of the fourth embodiment sets a movement determination flag at "1", When the step determines that the vehicle movement does not occur, then the brake controller 10 sets the movement determination flag at "0". The details of the movement determination processing will be described later with reference to FIG. 21.

At step S994, the brake controller 10 determines whether the movement determination flag is "1" or not. When the movement determination flag is "0", the brake controller 10 ends the vehicle-movement suppressing processing.

When the movement determination flag is "1", the brake controller 10 calculates at step S995 vehicle movement amount F that indicates the distance of the movement of the electric vehicle 100 based on the vehicle speed V. For instance, the brake controller 10 multiplies the vehicle speed V obtained in each control cycle Δt by the control cycle Δt and adds these products to calculate the vehicle movement amount F.

At step S996, the brake controller 10 performs shift-change detection processing to detect a movement of the shift lever. This is to specify the situation where the movement of the vehicle occurs. More specifically when the shift lever moves from the previous position to a D range or a R range, the brake controller 10 of the fourth embodiment sets a D/R detection flag at "1". When the shift lever moves to other positions, the brake controller 10 sets the D/R detection flag at "0". When the shift lever passes through a N range, the previous shift position is kept. The details of the shift-change detection processing will be described later with reference to FIG. 22.

At step S997, the brake controller 10 determines whether the D/R detection flag is "1" or not. When the D/R detection flag is "0", the brake controller 10 ends the vehicle-movement suppressing processing.

At step S998, the brake controller 10 performs brake force correction processing to suppress the vehicle movement. Specifically the brake controller 10 increases the target stop torque Ts_t in accordance with the vehicle movement amount F. The details of the brake force correction processing will be described later with reference to FIG. 23.

When step S998 ends, this means that the vehicle-movement suppressing processing ends. Then the procedure returns to the stop control processing in FIG. 18.

Figure 20:
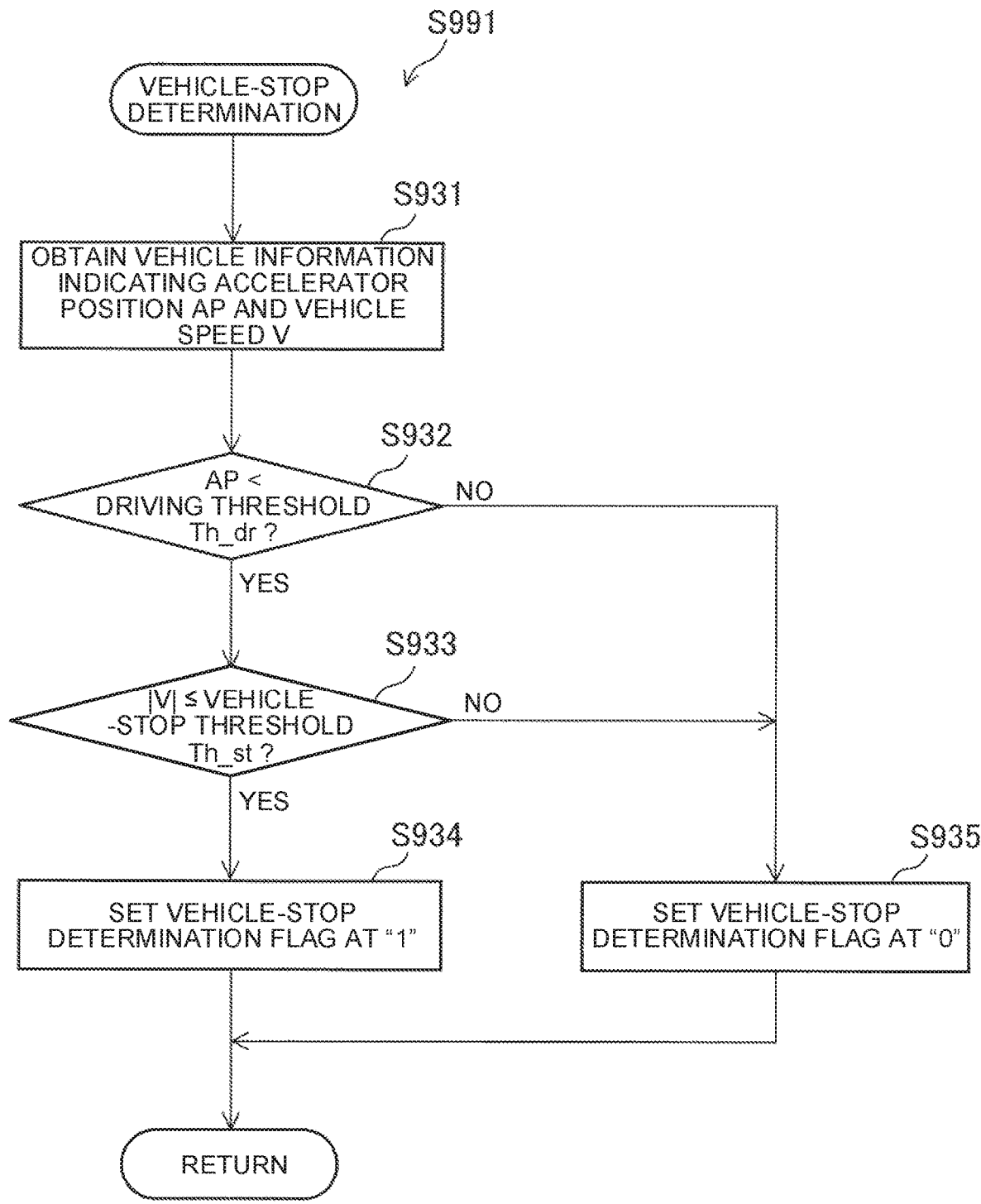
FIG. 20 is a flowchart showing an example of the vehicle-stop determination processing in the vehicle-movement suppressing processing.

FIG. 20 is a flowchart showing an example of the procedure of the vehicle-stop determination processing at step S991.

At step S931, the brake controller 10 obtains vehicle information indicating the accelerator position AP and the vehicle speed V.

At step S932, the brake controller 10 determines whether the accelerator position AP is less than a driving threshold Th_dr or not. The driving threshold Th_dr is a threshold to determine whether the driver of the electric vehicle 100 intends to drive the electric vehicle or not. The driving threshold Th_dr is set at 1%, for example.

When the accelerator position AP is the driving threshold Th_dr or more, the brake controller 10 determines at step S935 that the driver intends to drive the electric vehicle, and sets the vehicle-stop determination flag at "0".

When the accelerator position AP is less than the driving threshold Th_dr, the brake controller 10 determines at step S933 whether the absolute value of the vehicle speed V is a vehicle-stop threshold Th_st or less or not. The vehicle-stop threshold Th_st is a threshold to determine whether the electric vehicle 100 is just before stop or stops or not. In one example, the vehicle-stop threshold Th_st is set at a few km/h while considering the detection accuracy of a vehicle-speed sensor to detect the vehicle speed V. The vehicle-stop threshold Th_st may be set at 0 km/h.

When the absolute value of the vehicle speed V is larger than the vehicle-stop threshold Th_st, the brake controller 10 determines that the electric vehicle 100 is not just before stop or is not in a stop state, and the procedure shifts to step S935.

When the absolute value of the vehicle speed V is the vehicle-stop threshold Th_st or less, the brake controller 10 determines at step S934 that the electric vehicle 100 is just before stop or is in a stop state, and sets the vehicle-stop determination flag at "1".

When step S934 or S935 ends, this means that the vehicle-stop determination processing ends. Then the procedure returns to the vehicle-movement suppressing processing in FIG. 19.

Figure 21:
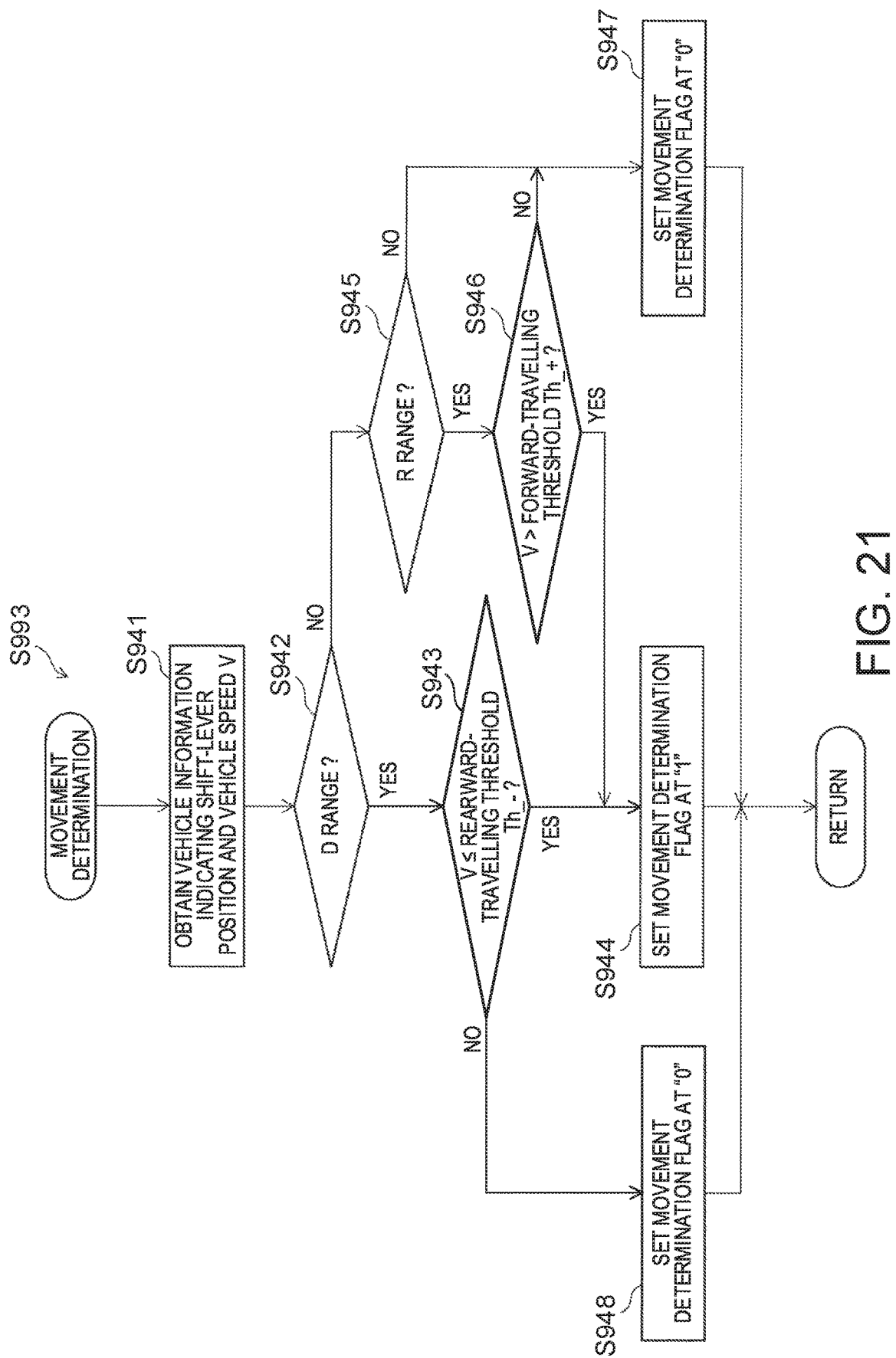
FIG. 21 is a flowchart showing an example of the movement determination processing.

FIG. 21 is a flowchart showing an example of the procedure of the vehicle-movement determination processing at step S993.

At step S941, the brake controller 10 obtains vehicle information indicating the shift position that is the position of the shift lever and the vehicle speed V.

At step S942, the brake controller 10 determines whether the shift position is at the D range or not.

When the shift position is at the D range, the brake controller 10 determines at step S943 whether the vehicle speed V is the rearward-travelling threshold Th_- or less or not, i.e., whether the speed of the vehicle forward movement exceeds the rearward-travelling threshold Th_- or not. The rearward-travelling threshold Th_- is a threshold to determine whether the vehicle speed exceeds a permissible speed of the vehicle movement or not. This threshold has a negative value. The rearward-travelling threshold Th_- is determined beforehand through an examination or simulation, for example.

When the vehicle speed V is larger than the rearward-travelling threshold Th_-, the brake controller 10 determines at step S948 that the vehicle movement does not occur, and sets the movement determination flag at "0".

When the vehicle speed V is the rearward-travelling threshold Th_- or less, the brake controller 10 determines at step S944 that the vehicle movement occurs, and sets the movement determination flag at "1".

When the shift position is not at the D range at step S942, the brake controller 10 determines at step S945 whether the shift position is R or not.

When the shift position is not the R range, the brake controller 10 sets the movement determination flag at "0" at step S947.

When the shift position is at the R range, the brake controller 10 determines at step S946 whether the vehicle speed V is larger than a forward-travelling threshold Th_+ or not, i.e., whether the speed of the vehicle rearward movement exceeds the forward-travelling threshold Th_+ or not. The forward-travelling threshold Th_+ is a threshold to determine whether the vehicle speed exceeds a permissible speed of the vehicle movement or not. This threshold has a positive value. The forward-travelling threshold Th_+ is determined beforehand through an examination or simulation, for example.

When the vehicle speed V exceeds the forward-travelling threshold Th_+, the brake controller 10 determines that the vehicle movement occurs. Then the procedure shifts to step S944 where the brake controller 10 sets the movement determination flag at "1". When the vehicle speed V is the forward-travelling threshold Th_+ or less, the brake controller 10 determines that the vehicle movement does not occur. Then the procedure shifts to step S957 where the brake controller 10 sets the movement determination flag at "0".

When steps S954, S957 and S958 end, this means that the movement determination processing ends. Then the procedure returns to the vehicle movement suppressing processing in FIG. 19.

Figure 22:
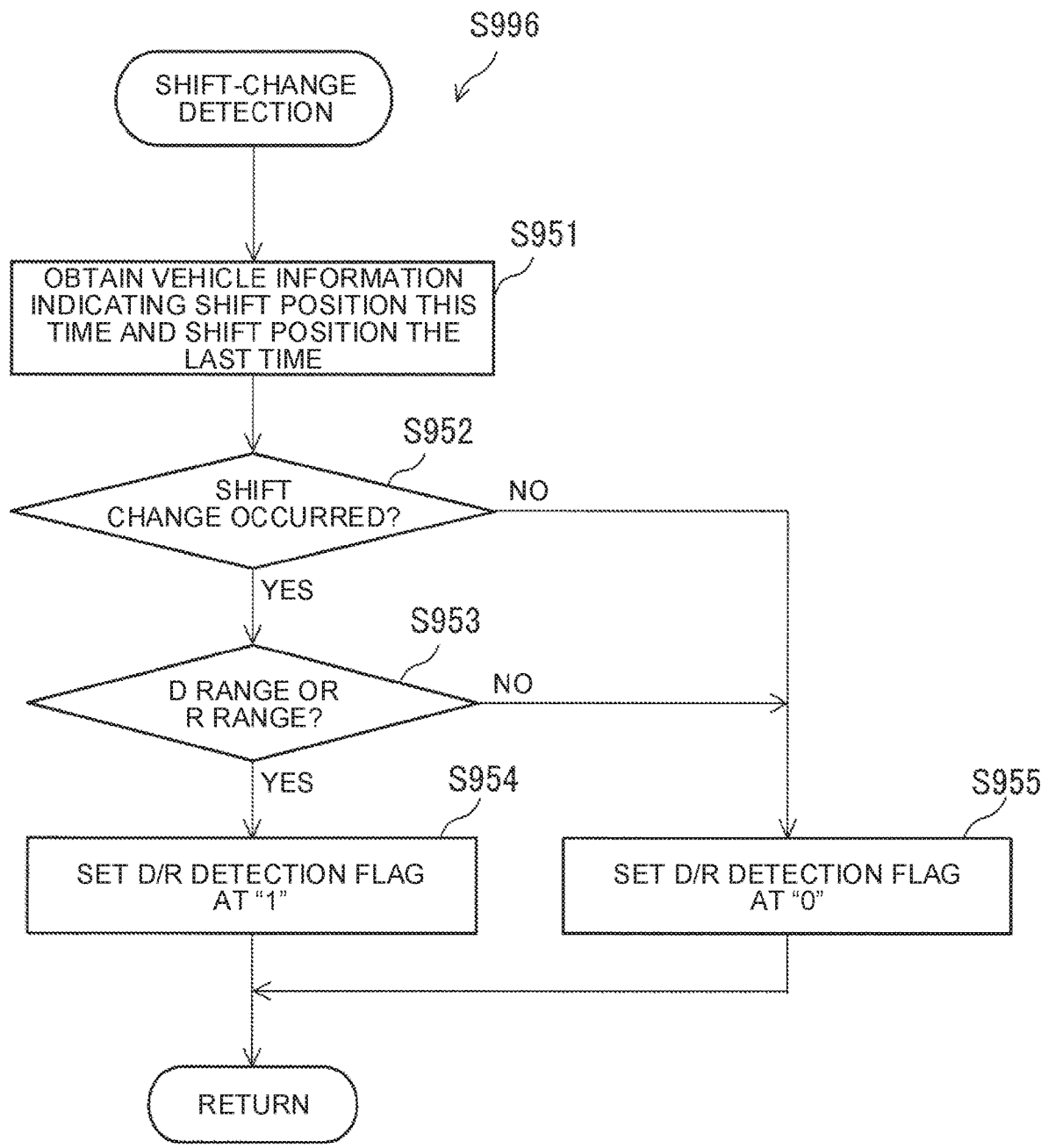
FIG. 22 is a flowchart showing an example of the shift-change detection processing.

FIG. 22 is a flowchart showing an example of the procedure of the shift change detection processing at step S996.

At step S951, the brake controller 10 obtains vehicle information indicating the shift position this time and the shift position the last time.

At step S952, the brake controller 10 determines whether the shift position obtained this time is different from the shift position the last time, i.e., a shift change occurs or not.

When this step determines that shift change does not occur, the brake controller 10 sets the D/R detection flag at "0" at step S955.

When this step determines that shift change occurs, the brake controller 10 determines at step S953 whether the shift position this time is the D range or the R range or not. When the shift position this time is not either the D range or the R range, the procedure shifts to step S955 where the brake controller 10 sets the D/R detection flag at "0".

When the shift position this time is the D range or the R range, the brake controller 10 sets the D/R detection flag at "1" at step S954. When step S954 or S955 ends, this means that the shift change detection processing ends. Then the procedure returns to the vehicle-movement suppressing processing in FIG. 19.

Figure 23:
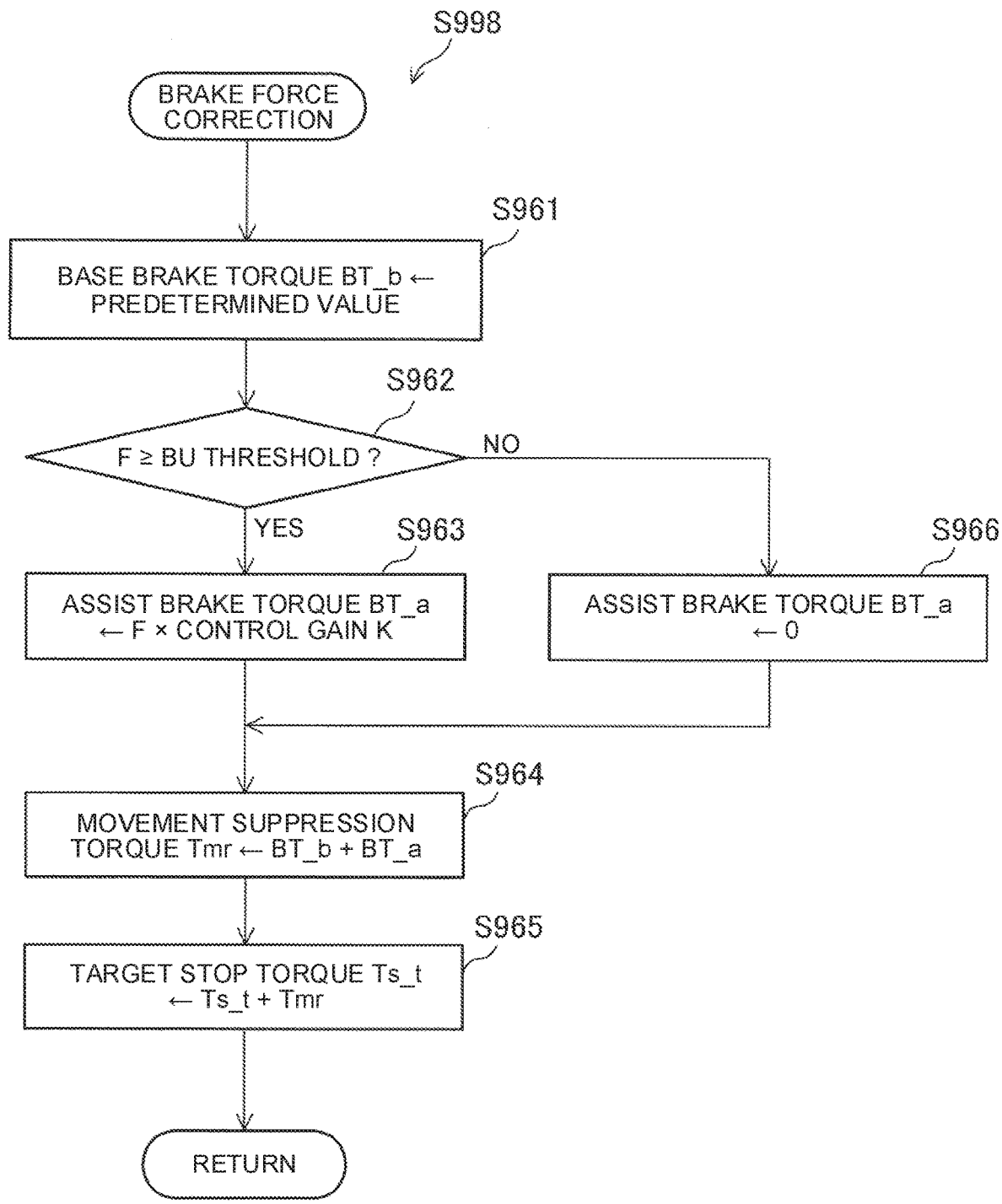
FIG. 23 is a flowchart showing an example of the brake force correction processing.

FIG. 23 is a flowchart showing an example of the procedure of the brake force correction processing at step S998.

At step S961, the brake controller 10 sets a base brake torque BT_b at a predetermined value to increase the brake force for the electric vehicle 100. The predetermined value here is set in the range of keeping smooth starting of the electric vehicle 100 on the flat road. The predetermined value may be set while considering the friction torque that is already provided from the friction brakes 8a to 8d to the electric vehicle 100 in accordance with the operation of the brake pedal.

The above predetermined value may be set in accordance with the gradient of the road surface. Specifically when the gradient of the road surface is large, the brake controller 10 increases the predetermined value compared with a smaller gradient based on a detected value of the longitudinal G sensor 15. This suppresses the distance of the movement of the electric vehicle 100 even when the electric vehicle stops on a steep slope.

At step S962, the brake controller 10 determines whether the vehicle movement amount F is a BU (backup) threshold or more or not. The BU threshold Th_+ is to determine whether the brake torque is required in addition to the base brake torque BT_b, and this threshold is determined beforehand through an examination or simulation, for example.

When the vehicle movement amount F is less than the BU threshold, the brake controller 10 determines at step S966 that the vehicle movement stops only with the base brake torque BT_b, and sets assist brake torque BT_a to further increase the increasing amount of the brake force at "0".

When the vehicle movement amount F is larger than the BU threshold, the brake controller 10 sets at step S963, as the assist brake torque BT_a, a value obtained by multiplying the vehicle movement amount F by a predetermined control gain K. This sets a larger assist brake torque BT_a for a larger vehicle movement amount F. That is, the brake controller 10 increases the friction torque so that the vehicle movement amount F becomes 0.

At step S964, the brake controller 10 adds the base brake torque BT_b and the assist brake torque BT_a and sets the sum as a movement suppression torque Tmr.

At step S965, the brake controller 10 adds the movement suppression torque Tmr to a pedal operation brake torque Tp to calculate the target stop torque Ts_t. The pedal operation brake torque Tp is set in accordance with the displacement of the brake pedal. This allows the friction torque to increase with the movement suppression torque Tmr when only the displacement of the brake pedal fails to stop the vehicle.

When step S965 ends, this means that the brake force correction processing ends. Then the procedure returns to the vehicle movement suppressing processing in FIG. 19.

Next the following describes an example of the operation of the brake controller 10 of the fourth embodiment.

FIGS. 24(a)-24(i) are time charts describing the method of suppressing the vehicle movement due to a shift change of the electric vehicle 100. This example shows the method of suppressing the vehicle movement when the electric vehicle 100 stopping on an uphill road starts to drive.

In FIGS. 24(a) to 24(i), the vertical axis represents the vehicle speed V, the vehicle movement amount F, shift-lever operation, a shift signal, friction brake operation, a movement determination flag, the base brake torque TB_b, the assist brake torque TB_a, and the target stop torque Ts_t, and the horizontal axis is the common temporal axis. The shift signal is vehicle information indicating the shift position, which is one of the signals input to the brake controller 10.

At time t10, the vehicle speed V is 0, the vehicle movement amount F is 0, and the shift position is at the P range. That is, the electric vehicle 100 is in a parking state. The brake controller 10 therefore sets the vehicle-stop determination flag at "1".

Figure 24:
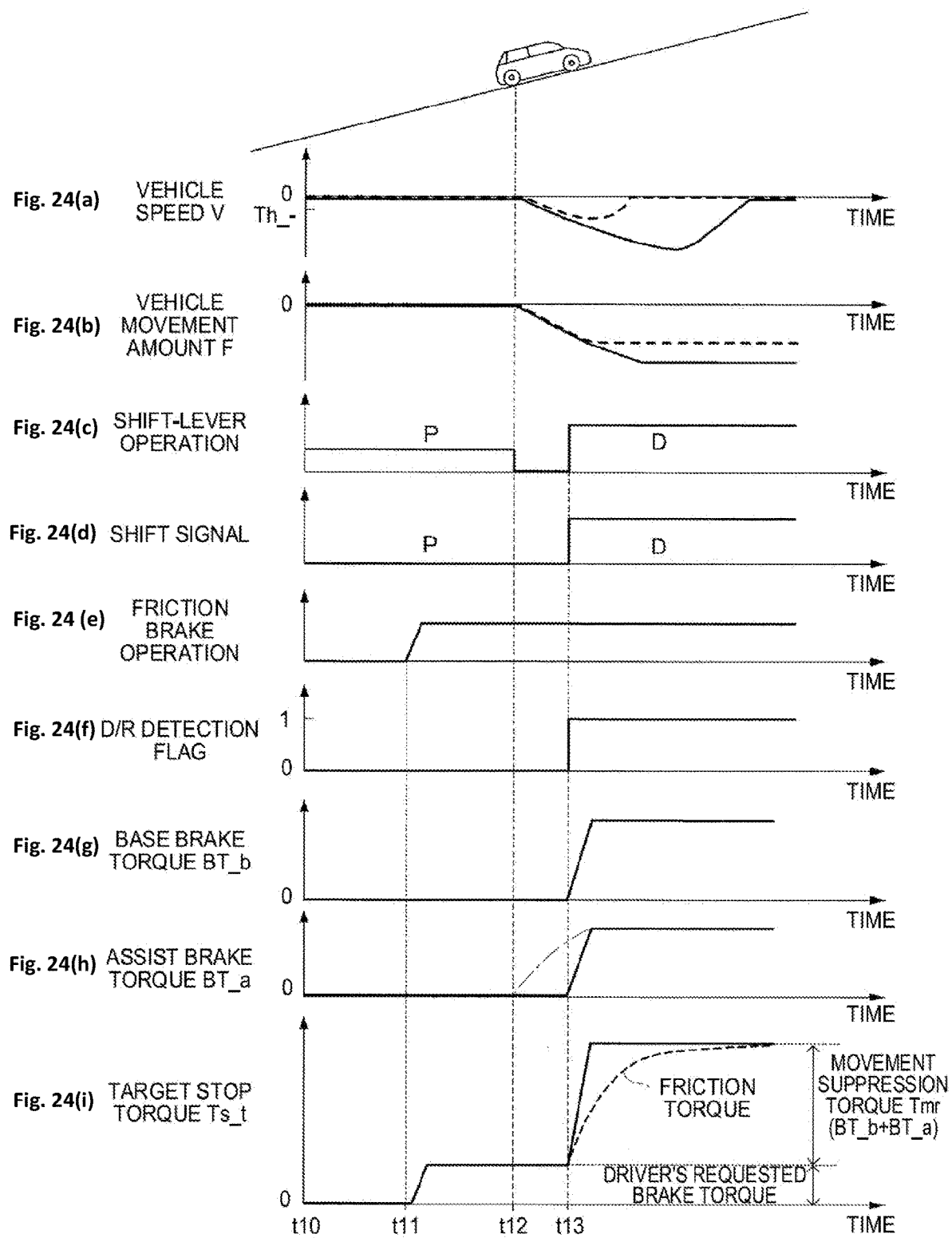
FIG. 24 are time charts describing an example of the method for suppressing vehicle movement in the fourth embodiment.

At time t11, as shown in FIG. 24(e), the driver performs depressing operation of the brake pedal of the stopping electric vehicle 100 to drive the electric vehicle. Along with this operation, the brake controller 10 sets a required brake torque as the target stop torque Ts_t, the required brake torque being a required value of the brake torque in accordance with the driver's operation. This provides the friction torque from the friction brakes 8a to 8d to the electric vehicle 100 as shown in FIG. 24(i).

At time t12, as shown in FIG. 24(c), the shift position switches from the P range to the D range. Along with this, as shown in FIGS. 24(a) and (b), the electric vehicle 100 travels in the direction opposite of the forward-travelling direction, so that both of the vehicle speed V and the vehicle movement amount F increase to the negative side. That is, the electric vehicle 100 travels rearward due to the vehicle movement. The brake controller 10 therefore changes the movement determination flag from "0" to "1" in accordance with the vehicle speed V.

During the time from time t12 to time t13, as shown in FIG. 24(c), the shift position is not fixed, and as shown in FIGS. 24(a) and (b), the vehicle speed V and the vehicle movement amount F increase due to the vehicle movement over time after time t12. As shown in FIG. 24(d), the shift signal shows the same shift position as that at the P range the last time. The brake controller 10 therefore determines that no shift change occurs because the shift position does not change between the last time and this time.

At this time, the vehicle movement amount F increases as shown in FIG. 24(b), and so the computation value set as the assist brake torque BT_a also increases gradually as shown with the dashed-dotted line of FIG. 24(h). The brake controller 10 of the fourth embodiment adds a predetermined control gain K to the vehicle movement amount F and sets the calculated value as the assist brake torque BT_a.

At time t13, as shown in FIG. 24(c), the shift position is fixed at the D range, and so the shift signal switches from the P range to the D range as shown in FIG. 24(d). The brake controller 10 therefore determines that the shift change occurs, and sets the D/R detection flag at "1".

At this time, all of the vehicle-stop determination flag, the movement determination flag, and the D/R detection flag are "1", and the brake controller 10 therefore performs the brake force correction processing to suppress the vehicle movement described with reference to FIG. 23.

More specifically as shown in FIGS. 24(g) and (h), the brake controller 10 sets the base brake torque BT_b and the assist brake torque BT_a and adds these values to calculate a movement suppression torque Tmr. Then as shown in FIG. 24(i), the brake controller 10 adds the movement suppression torque Tmr to the required brake torque in accordance with the driver's operation so as to correct the target stop torque Ts_t.

This increases the friction torque as shown in the broken lines of FIG. 24(i), which suppresses the vehicle movement of the electric vehicle 100 as shown in FIGS. 24(a) and (b).

In this way when the vehicle-stop determination flag is "1" and the D/R detection flag is "1", the brake controller 10 of the fourth embodiment adds the movement suppression torque Tmr to the required brake torque in accordance with the driver's operation so as to the target stop torque Ts_t. That is, when the movement of the stopping electric vehicle 100 is detected, the brake controller 10 increases the friction torque to a predetermined value.

When the electric vehicle 100 stops on a sloping road, the acceleration/deceleration of the electric vehicle 100 is 0 (zero). This case may fail to calculate the gradient torque estimated value Td* correctly. In this way, in the case where the vehicle movement is detected during starting to drive the electric vehicle 100, and when the target stop torque Ts_t is set based on the gradient torque estimated value Td*, the brake force provided to the electric vehicle 100 in this case is insufficient, and the electric vehicle 100 may move downward.

To avoid this, the brake controller 10 of the fourth embodiment is configured to, when the movement of the stopped electric vehicle 100 is detected, increase the friction torque so that the electric vehicle 100 reliably stops. This suppresses movement of the electric vehicle 100 quickly.

The brake controller 10 of the fourth embodiment increases the assist brake torque BT_a to be added to the movement suppression torque Tmr in accordance with the vehicle movement amount F of the electric vehicle 100. This suppresses movement of the electric vehicle 100 reliably.

The brake controller 10 of the fourth embodiment is configured to, when the electric vehicle 100 stops, detect switching of the shift lever from the P range to another range, such as the D range or the R range, of the electric vehicle 100. When detecting such switching of the shift position from the P range to another range, the brake controller 10 determines that the electric vehicle 100 may move, and increases the friction torque by the amount corresponding to the movement suppression torque Tmr.

In this way, when the shift change occurs during stopping of the electric vehicle, the electric vehicle 100 may move. The brake controller therefore increases the friction torque to a predetermined value so as to suppress the movement of the electric vehicle 100 correctly. This avoids an unnecessary increased friction torque that may interfere with the smooth-starting of the electric vehicle 100.

Fifth Embodiment

Figure 25:
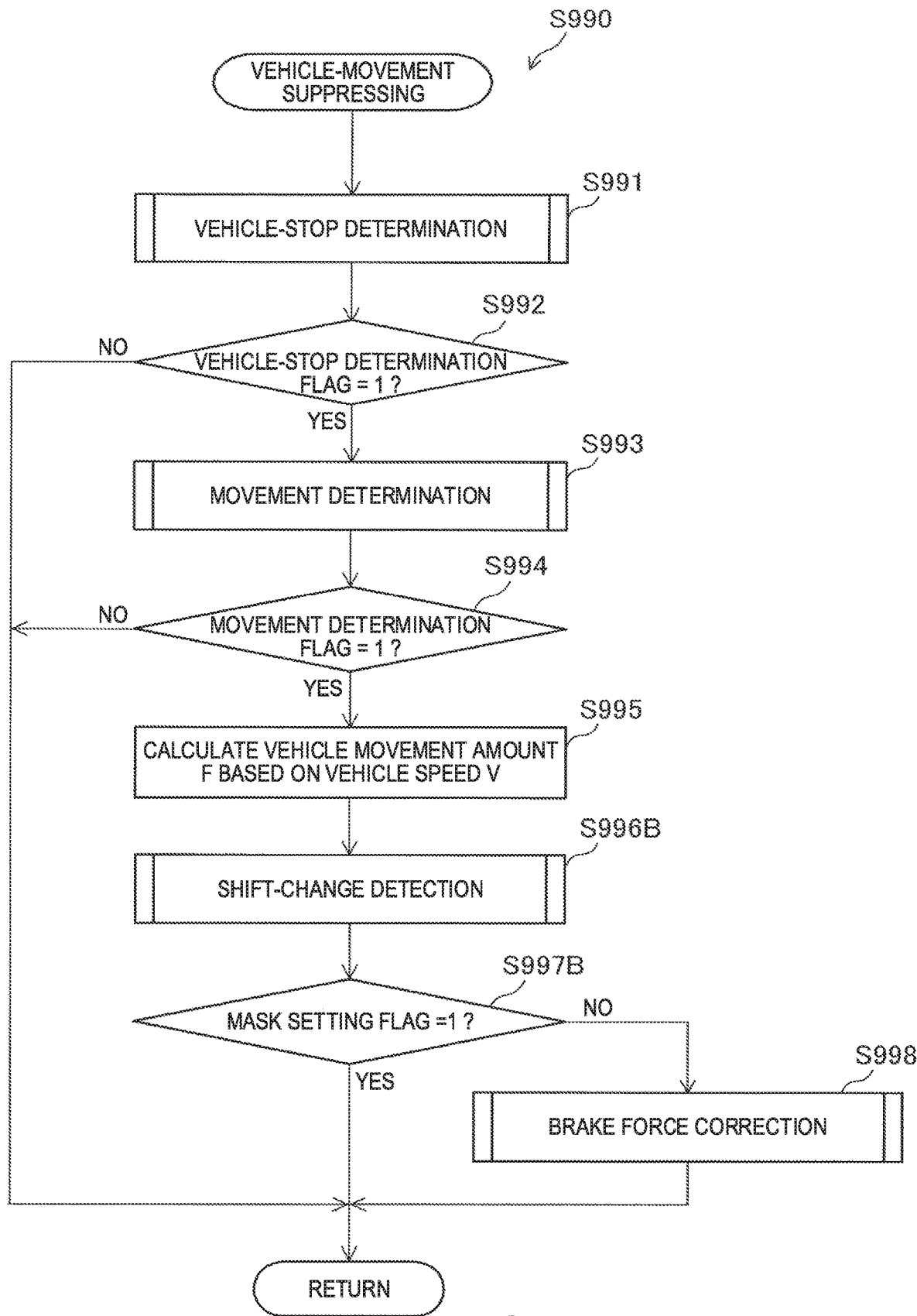
FIG. 25 is a flowchart showing an example of the vehicle-movement suppressing processing in a fifth embodiment of the present invention.

FIG. 25 is a flowchart showing an example of the procedure of the vehicle-movement suppressing processing of the fifth embodiment of the present invention.

The vehicle movement suppression processing of the fifth embodiment includes steps S996B and S997B instead of steps S996 and S997 in FIG. 19. Since the other steps are similar to those described in FIG. 19, the following describes steps S996B and S997B only.

At step S996B, the brake controller 10 performs shift-change detection processing to detect a movement of a shift lever. This is to determine whether the brake force correction processing is required or not at step S998. The brake controller 10 of the fifth embodiment detects whether the movement of the shift position occurs between the D range and the R range, and performs masking to suppress the brake force correction processing at step S998 in accordance with the detection result.

For instance, when the shift position moves between the D range and the R range, the brake controller 10 determines whether the absolute value of the vehicle speed V is larger than a predetermined mask threshold or not. When the absolute value of the vehicle speed V is larger than the mask threshold, then the brake controller 10 sets a mask setting flag at "1", and otherwise sets the mask setting flag at "0".

At step S997B, the brake controller 10 determines whether the mask setting flag is set at "1" or not. When the mask setting flag is set at "0", i.e., when the vehicle movement of the electric vehicle 100 is detected, the brake controller 10 shifts to step S998.

When the mask setting flag is set at "1", the brake controller 10 inhibits the processing at step S998. This is to avoid the longitudinal G generated by a steep brake torque due to the brake force correction processing at step S998. Then brake controller 10 ends the vehicle-movement suppressing processing.

Figure 26:
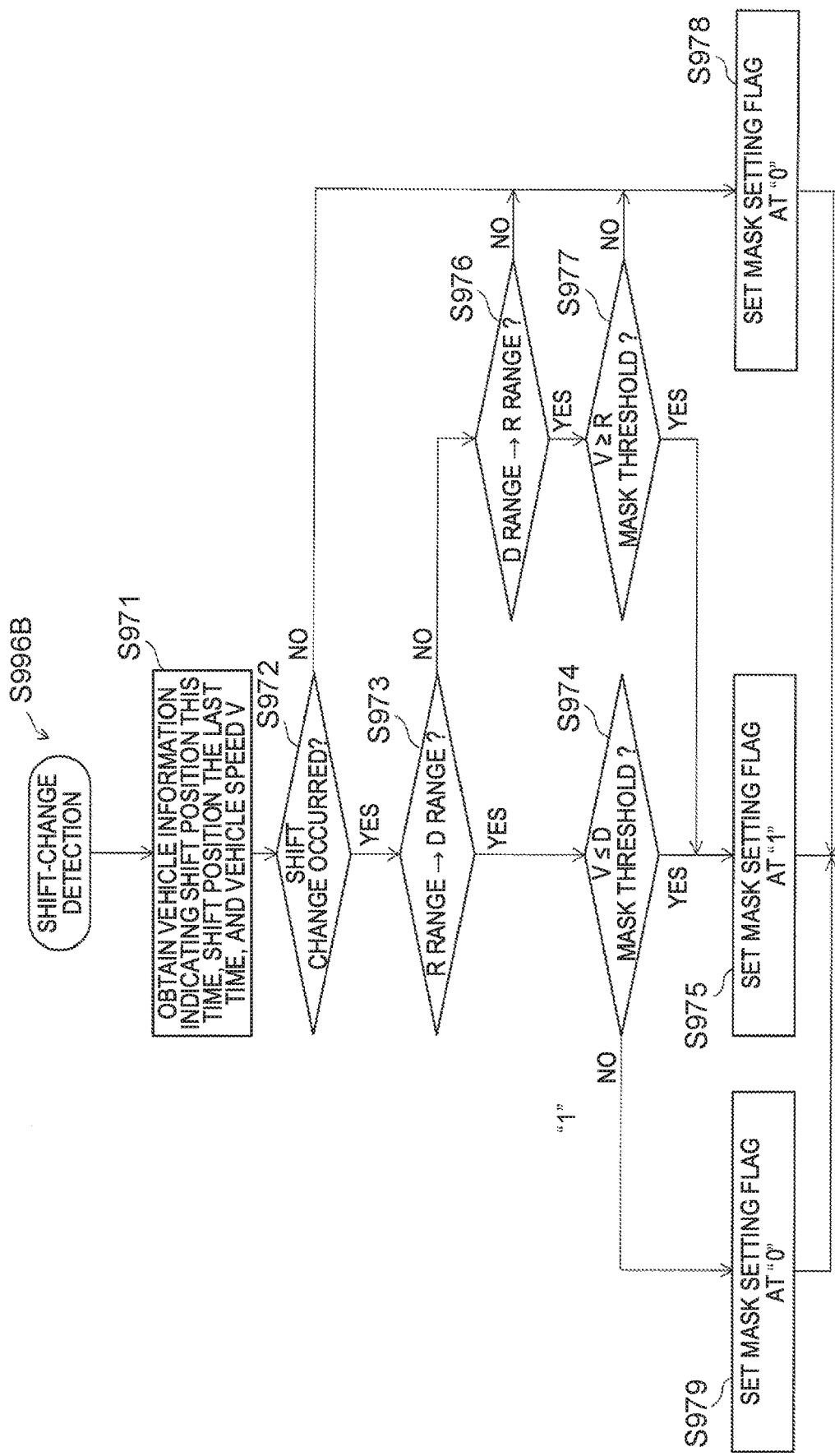
FIG. 26 is a flowchart showing an example of the shift change detection processing in the vehicle movement suppressing processing.

FIG. 26 is a flowchart showing an example of the procedure of the shift change detection processing at step S996B.

At step S971, the brake controller 10 obtains vehicle information indicating the shift position this time, the shift position the last time, and the vehicle speed V.

At step S972, the brake controller 10 determines whether the shift position obtained this time is different from the shift position the last time, i.e., a shift change occurs or not.

When this step determines that no shift-change occurs, then the brake controller 10 sets the mask setting flag at "0" at step S978.

When the step determines that shift-change occurs, the brake controller 10 detects a situation where the longitudinal G easily occurs due to the execution of the brake force correction processing at step S973. The brake controller 10 of the fifth embodiment determines whether the shift-change is from the R range to the D range or not.

When the shift-change is from the R range to the D range, the brake controller 10 determines at step S974 whether the vehicle speed V is a D mask threshold or less to avoid the longitudinal G. The D mask threshold is set beforehand based on the vehicle speed, which easily generates longitudinal G due to the brake force correction processing and is obtained through an examination or simulation, for example. In one example, the D mask threshold is set at 0 or a positive value.

When the vehicle speed V is the D mask threshold or less, the brake controller 10 sets the mask setting flag at "1" at step S975 so as to avoid unnecessary brake force correction processing.

When the vehicle speed V is the D mask threshold or more, the brake controller 10 sets the mask setting flag at "0" at step S979.

When the shift-change is not from the R range to the D range at step S973, the brake controller 10 determines at step S976 whether the shift change is from the D range to the R range, which is another situation where the longitudinal G easily occurs. When the shift change is not from the D range to the R range, the brake controller 10 shifts to step S978.

When the shift change is from the D range to the R range, the brake controller 10 determines at step S977 whether the vehicle speed V is a R mask threshold or more or not. The R mask threshold is set similarly to the D mask threshold as stated above. In one example, the R mask threshold is set at 0 or a negative value.

When the vehicle speed V is the R mask threshold or more, then the brake controller 10 sets the mask setting flag at "1". When the vehicle speed V is less than the R mask threshold, then the brake controller 10 sets the mask setting flag at "0". When steps S975, S978 and S979 end, a series of the shift-change detection processing ends.

Next the following describes an operation of the electric vehicle 100 of the fifth embodiment, with reference to FIGS. 27(a)-27(e) and FIGS. 28(a)-28(g).

FIGS. 27(a)-27(e) are time charts describing one example of the method of suppressing the vehicle movement of the electric vehicle 100 stopping on a downhill road.

In FIGS. 27(a) to (e), the vertical axis represents the vehicle speed V, the vehicle movement amount F, the movement suppression torque Tmr, the accelerator position AP, and the vehicle-stop determination flag, respectively, and the horizontal axis is the common temporal axis.

At time t20, as shown in FIGS. 27(a) and (d), both of the vehicle speed V and the accelerator position AP are 0, and so the vehicle-stop determination processing shown in FIG. 20 sets the vehicle-stop determination flag at "1" as shown in FIG. 27(e).

At time t21, the electric vehicle 100 moves in the forward-travelling direction due to the luggage on the electric vehicle 100, for example, and so the vehicle speed V gradually increases as shown in FIG. 27(a).

At time t22, the vehicle speed V exceeds the forward-travelling threshold Th_+ as shown in FIG. 27(a), and so summation of the vehicle movement amount F starts as shown in FIG. 27(b).

At time t23, the vehicle movement amount F exceeds the threshold Th_f as shown in FIG. 27(b), and so the brake force correction processing starts. Specifically as shown in FIG. 27(c), the processing calculates a movement suppression torque Tmr and adds the calculated value to the target stop torque Ts_t.

The vehicle movement amount F gradually increases as shown in FIG. 27(b), and the movement suppression torque Tmr accordingly increases so as to follow the vehicle movement amount F. This increases the friction torque provided to the electric vehicle 100, which suppresses the vehicle movement and decreases the vehicle speed V.

At time t24, the vehicle speed V falls below the forward-travelling threshold Th_+ as shown in FIG. 27(a), and so summation of the vehicle movement amount F stops as shown in FIG. 27(b). After that, the vehicle speed V becomes 0, i.e., the electric vehicle 100 stops, and the friction torque is kept to have a summed movement suppression torque Tmr.

At time t25, as shown in FIG. 27(d), the accelerator position AP exceeds the driving threshold Th_dr. The vehicle-stop determination flag therefore is set at "0" as shown in FIG. 27(e) and the brake force correction processing stops. Specifically as shown in FIG. 27(c), the movement suppression torque Tmr is set at 0 and decreases with the responsiveness of the friction brakes 8a to 8d.

In this way, when the vehicle movement occurs due to the luggage on the stopping electric vehicle 100, the movement suppression torque Tmr to be added to the friction torque increases in accordance with the vehicle movement amount F. This suppresses movement of the electric vehicle reliably.

FIGS. 28(a)-28(g) are time charts describing one example of the method of suppressing the vehicle movement of the electric vehicle 100 stopping on a downhill road.

In FIGS. 28(a) to (g), the vertical axis represents the vehicle speed V, shift signals, the mask setting flags, the vehicle movement amount F, the movement suppression torque Tmr, the accelerator position AP, and the vehicle-stop determination flag, respectively, and the horizontal axis is the common temporal axis.

At time t30, the driver stops the electric vehicle 100 temporarily, for example. To this end, the electric vehicle 100 travels forward at a slow speed as shown in FIGS. 28(a), (b) and (f).

At time t31, the driver drives the electric vehicle 100 rearward. To this end, the accelerator position AP, which is smaller than the driving threshold Th_dr, decreases more as shown in FIGS. 28(a) and (f), so that the vehicle speed V falls below a stop threshold Th_st. Then as shown in FIG. 28(g), the vehicle-stop determination step of FIG. 20 sets the vehicle-stop determination flag at "1".

Then as shown in FIG. 28(b), the shift signal switches from the D range to the R range. The vehicle speed V is larger than the R mask threshold that is 0 as shown in FIG. 28(a), and so the mask setting flag is set at "1" as shown in FIG. 28(c). As shown in FIGS. 28(c) and (d), this masks the brake force correction processing even during the movement of the electric vehicle 100 in the direction opposite of the travelling direction, and so both of the vehicle movement amount F and the movement suppression torque Tmr are set at 0.

At time t32, the vehicle speed V falls below the R mask threshold as shown in FIG. 28(a), and so the mask setting flag is set at "0". As shown in FIGS. 28(*a*) and (*f*), the accelerator position AP increases at the R range, and the vehicle speed V increases on the negative side. After that, when the accelerator position AP becomes 0, the vehicle speed V increases on the positive side due to the vehicle movement.

At time t33, the vehicle speed V exceeds 0, and so the vehicle movement amount F increases as shown in FIG. 28(*d*). At time t34, the vehicle movement amount F exceeds the threshold Th_f, and so the movement suppression torque Tmr increases in accordance with the vehicle movement amount F as shown in FIG. 28(*e*). This decreases the vehicle speed V as shown in FIG. 28(*a*) and suppresses the vehicle movement.

At time t35, the vehicle speed V becomes 0 as shown in FIG. 28(*a*). Then summation of the vehicle movement amount F stops as shown in FIG. 28(*d*) to increase the movement suppression torque Tmr.

At time t36, as shown in FIGS. 28(*b*) and (*f*), the accelerator position AP exceeds the driving threshold Th_dr at the D range. The vehicle-stop determination flag therefore switches to "0" as shown in FIG. 28(*f*), and the brake force correction processing stops.

In this way, when the shift position moves from the D range to the R range, and when the vehicle speed V is larger than a predetermined mask threshold, the brake force correction processing is suppressed. This avoids a sudden stop of the electric vehicle 100 due to an unnecessary brake force applied.

The brake controller 10 of the fifth embodiment of the present invention is configured to, when the vehicle speed V decreases to the vehicle-stop threshold Th_s as a predetermined value, increase the friction torque applied to the electric vehicle 100 from the friction brakes 8*a* to 8*d* with increase in the movement amount of the electric vehicle 100.

For instance, the brake controller 10 performs the brake force correction processing in FIG. 23, and increases the movement suppression torque Tmr shown in FIG. 27(*c*) with increase in the vehicle movement amount F shown in FIG. 27(*b*). This suppresses movement of the electric vehicle 100 in the direction opposite of the travelling direction.

The brake controller 10 may increase the friction torque in accordance with the movement amount from the time when the electric vehicle 100 decreases to the vehicle-stop threshold Th_s. This case also stops the electric vehicle 100 quickly when the electric vehicle moves in the same direction as the travelling direction.

The brake controller 10 of the fifth embodiment is configured to, when the movement of the electric vehicle 100 is detected after stopping the electric vehicle 100, increase the friction torque in accordance with the vehicle movement amount F. For instance, as described above referring to FIGS. 27(*a*)-27(*e*), when the vehicle-stop determination flag is set at "1" and the vehicle movement amount F exceeds the threshold Th_f, the brake controller 10 determines that the vehicle is moving, and then increases the movement suppression torque Tmr.

This allows the electric vehicle 100 to stop quickly even when the luggage is placed on the electric vehicle 100 during stopping on a sloping road and so the electric vehicle 100 may move.

FIGS. 27(*a*)-27(*e*) describes the example of increasing the friction torque when the electric vehicle 100 may move in the same direction as the travelling direction. For the movement of the electric vehicle 100 in the direction opposite of the travelling direction as well, the friction torque provided to the electric vehicle may increase similarly.

When the electric vehicle 100 moves in the direction opposite of the travelling direction 100 as stated above, according to one or more embodiments of the present invention, at least one of the increasing amount and the increasing rate of the friction torque is larger than those in the case of movement of the electric vehicle 100 in the same direction as the travelling direction. This stops the electric vehicle 100 quickly when the electric vehicle 100 moves in the direction opposite of the travelling direction 100, and stops the electric vehicle 100 smoothly when the electric vehicle 100 moves in the same direction as the travelling direction.

The brake controller 10 of the fifth embodiment is configured to, when the shift lever of the electric vehicle 100 moves between the D range and the R range, suppress an increase of the friction torque. For instance, when the shift lever switches from the D range to the R range at time t31 as described referring to FIGS. 28(*a*)-28(*g*), the brake controller 10 sets the mask setting flag at "1" to inhibit an increase of the friction torque.

This inhibits an increase of the friction torque when the shift lever switches between the D range and the R range and when the electric vehicle 100 moves in the direction opposite of the travelling direction as well, and so suppresses an unnecessary increase of the friction torque.

The above embodiments of the present invention are merely a part of examples of the application of the present invention, and the technical scope of the present invention is not limited to the specific constitutions of the above embodiments.

The above embodiments control the motor 4 and the friction brakes 8*a* to 8*d* separately with both of the motor controller 2 and the brake controller 10. In another embodiment, both of the motor and the friction brakes may be controlled with one of the controllers, or a part of the control with the motor controller 2 may be implemented with the brake controller 10. A part of the control with the brake controller 10 may be implemented with the motor controller 2.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for controlling a vehicle, the vehicle including a motor configured to provide a driving/braking force to the vehicle and a friction braking mechanism configured to provide a friction brake force to the vehicle, the method comprising:
   a target calculation step of calculating a target torque of the motor in accordance with a displacement of an accelerator pedal;
   a gradient estimation step of estimating a gradient torque to cancel a disturbance due to a gradient of a road surface where the vehicle is travelling;
   a command calculation step of calculating a torque command value of the motor based on the gradient torque and the target torque;
   a control step of controlling a torque of the motor in accordance with the torque command value; and
   a stop control step of determining whether the vehicle stops or not, changing a brake torque from the torque of the motor to a friction torque provided by the friction braking mechanism at the determination that the vehicle stops, the brake torque being provided to the vehicle and made to a large value larger than the gradient torque, wherein, in the stop control step, after the determination that the vehicle stops, increasing a pressure-rising rate of fluid to be supplied to the friction braking mechanism until the friction torque reaches the large value in accordance with increase in time elapsed after the determination.

2. The method for controlling the vehicle according to claim 1, wherein the stop control step determines whether a parameter proportional to the vehicle speed falls below a threshold or not, and when the parameter falls below the threshold, increases the friction torque to a vehicle-stop torque that is larger than an absolute value of the gradient torque.

3. The method for controlling the vehicle according to claim 2, wherein the vehicle-stop torque is set beforehand based on temperature characteristics of the fluid to be supplied to the friction braking mechanism.

4. The method for controlling the vehicle according to claim 1, wherein the gradient estimation step corrects the gradient torque to decrease, and when the vehicle stops, brings a correction amount of the gradient torque closer to zero with decrease in the vehicle speed.

5. The method for controlling the vehicle according to claim 4, wherein the gradient estimation step corrects the gradient torque to decrease with increase in the gradient torque.

6. The method for controlling the vehicle according to claim 4, wherein the friction braking mechanism includes a parking brake, and the gradient estimation step suppresses correction of the gradient torque when the parking brake provides a friction brake force to the vehicle.

7. The method for controlling the vehicle according to claim 4, wherein the gradient estimation step determines whether the vehicle is in a slipping state or not, and when the gradient estimation step determines that the vehicle is in a slipping state, limits the gradient torque.

8. The method for controlling the vehicle according to claim 4, wherein when the vehicle stops in a slipping state, the stop control step increases the friction torque as compared with stopping of the vehicle in a not slipping state.

9. The method for controlling the vehicle according to claim 1, wherein when the speed of the vehicle decreases to a predetermined value, the stop control step increases the friction torque with increase in movement amount of the vehicle.

10. The method for controlling the vehicle according to claim 9, wherein when the stop control step detects movement of the vehicle after stopping of the vehicle, the stop control step increases the friction torque in accordance with the amount of the movement of the vehicle.

11. The method for controlling the vehicle according to claim 10, wherein when a shift lever of the vehicle moves between a D range and a R range, the stop control step suppresses an increase of the friction torque.

12. The method for controlling the vehicle according to claim 10, wherein when the vehicle moves in the direction opposite of the travelling direction, the stop control step increases an increasing amount or an increasing rate of the friction torque as compared with the case of movement of the vehicle in a same direction as the travelling direction.

13. The method for controlling the vehicle according to claim 1, wherein when the stop control step detects movement of the vehicle after stopping of the vehicle, the stop control step increases the friction torque to a predetermined value.

14. The method for controlling the vehicle according to claim 13, wherein the stop control step increases the predetermined value in accordance with the amount of the movement of the vehicle from a first timing when the vehicle starts to move to a second timing when the movement of the vehicle is detected.

15. The method for controlling the vehicle according to claim 13, wherein when the vehicle stops and when movement of a shift lever of the vehicle from a P range to another range is detected, the stop control step increases the friction torque.

16. A control device of a vehicle comprising:
a motor configured to provide a driving/braking force to the vehicle;
a friction braking mechanism configured to provide a friction brake force to the vehicle; and
a controller configured to estimate a gradient torque to cancel a disturbance acting on the vehicle, calculate a torque command value of the motor based on a target torque of the motor based on the gradient torque and a displacement of an accelerator pedal, and control the motor in accordance with the torque command value,
wherein the controller is configured to determine whether the vehicle stops or not, execute a stop control processing of changing a brake torque from the torque of the motor to a friction torque provided by the friction braking mechanism at the determination that the vehicle stops, providing the brake torque to the vehicle, and making the brake torque to a large value larger than the gradient torque,
wherein, in the stop control step, the controller:
after the determination that the vehicle stops, increases a pressure-rising rate of fluid to be supplied to the friction braking mechanism until the friction torque reaches the large value in accordance with increase in time elapsed after the determination.

17. A method for controlling a vehicle, the vehicle including a motor configured to provide a driving/braking force to the vehicle and a friction braking mechanism configured to provide a friction brake force to the vehicle, the method comprising:
a target calculation step of calculating a target torque of the motor in accordance with a displacement of an accelerator pedal;
a gradient estimation step of estimating a gradient torque to cancel a disturbance due to a gradient of a road surface where the vehicle is travelling;
a command calculation step of calculating a torque command value of the motor based on the gradient torque and the target torque;

a control step of controlling a torque of the motor in accordance with the torque command value; and a stop control step of determining whether or not the vehicle stops or not, changing a brake torque from the torque of the motor to a friction torque provided by the friction braking mechanism at the determination that the vehicle stops, the brake torque being provided to the vehicle and made to a large value larger than the gradient torque, wherein, in the stop control step, after the determination that the vehicle stops, increasing a pressure-rising rate of fluid to be supplied to the friction braking mechanism until the friction torque reaches the large value in accordance with decrease in speed of the vehicle.

18. The method for controlling the vehicle according to claim 17, wherein, when the stop control step determines that the vehicle stops, the stop control step quickly increases pressure of the fluid so that the friction torque equals the torque of the motor, and then gradually increases the pressure-rising rate of the fluid, when a determination is made that the vehicle is being stopped.

19. The method for controlling the vehicle according to claim 17, wherein the stop control step determines whether the speed of the vehicle has fallen below a threshold or not, and when the speed of the vehicle falls below the threshold, increases the friction torque to a vehicle-stop torque that is larger than an absolute value of the gradient torque.

20. The method for controlling the vehicle according to claim 17, wherein the vehicle-stop torque is set beforehand based on temperature characteristics of fluid to be supplied to the friction braking mechanism.

21. The method for controlling the vehicle according to claim 17, wherein the gradient estimation step corrects the gradient torque to decrease, and when the vehicle stops, brings a correction amount of the gradient torque closer to zero with decrease in the vehicle speed.

22. The method for controlling the vehicle according to claim 21, wherein the gradient estimation step corrects the gradient torque to decrease with increase in the gradient torque.

23. The method for controlling the vehicle according to claim 21, wherein the friction braking mechanism includes a parking brake, and wherein the gradient estimation step suppresses correction of the gradient torque when the parking brake provides a friction brake force to the vehicle.

24. The method for controlling the vehicle according to claim 21, wherein the gradient estimation step determines whether the vehicle is in a slipping state or not, and when the gradient estimation step determines that the vehicle is in a slipping state, limits the gradient torque.

25. The method for controlling the vehicle according to claim 21, wherein, when the vehicle stops in a slipping state, the stop control step increases the friction torque as compared with stopping of the vehicle in a not slipping state.

26. The method for controlling the vehicle according to claim 17, wherein, when the speed of the vehicle decreases to a predetermined value, the stop control step increases the friction torque with increase in movement amount of the vehicle.

27. The method for controlling the vehicle according to claim 26, wherein, when the stop control step detects movement of the vehicle, the stop control step increases the friction torque in accordance with the amount of the movement of the vehicle.

28. The method for controlling the vehicle according to claim 27, wherein, when a shift lever of the vehicle moves between a D range and a R range, the stop control step suppresses an increase of the friction torque.

29. The method for controlling the vehicle according to claim 27, wherein, when the vehicle moves in the direction opposite of the travelling direction, the stop control step increases an increasing amount or an increasing rate of the friction torque as compared with the case of movement of the vehicle in a same direction as the travelling direction.

30. The method for controlling the vehicle according to claim 17, wherein, when the stop control step detects movement of the vehicle, the stop control step increases the friction torque to a predetermined value.

31. The method for controlling the vehicle according to claim 30, wherein the stop control step increases the predetermined value in accordance with the amount of the movement of the vehicle from a first timing when the vehicle starts to move to a second timing when the movement of the vehicle is detected.

32. The method for controlling the vehicle according to claim 30, wherein, when the vehicle stops and when movement of a shift lever of the vehicle from a P range to another range is detected, the stop control step increases the friction torque.

33. A control device of a vehicle comprising:

a motor configured to provide a driving/braking force to the vehicle;

a friction braking mechanism configured to provide a friction brake force to the vehicle; and a controller configured to estimate a gradient torque to cancel a disturbance acting on the vehicle, calculate a torque command value of the motor based on a target torque of the motor based on the gradient torque and a displacement of an accelerator pedal, and control the motor in accordance with the torque command value, wherein the controller is configured to determine whether the vehicle stops or not, execute a stop control processing of changing a brake torque from the torque of the motor to a friction torque provided by the friction braking mechanism at the determination that the vehicle stops, providing the brake torque to the vehicle, and making the brake torque to a large value larger than the gradient torque, wherein, in the stop control step, the controller:
after the determination that the vehicle stops, increases a pressure-rising rate of fluid to be supplied to the friction braking mechanism until the friction torque reaches the large value in accordance with decrease in speed of the vehicle.

* * * * *